US012671295B2

(12) United States Patent
Rodriguez et al.

(10) Patent No.: US 12,671,295 B2
(45) Date of Patent: Jun. 30, 2026

(54) ELECTRIC SCROLL COMPRESSOR WITH MOTOR CONNECTOR ASSEMBLY AND MOTOR CONNECTOR ASSEMBLY FOR ELECTRIC SCROLL COMPRESSOR

(71) Applicant: MAHLE INTERNATIONAL GMBH, Stuttgart (DE)

(72) Inventors: Abian Bautista Rodriguez, La Laguna (ES); David Ayza Parra, Banicassim (ES); Vicente Balaguer Garin, Meliana (ES); Justo Lapiedra Castano, Valencia (ES); Francisco Moya Torres, Valencia (ES)

(73) Assignee: MAHLE INTERNATIONAL GMBH (DE)

( * ) Notice: Subject to any disclaimer, the term of this patent is extended or adjusted under 35 U.S.C. 154(b) by 6 days.

(21) Appl. No.: 18/467,496

(22) Filed: Sep. 14, 2023

(65) Prior Publication Data

US 2025/0096638 A1      Mar. 20, 2025

(51) Int. Cl.

| | |
|---|---|
| *H02K 5/22* | (2006.01) |
| *F04C 18/02* | (2006.01) |
| *F25B 31/02* | (2006.01) |
| *H02K 15/32* | (2025.01) |

(52) U.S. Cl.
CPC ......... *H02K 5/225* (2013.01); *F04C 18/0207* (2013.01); *F04C 18/0215* (2013.01); *F25B 31/026* (2013.01); *H02K 15/32* (2025.01); *F04C 2240/803* (2013.01); *F04C 2240/808* (2013.01)

(58) Field of Classification Search
CPC .............. F04C 18/0215; F04C 18/0207; F04C 2240/803; F04C 2240/808; H02K 5/225; H02K 15/32; F25B 31/026
See application file for complete search history.

(56) References Cited

U.S. PATENT DOCUMENTS

| | | | |
|---|---|---|---|
| 4,886,427 A | 12/1989 | Sakurai et al. | |
| 5,533,875 A | 7/1996 | Crum et al. | |
| 8,052,427 B2 * | 11/2011 | Doo ................... | H01R 13/2421 439/34 |

(Continued)

FOREIGN PATENT DOCUMENTS

| | | |
|---|---|---|
| JP | S601396 A | 1/1985 |
| JP | H06299976 A | 10/1994 |

(Continued)

OTHER PUBLICATIONS

WO-2023189893-A1; 2023.*

*Primary Examiner* — Christopher S Bobish
(74) *Attorney, Agent, or Firm* — Endurance Law Group PLC; James R. Yee

(57) ABSTRACT
An electric compressor includes a housing, refrigerant inlet port, a refrigerant outlet port, an inverter section, a motor section, a compression device and a front cover. The housing defines an intake volume and a discharge volume. The refrigerant inlet port is coupled to the housing and is configured to introduce the refrigerant to the intake volume. The compression device is a compression device configured to compress the refrigerant. The refrigerant outlet port is coupled to the housing and is configured to allow compressed refrigerant to exit the electric compressor from the discharge volume.

20 Claims, 54 Drawing Sheets

(56) References Cited

U.S. PATENT DOCUMENTS

| | | | | |
|---|---|---|---|---|
| 8,303,271 | B2 * | 11/2012 | Ikeda | F04C 29/045 |
| | | | | 417/366 |
| 8,736,129 | B2 * | 5/2014 | Wang | H02K 3/522 |
| | | | | 310/194 |
| 8,956,129 | B2 * | 2/2015 | Murakami | F04B 39/121 |
| | | | | 417/410.5 |
| 9,441,630 | B2 | 9/2016 | Kiem et al. | |
| 10,211,695 | B2 * | 2/2019 | Roos | H02K 3/522 |
| 11,095,186 | B2 * | 8/2021 | Guntermann | H02K 11/33 |
| 11,715,986 | B2 * | 8/2023 | Ikeda | H02K 1/2788 |
| | | | | 310/71 |
| 12,088,166 | B2 * | 9/2024 | May | H02K 15/32 |
| 12,308,730 | B2 * | 5/2025 | Mitteer | H02K 11/30 |
| 2019/0363607 | A1 * | 11/2019 | Guntermann | F04B 39/121 |
| 2020/0386230 | A1 * | 12/2020 | Kim | F04C 27/005 |
| 2024/0254990 | A1 * | 8/2024 | Stausberg | F04C 18/0215 |
| 2024/0388163 | A1 * | 11/2024 | Fischinger | H02K 11/30 |

FOREIGN PATENT DOCUMENTS

| | | | |
|---|---|---|---|
| JP | H1047268 | A | 2/1998 |
| JP | 2778585 | B2 | 7/1998 |
| JP | 2785805 | B2 | 8/1998 |
| JP | 2785806 | B2 | 8/1998 |
| JP | 2870488 | B2 | 3/1999 |
| JP | 2006274807 | A | 10/2006 |
| JP | 4918338 | B2 | 4/2012 |
| JP | 5209437 | B2 | 6/2013 |
| JP | 5222444 | B2 | 6/2013 |
| KR | 20100103139 | A | 9/2010 |
| KR | 20130011656 | A | 1/2013 |
| KR | 20130011658 | A | 1/2013 |
| KR | 101278809 | B1 | 6/2013 |
| KR | 101284953 | B1 | 7/2013 |
| KR | 20130126837 | A | 11/2013 |
| KR | 101362790 | B1 | 2/2014 |
| KR | 101731653 | B1 | 5/2017 |
| WO | 2013165157 | A1 | 11/2013 |

* cited by examiner

Oil and Refrigerant Path
Seperated Oil Path
Nose Bleed Path

138

138A

136

138

138B

136

138

138A

138B

136

M10

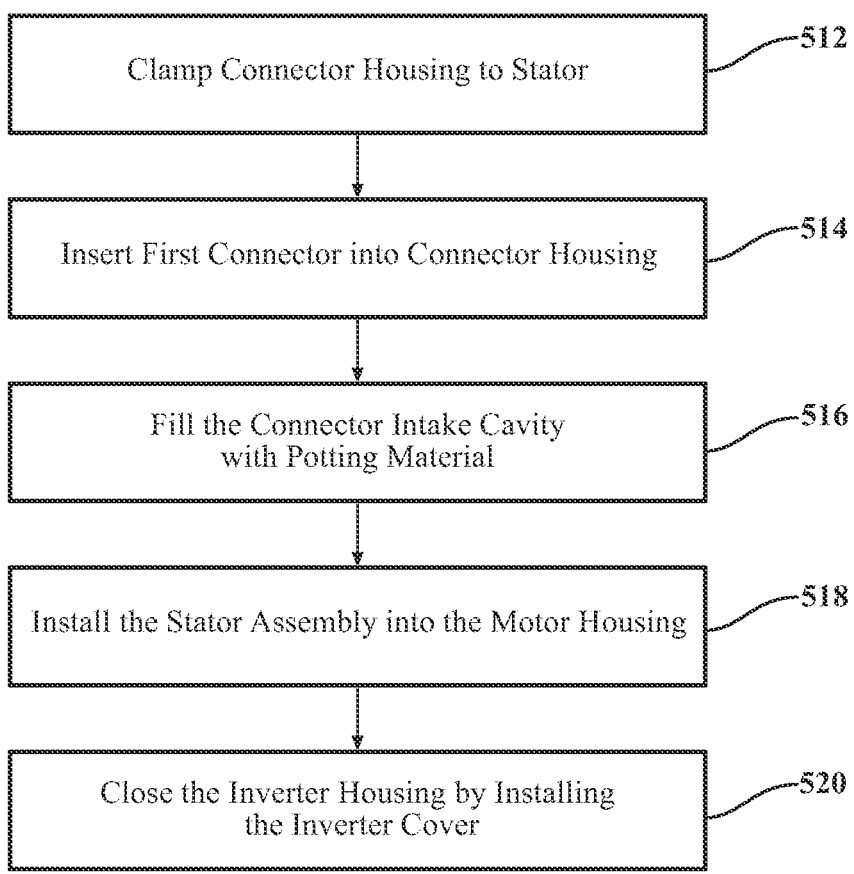

```
┌──────────────────────────────────────────┐
│       Clamp Connector Housing to Stator    │──512
└──────────────────────────────────────────┘
                      │
                      ▼
┌──────────────────────────────────────────┐
│     Insert First Connector into Connector  │──514
│                  Housing                   │
└──────────────────────────────────────────┘
                      │
                      ▼
┌──────────────────────────────────────────┐
│          Fill the Connector Intake Cavity  │──516
│              with Potting Material          │
└──────────────────────────────────────────┘
                      │
                      ▼
┌──────────────────────────────────────────┐
│  Install the Stator Assembly into the Motor │──518
│                  Housing                    │
└──────────────────────────────────────────┘
                      │
                      ▼
┌──────────────────────────────────────────┐
│     Close the Inverter Housing by Installing│──520
│              the Inverter Cover             │
└──────────────────────────────────────────┘
```

FIG. 24

ELECTRIC SCROLL COMPRESSOR WITH MOTOR CONNECTOR ASSEMBLY AND MOTOR CONNECTOR ASSEMBLY FOR ELECTRIC SCROLL COMPRESSOR

FIELD OF THE INVENTION

The invention relates generally to electric compressors, and more particularly to an electric compressor that compresses a refrigerant using a scroll compression device.

BACKGROUND OF THE INVENTION

Compressors have long been used in cooling systems. In particular, scroll-type compressors, in which an orbiting scroll is rotated in a circular motion relative to a fixed scroll to compress a refrigerant, have been used in systems designed to provide cooling in specific areas. For example, such scroll-type compressors have long been used in the HVAC systems of motor vehicles, such as automobiles, to providing air-conditioning. Such compressors may also be used, in reverse, in applications requiring a heat pump. Generally, these compressors are driven using rotary motion derived from the automobile's engine.

With the advent of battery-powered or electric vehicles and/or hybrid vehicles, in which the vehicle may be solely powered by a battery at times, such compressors must be driven or powered by the battery rather than an engine. Such compressors may be referred to as electric compressors.

In addition to cooling a passenger compart of the motor vehicle, electric compressors may be used to provide heating or cooling to other areas or components of the motor vehicle. For instance, it may be desired to heat or cool the electronic systems and the battery or battery compartment, when the battery is being charged, especially during fast charging modes, as such generate heat which may damage or degrade. the battery and/or other system. It may also be used to cooling the battery during times when the battery is not being charged or used, as heat may damage or degrade the battery. Since the electric compressor may be run at various times, even when the motor vehicle is not in operation, such use, obviously, requires electrical energy from the battery, thus reducing the operating time of the battery. Additionally, electric compressors may run at a very high speed, e.g., 2,000 RPM (or higher). Such high speed may generate unwanted levels of noise.

Such scroll-type compressors may be driven using an electric motor, such as a three-phase alternating current (AC) motor. The electric motor may be located within a housing of the compressor and surrounded by the coolant. The windings of the electric motor must then pass through the coolant to be connected to a drive circuit which may be located internal or external to the compressor. Such an arrangement may be subject to current leakage and/or loss.

It is thus desirable, to provide an electric compressor having high efficiency, low-noise and maximum operating life. The present invention is aimed at one or more of the problems or advantages identified above.

BRIEF SUMMARY OF THE INVENTION

In a first aspect of the present invention, an electric compressor configured to compress a refrigerant is provided. The electric compressor includes a housing an inverter module, a compression device, and a motor connector assembly. The housing defines an intake volume, a discharge volume and an inverter cavity and has a generally cylindrical shape with a central axis. The housing further defines a motor connector aperture located between the intake volume and the inverter cavity. The inverter module is mounted inside the inverter cavity of the housing and is adapted to convert direct current electrical power to alternating current electrical power. The motor has a plurality of motor windings and is mounted inside the housing. The compression device is coupled to the motor for receiving the refrigerant from the intake volume and compressing the refrigerant as the motor is rotated. The motor connector assembly includes a motor connector housing, a first motor connector and a second motor connector. The motor connector housing has an inverter end adjacent the inverter cavity and an intake end within the intake volume. The motor connector housing is positioned within the motor connector aperture and includes an internal wall having an intake side and an inverter side. The internal wall is positioned between the inverter end and the intake end separating the intake volume and the inverter cavity. The first motor connector passes through the internal wall and has a first end located adjacent the intake side of the internal wall and a second end located adjacent the inverter side of the internal wall. One of the motor windings is electrically connected to the first end of the first motor connector. The second motor connector is coupled to the inverter module and being configured to be removably coupled to the second end of the first motor connector.

In a second aspect of the present invention, an electric compressor configured to compress a refrigerant, is provided. The electric compressor includes a housing, an inverter module, a motor, a compression device and a motor connector assembly. The housing defines an intake volume, a discharge volume and an inverter cavity. The housing has a generally cylindrical shape and a central axis. The housing defines a motor connector aperture located between the intake volume and the inverter cavity. The inverter module is mounted inside the inverter cavity of the housing and adapted to convert direct current electrical power to alternating current electrical power. The motor has a plurality of motor windings and is mounted inside the housing. The compression device is coupled to the motor for receiving the refrigerant from the intake volume and compressing the refrigerant as the motor is rotated. The motor connector assembly includes a motor connector housing, a first motor connector, and a second motor connector. The motor connector housing as an inverter end adjacent the inverter cavity and an intake end within the intake volume and is positioned within the motor connector aperture. The motor connector housing includes an internal wall having an intake side and an inverter side and is positioned between the inverter end and the intake end separating the intake volume and the inverter cavity. The motor connector housing defines a connector intake cavity located within the intake volume and a connector inverter cavity. The first end of the first motor connector is a least partially located within the connector intake cavity and the second end of the first motor connector is at least partially located within the connector inverter cavity. The first motor connector passes through the internal wall and has a first end located adjacent the intake side of the internal wall and a second end located adjacent the inverter side of the internal wall. One of the motor windings being electrically connected to the first end of the first motor connector. The second motor connector is coupled to the inverter module and is configured to be removably coupled to the second end of the first motor connector. The second motor connector has a first end and a second end. The first end of the second motor connector is configured to be removably in contact with the inverter module. The second end of the second motor connector is configured to be removably in contact with the second end of the first motor connector.

In a third aspect of the present invention, a motor connector for use with an electric compressor is provided. The electric compressor is configured to compress a refrigerant and includes a housing, an invertor module, a motor, and a compression device, the housing defining an intake volume, a discharge volume and an inverter cavity, the housing having a generally cylindrical shape and having a central axis, the housing defining a motor connector aperture located between the intake volume and the inverter cavity, the inverter module mounted inside the inverter cavity of the housing and adapted to convert direct current electrical power to alternating current electrical power. The motor has a plurality of motor windings and is mounted inside the housing. The compression device is coupled to the motor for receiving the refrigerant from the intake volume and compressing the refrigerant as the motor is rotated. The motor connector includes a motor connector housing, a first motor connector, and a second motor connector. The motor connector housing has an inverter end adjacent the inverter cavity and an intake end within the intake volume and is positioned within the motor connector aperture. The motor connector housing includes an internal wall having an intake side and an inverter side and is positioned between the inverter end and the intake end separating the intake volume and the inverter cavity. The first motor connector passes through the internal wall and has a first end located adjacent the intake side of the internal wall and a second end located adjacent the inverter side of the internal wall. One of the motor windings is electrically connected to the first end of the first motor connector. The second motor connector is coupled to the inverter module and is configured to be removably coupled to the second end of the first motor connector.

In a fourth aspect of the present invention, a method associated with a motor connector for use with an electric compressor is provided. The electric compressor is configured to compress a refrigerant and includes a housing, an invertor module, a motor, and a compression device. The housing defines an intake volume, a discharge volume and an inverter cavity. The housing has a generally cylindrical shape and a central axis. The housing defines a motor connector aperture located between the intake volume and the inverter cavity. The inverter module is mounted inside the inverter cavity of the housing and is adapted to convert direct current electrical power to alternating current electrical power. The motor has a plurality of motor windings and is mounted inside the housing. The compression device is coupled to the motor for receiving the refrigerant from the intake volume and compressing the refrigerant as the motor is rotated. The motor connector assembly includes a motor connector housing, a first motor connector, and a second motor connector. The motor connector housing has an inverter end adjacent the inverter cavity and an intake end within the intake volume and is positioned within the motor connector aperture. The motor connector housing includes an internal wall having an intake side and an inverter side and is positioned between the inverter end and the intake end separating the intake volume and the inverter cavity and defines a connector intake cavity. The first motor connector passes through the internal wall and has a first end located adjacent the intake side of the internal wall and a second end located adjacent the inverter side of the internal wall. One of the motor windings is electrically connected to the first end of the first motor connector. The second motor connector is coupled to the inverter module and is configured to be removably coupled to the second end of the first motor connector. The method includes the steps of (1) clamping the motor connector housing to a stator of the motor, (2) inserting the first connector into the connector housing, (3) filling the connector intake cavity with a potting material, (4) installing the motor into the housing, and, (5) closing the invertor module by installing an invertor cover.

BRIEF DESCRIPTION OF THE SEVERAL VIEWS OF THE DRAWINGS

These and other features and advantages of the present invention will become more readily appreciated when considered in connection with the following detailed description and appended drawings.

FIG. 24 is a partial flow diagram of an electric compressor with a motor connector assembly, according to an embodiment of the present invention.

DETAILED DESCRIPTION OF THE INVENTION

Figure 1:
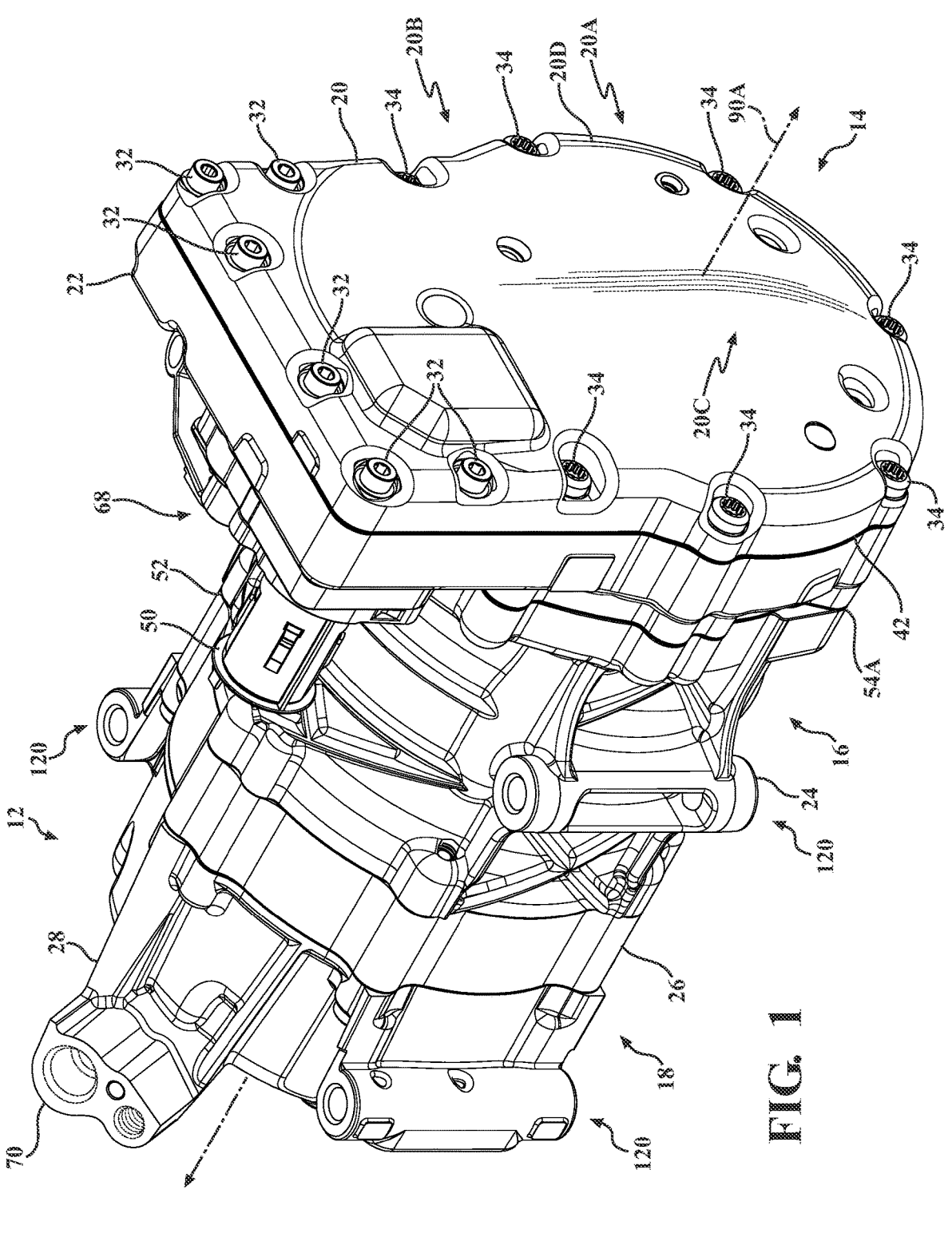
FIG. 1 is first perspective view an electric compressor, according to an embodiment of the present invention.

Referring to the figures, wherein like numerals indicate like or corresponding parts throughout the several views, an electric compressor 10 having an outer housing 12 is provided. The electric compressor 10 is particularly suitable in a motor vehicle, such as an automotive vehicle (not shown). The electric compressor 10 may be used as a cooling device or as a heating pump (in reverse) to heat and/or cool different aspects of the vehicle. For instance, the electric compressor 10 may be used as part of the heating, ventilation and air conditioning (HVAC) system in electric vehicles (not shown) to cool or heat a passenger compartment. In addition, the electric compressor 10 may be used to heat or cool the passenger compartment, on-board electronics and/or a battery used for powering the vehicle while the vehicle is not being operated, for instance, during a charging cycle. The electric compressor 10 may further be used while the vehicle is not being operated and while the battery is not being charged to maintain, or minimize the degradation, of the life of the battery. In the illustrated embodiment, the electric compressor 10 has a displacement of 57 cubic centimeters (cc). The displacement refers to the initial volume captured within the compression device as the scrolls of the compression device initially close or make contact (see below). It should be noted that the electric compressor 10 disclosed herein is not limited to any such volume and may be sized or scaled to meet particular required specifications.

In the illustrated embodiment, the electric compressor 10 is a compressor acts to compress a refrigerant rapidly and efficiently for use in different systems of a motor vehicle, for example, an electric or a hybrid vehicle. The electric compressor 10 may use a mixture of refrigerant and oil, throughout its operation, which may be referred to simply as "refrigerant".

The electric compressor includes 10 an inverter section 14, a motor section 16, and a compression device (or compression assembly) 18 contained within the outer housing 12. The outer housing 12 includes an inverter back cover 20, an inverter housing 22, a motor housing 24, a fixed scroll 26, and a front cover 28 (which may be referred to as the discharge head).

In a first aspect of the electric compressor 10 of the disclosure, an electric compressor 10 having a swing-link mechanism and drive shaft with an integrated limit pin is provided. In a second aspect of the electric compressor 10 of the disclosure, an electric compressor 10 with an oil separator is provided. In a third aspect of the electric compressor 10 of the disclosure, an electric compressor 10 having a scroll bearing oil injection, is provided. In a fourth aspect of the electric disclosure of the disclosure, an electric compressor 10 having a bearing oil communication hole is provided. In a fifth aspect of the present invention, an electric compressor 10 having a domed inverter cover is provided.

In one embodiment, the inverter back cover 20, the inverter housing 22, the motor housing 24, a fixed scroll 26, and the front cover 28 are composed from machined aluminum. The inverter 10 may be mounted, for example, within the body of a motor vehicle, via a plurality of mount points 120.

General Arrangement, and Operation, of the Electric Compressor 10

The inverter back cover 20 and the inverter housing 22 form an inverter cavity 30. The inverter back cover 20 is mounted to the inverter housing 22 by a plurality of bolts 32. The inverter back cover 20 and the inverter housing 22 are mounted to the motor housing 24 by a plurality of bolts 34 which extend through apertures 36 in the inverter back cover 20 and apertures 38 in the inverter housing 22 and are threaded into threaded apertures 40 in the motor housing 24. An inverter gasket 42, positioned between the inverter back cover 20 and the inverter housing 22 keeps moisture, dust, and other contaminants from the internal cavity 30. A motor gasket 54A is positioned between the inverter housing 22 and the motor housing 24 to provide maintain a refrigerant seal to the environment.

Figure 11:
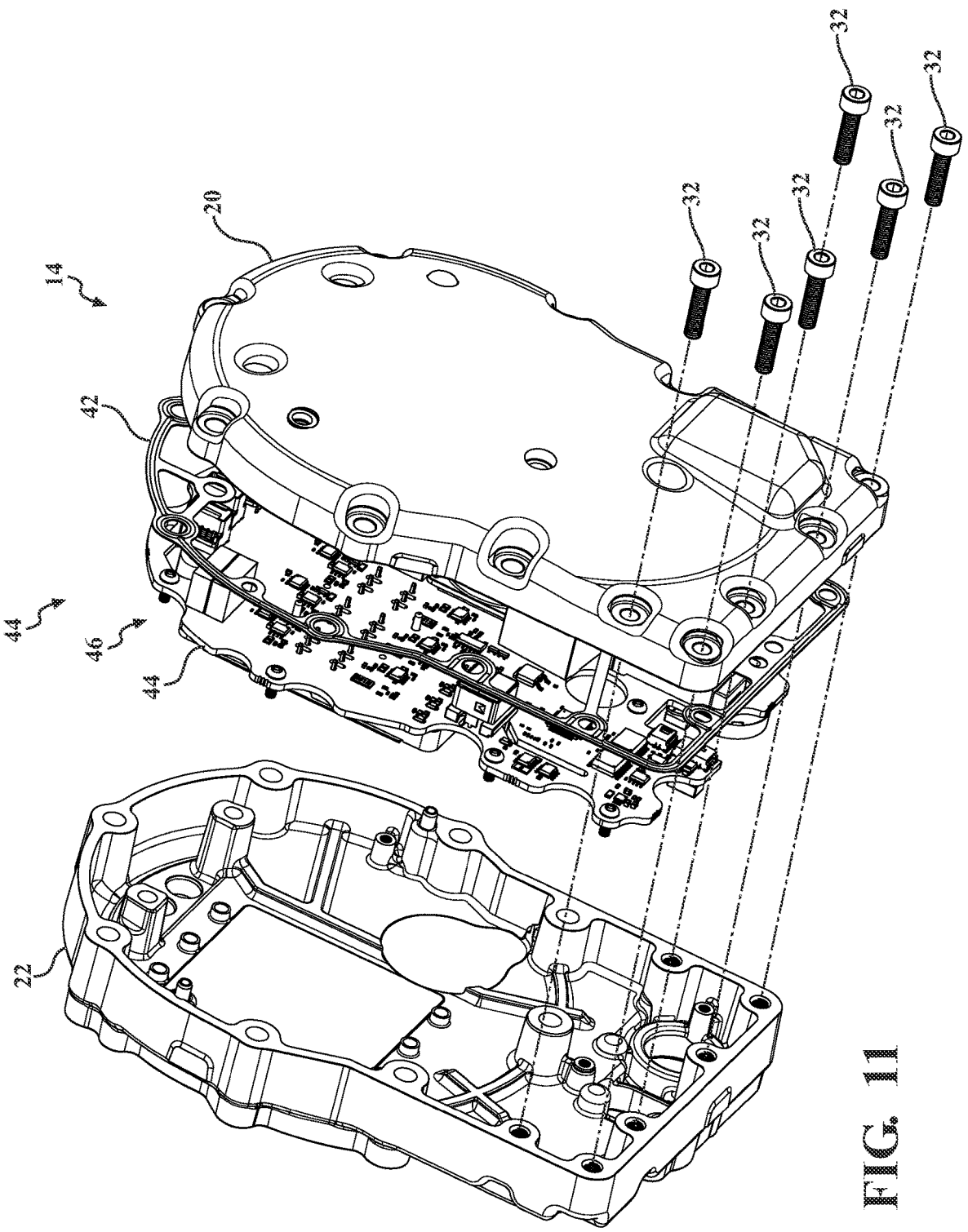
FIG. 11 is an exploded view of an inverter of the electric compressor of FIG. 1.

With reference to FIG. 11, an inverter module 44 mounted within the inverter cavity 30 formed by the inverter back cover 20 and the inverter housing 22. The inverter module 44 includes an inverter circuit 46 mounted on a printed circuit board 48, which is mounted to the inverter housing 22. The inverter circuit 46 converts direct current (DC) electrical power received from outside of the electric compressor 10 into three-phase alternating current (AC) power to supply/power the motor 54 (see below). The inverter circuit 46 also controls the rotational speed of the electric compressor 10. High voltage DC current is supplied to the inverter circuit 46 via a high voltage connector 50. Low voltage DC current to drive the inverter circuit 46, as well as control signals to control operation of the inverter circuit 46, and the motor section 16, is supplied via a low voltage connecter 52.

Figure 12:
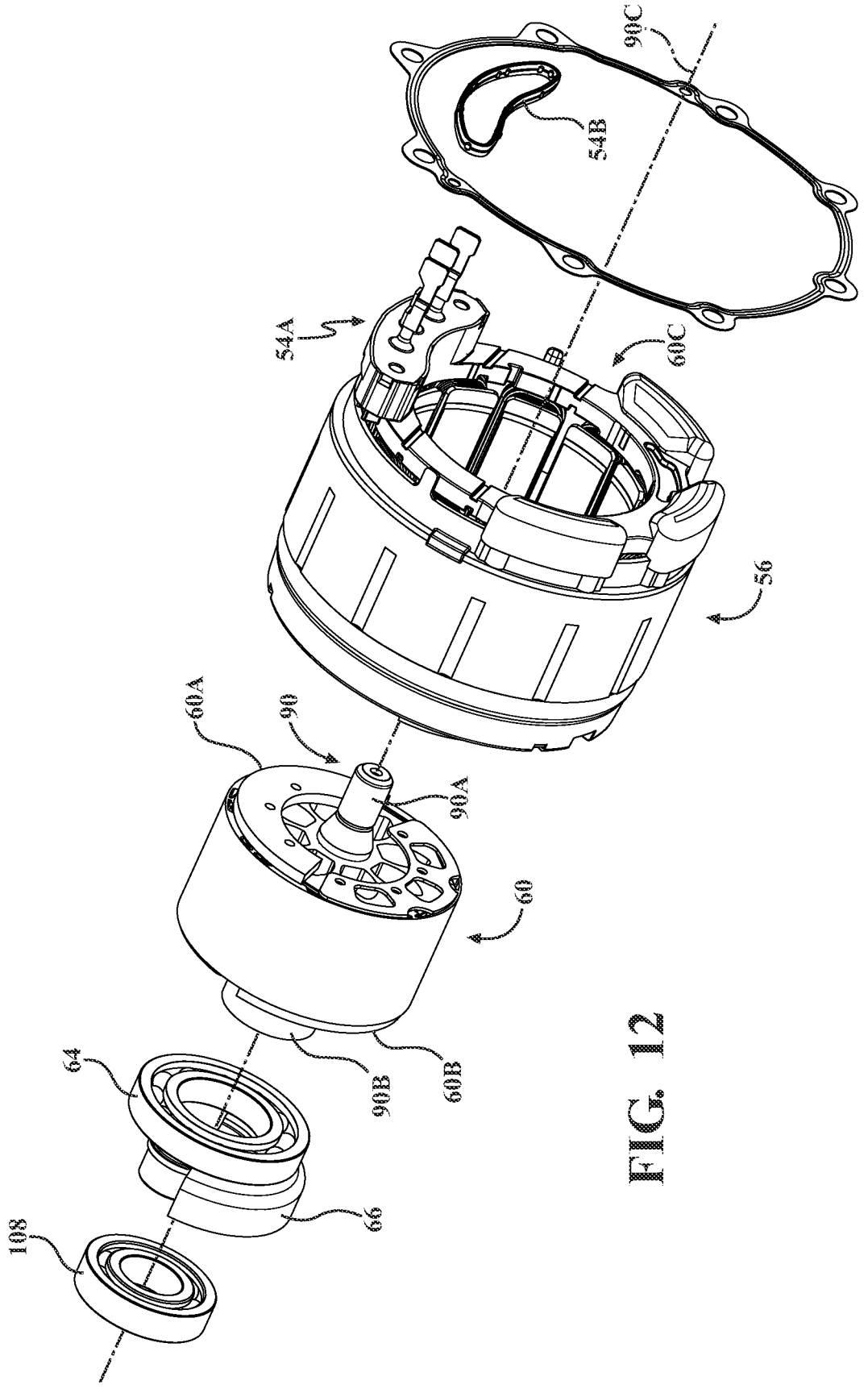
FIG. 12 is an exploded view of a portion of the electric compressor of FIG. 1, including a motor and drive shaft.

The motor section 16 includes a motor 54 located within a motor cavity 56. The motor cavity 56 is formed by a motor side 22A of the inverter housing 22 and an inside surface 24A of the motor housing 22. With specific reference to FIG. 12, the motor 54 is a three-phase AC motor having a stator 56. The stator 56 has a generally hollow cylindrical shape with six individual coils (two for each phase). The stator 56 is contained within, and mounted to, the motor housing 22 and remains stationery relative to the motor housing 22.

The motor 54 includes a rotor 60 located within, and centered relative to, the stator 58. The rotor 60 has a generally hollow cylindrical shape and is located within the stator 56. The rotor 60 has a number of balancing counterweights 60A, 60B, affixed thereto. The balancing counterweights balance the motor 54 as the motor 54 drives the compression device 18 and may be machined from brass.

Power is supplied to the motor 54 via a set of terminals 54A which are sealed from the motor cavity 56 by an O-ring 54B.

A drive shaft 90 is coupled to the rotor 60 and rotates therewith. In the illustrated embodiment, the draft shaft 90 is press-fit within a center aperture 60C of the rotor 60. The drive shaft 90 has a first end 90A and a second end 90B. The inverter housing 22 includes a first drive shaft supporting member 22B located on the motor side of the inverter housing 22. A first ball bearing 62 located within an aperture formed by the first drive shaft supporting member 22 supports and allows the first end of the drive shaft 90 to rotate. The motor housing 24 includes a second drive shaft supporting member 24A. A second ball bearing 64 located within an aperture formed by the second drive shaft supporting member 24A allows the second end 90B of the drive shaft 90 to rotate. In the illustrated embodiment, the first and second ball bearing 62, 64 are press-fit with the apertures formed by the first drive shaft supporting member 22 of the inverter housing 22 and the second drive shaft supporting member 24A of the motor housing 24, respectively.

As stated above, the electric compressor 10 is a compressor. The compression device 18 includes the fixed scroll 26 and an orbiting scroll 66. The orbiting scroll 66 is fixed to the second end of the rotor 60B. The rotor 60 with the drive shaft 90 rotate to drive the orbiting scroll 64 motion under control of the inverter module 44 rotate.

With reference to FIGS. 14A, 14B, 16A and 16B, the drive shaft 90 has a central axis 90C around which the rotor 60 and the drive shaft 90 are rotated. The orbiting scroll 66 moves about the central axis 90C in an eccentric orbit, i.e., in a circular motion while the orientation of the orbiting scroll 66 remains constant with respect to the fixed scroll 26. The center of the orbiting scroll 66 is located along an offset axis 90D of the drive shaft 90 defined by an orbiting scroll aperture (or drive pin location 90E (see FIG. 14A) located at the second end 90D of the drive shaft 90. As the drive shaft 90 is rotated by the motor 54, the orbiting scroll 66 follows the motion of the orbiting scroll aperture 90E through the drive pin 162 and drive hub on the swinglink mechanism 124 and bearing 108 as the drive shaft 90 is rotated about the central axis 60C.

Figure 2:
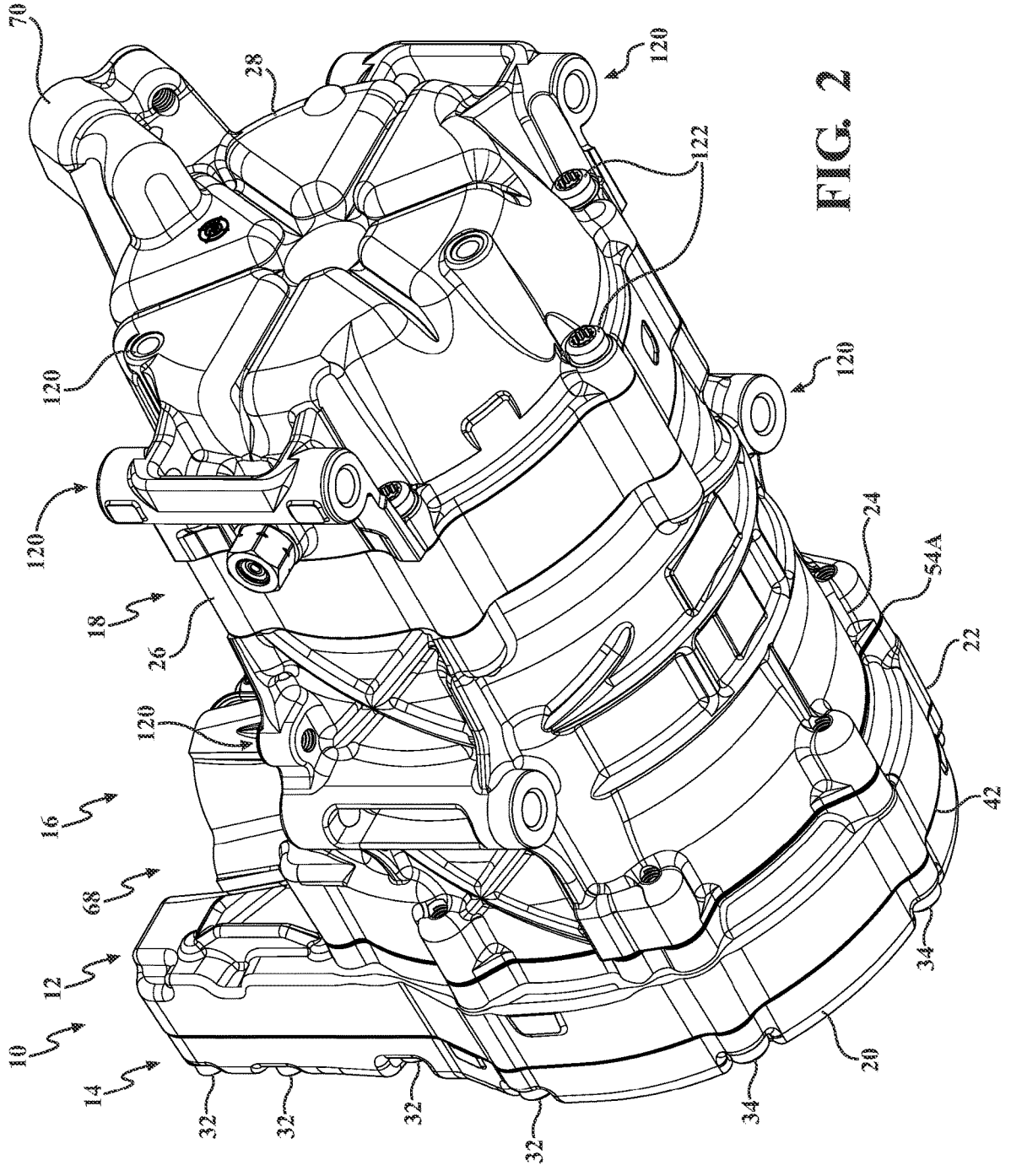
FIG. 2 is a second perspective view of the electric compressor of FIG. 1.
Figure 9:
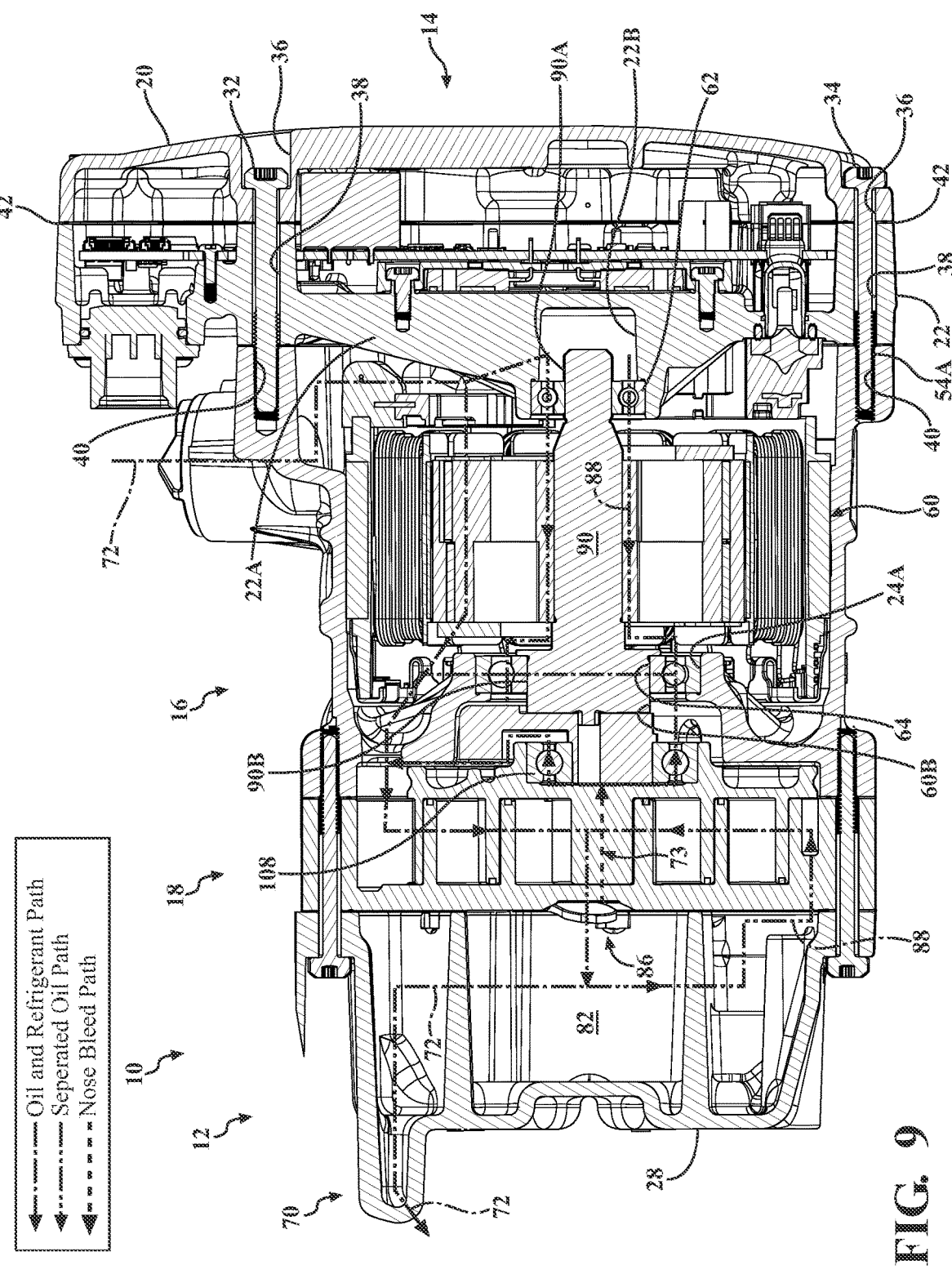
FIG. 9 is a first cross-sectional view of the electric compressor of FIG. 1.
Figure 10:
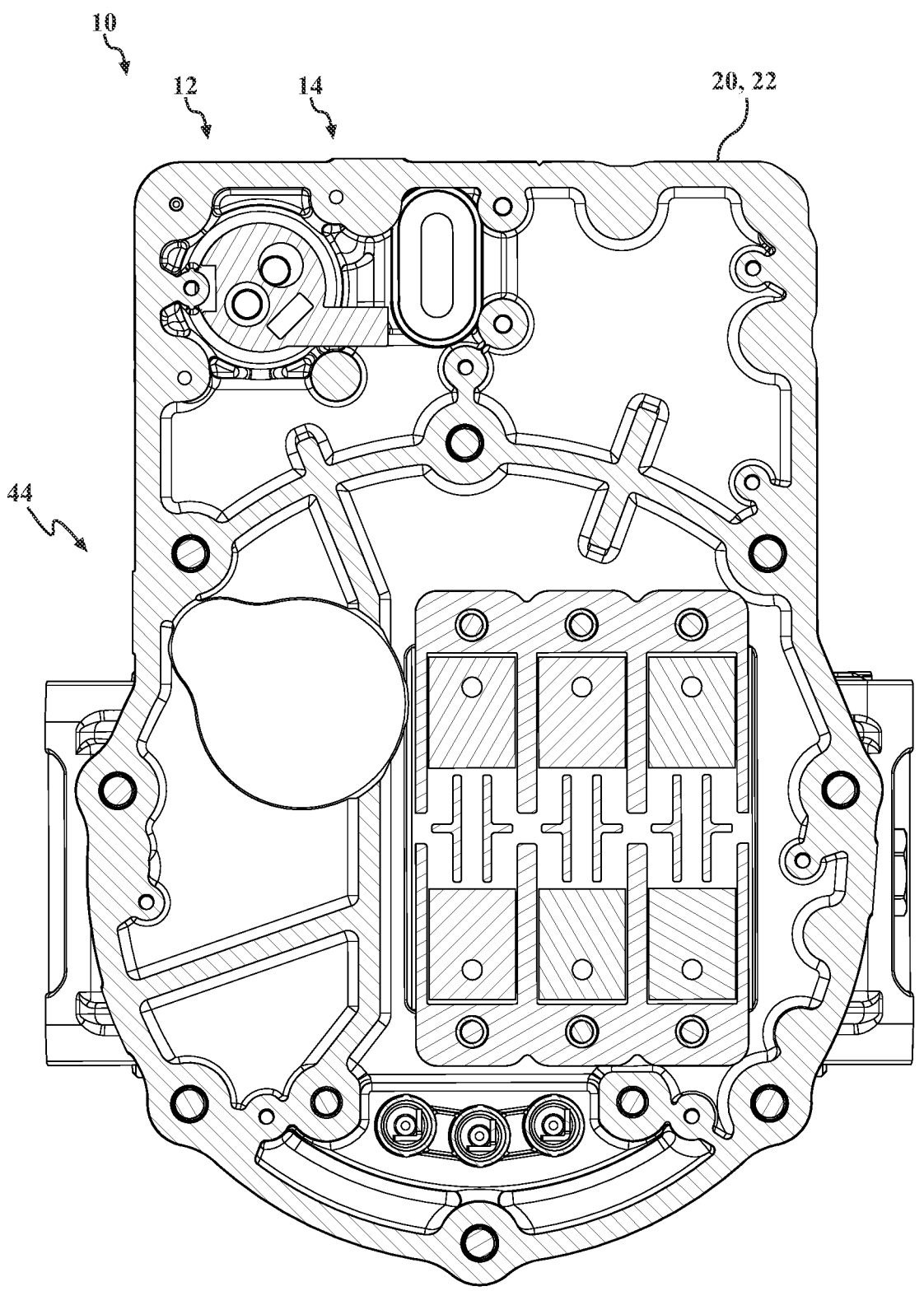
FIG. 10 is a second cross-sectional view of the electric compressor of FIG. 1.

With specific reference to FIGS. 1, 2 and 9, intermixed refrigerant and oil (at low pressure) enters the electric compressor 10 via a refrigerant inlet port 68 and exits the electric compressor 10 (at high pressure) via refrigerant outlet port 70 after being compressed by the compression device 18. As shown in the cross-sectional view of FIG. 9, the refrigerant follows the refrigerant path 72 through the electric compressor 10. As shown, refrigerant enters the refrigerant inlet port 68 and enters an intake volume 74 formed between the motor side 22A of the inverter housing 22 and motor housing 24 adjacent the refrigerant inlet port 68. Refrigerant is then drawn through the motor section 16 and enters a compression intake volume 76 formed between an internal wall of the fixed scroll 26 and the orbiting scroll 66 (demonstrated by arrow 92 in FIG. 14A).

Figure 13:
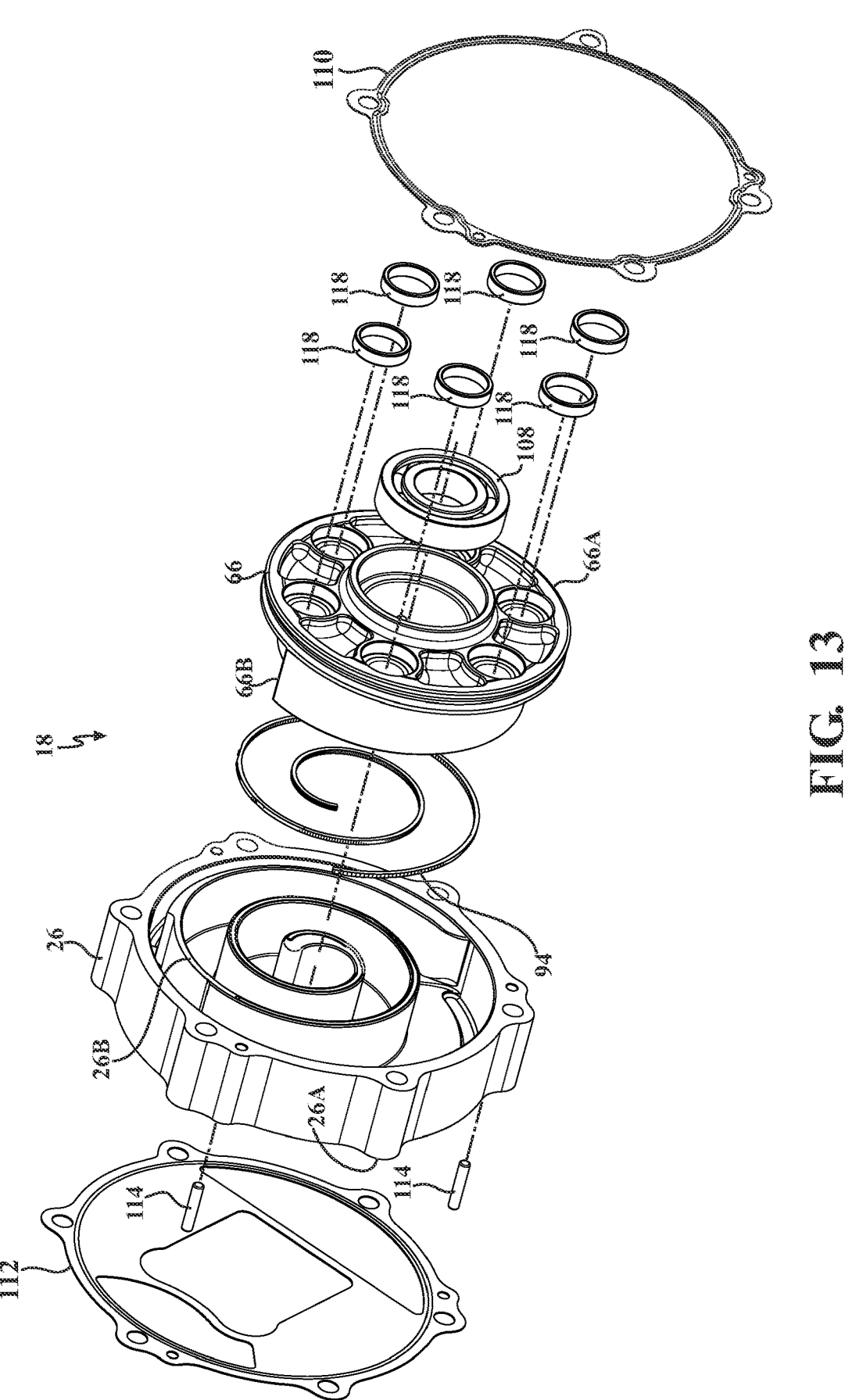
FIG. 13 is an exploded view of a compression device of the electric compressor of FIG. 1.
Figure 14A:
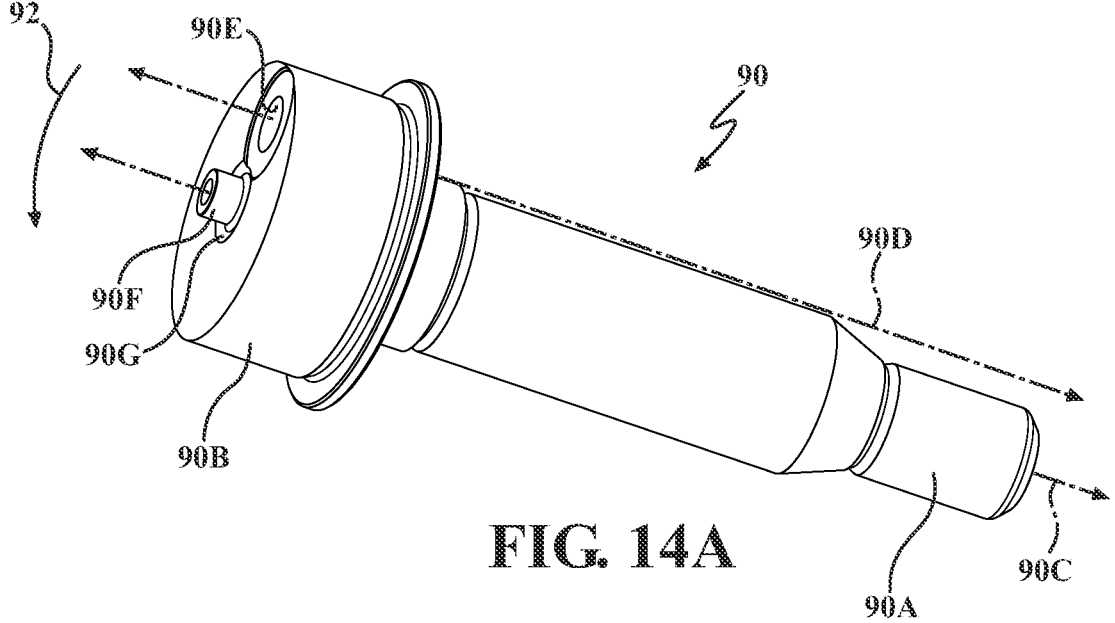
FIG. 14A is a first perspective view of a drive shaft of FIG. 12.
Figure 14B:
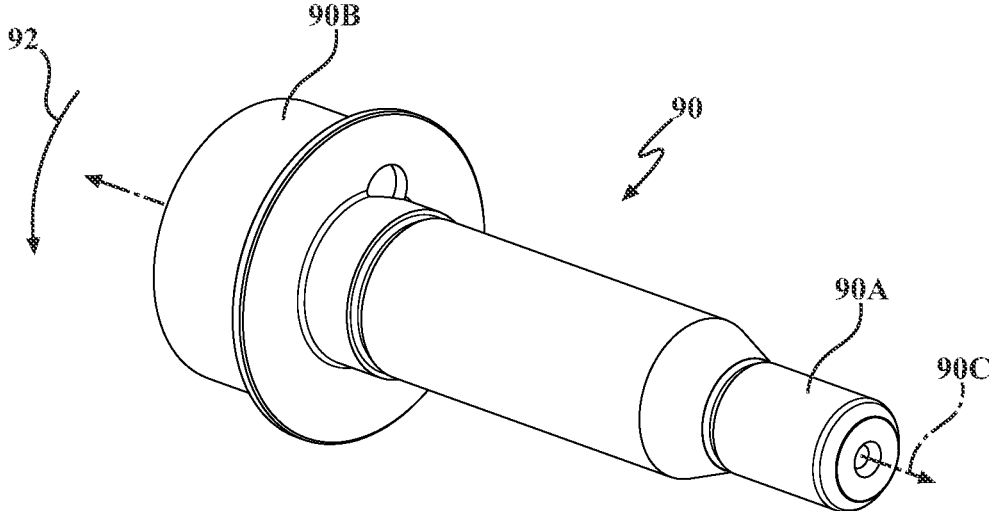
FIG. 14B is a second perspective view of the drive shaft of FIG. 14A.
Figure 15A:
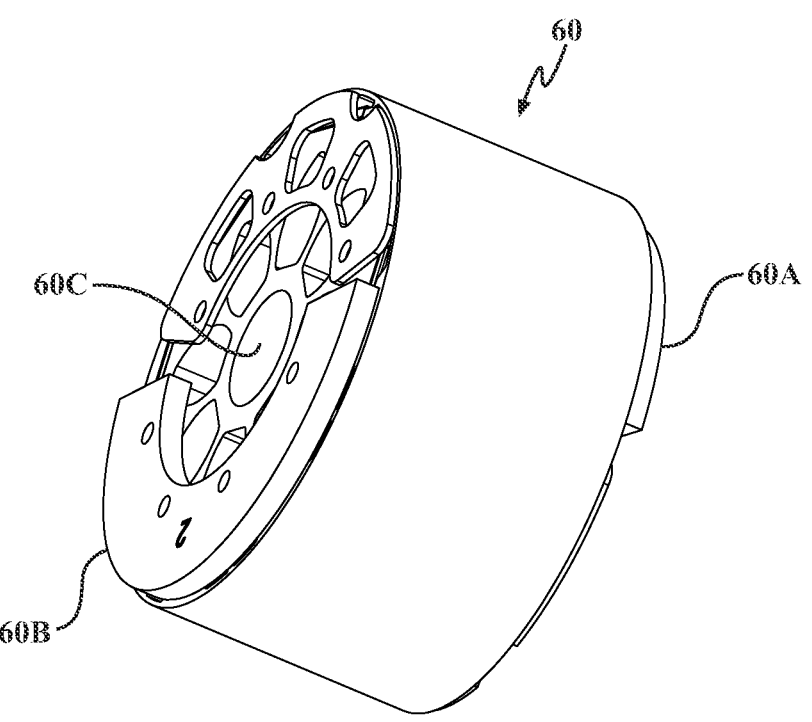
FIG. 15A is a first perspective view of a rotor and counterweights of the motor of FIG. 12.
Figure 15B:
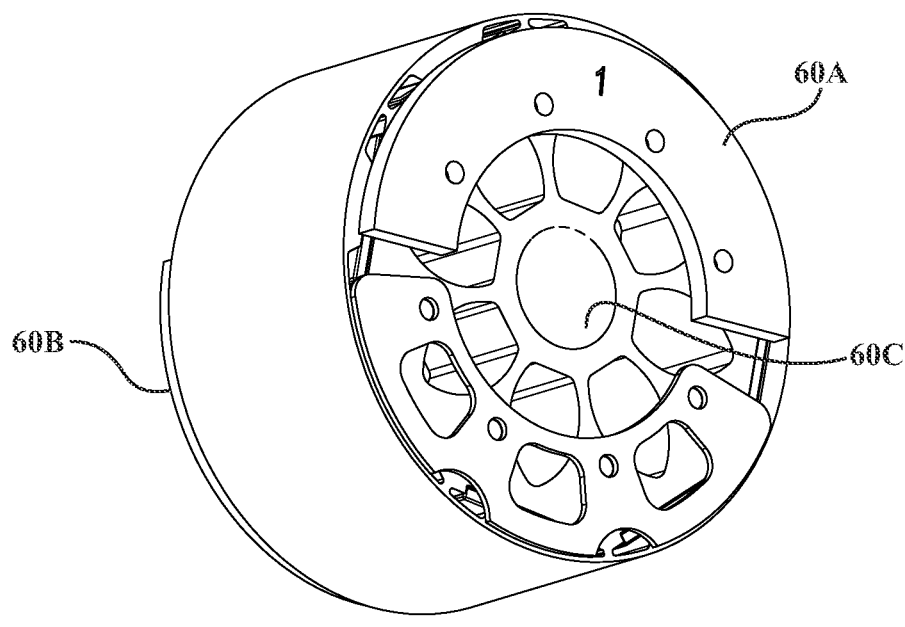
FIG. 15B is a second perspective view of the rotor and counterweights of FIG. 15A.
Figure 16A:
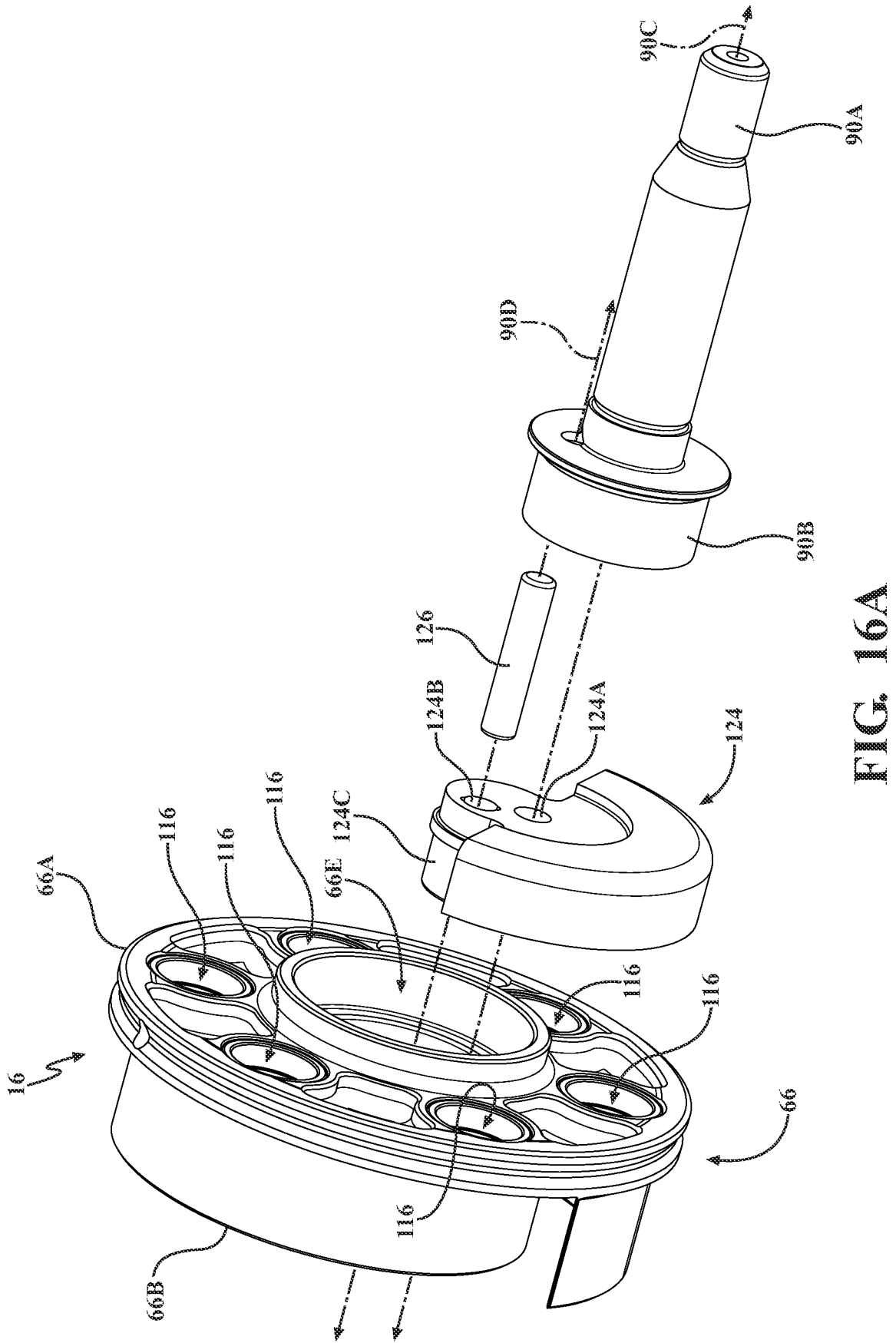
FIG. 16A is a first perspective view of a portion of the electric compressor of FIG. 1, including an orbiting scroll, drive pin and swing-link mechanism.
Figure 16B:
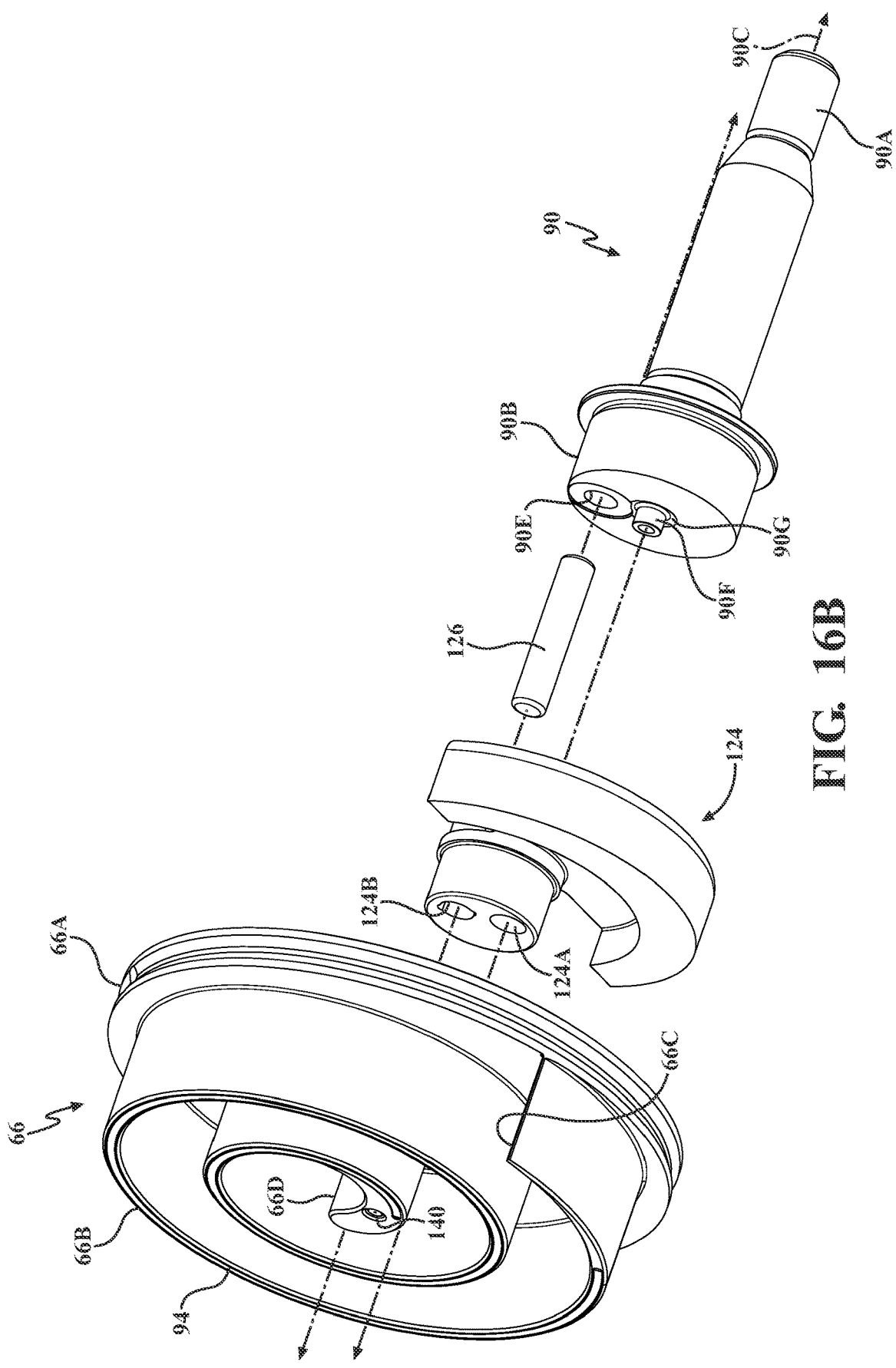
FIG. 16B is a second perspective view of the portion of the electric compressor of FIG. 16A.

As shown in FIGS. 9 and 13, the fixed scroll 26 has a fixed scroll base 26A and a fixed scroll lap 26B extending away from the fixed scroll base 26A towards the orbiting scroll 66. As shown in FIGS. 16A-16B, the orbiting scroll 66 has an orbiting scroll base 66A and a orbiting scroll lap 66B extending from the orbiting scroll base 66A towards the fixed scroll 26. The laps 26A, 66A have a tail end 26C, 66C adjacent an outer edge of the respective scroll 26A, 66B and scroll inward towards a respective center end 26D, 66D.

Respective tip seals 94 are located within a slot 26E, 66E located at a top surface of the fixed scroll 26 and the orbiting scroll 66, respectively. The tip seals 94 are comprised of a flexible material, such as a Polyphenylene Sulfide (PPS) plastic. When assembled, the tip seals 94 are pressed against the opposite base 26A 66A to provide a seal therebetween. In one embodiment, the slots 26E 66E, are longer than the length of the tip seals 94 to provide room for adjustment/movement along the length of the tip seals 94.

With reference to FIGS. 17A-17I, intermixed refrigerant enters the compression device 12 from the compression intake volume 76. In FIGS. 17A-17I, a cross-section view of the fixed scroll 16 shown and the top of the orbiting scroll 66 are shown.

As discussed in detail below, the fixed scroll lap 16A and the orbiting scroll lap 66A form compression chambers 80 in which low or unpressurized (saturation pressure) refrigerant enters from the compression device 12. As the orbiting scroll 66 moves to enable the compression chambers 80 to be closed off and the volume of the compression chambers 80 is reduced to pressurize the refrigerant. At any one time during the cycle, one or more compression chambers 80 are at different stages in the compression cycle. The below description relates just to one set of compression chambers 80 during a complete cycle of the electric compressor 10.

The refrigerant enters the compression chambers 80 formed between the orbiting scroll lap 66A and the fixed scroll lap 26A. During a cycle of the compressor 10, the refrigerant is transported towards the center of these chambers. The orbiting scroll 66 orbits in a circular motion indicated by arrow 78 formed by the relative position of the orbiting scroll 66 relative to the fixed scroll 26 is shown during one cycle of the electric compressor 10.

Figure 17A:
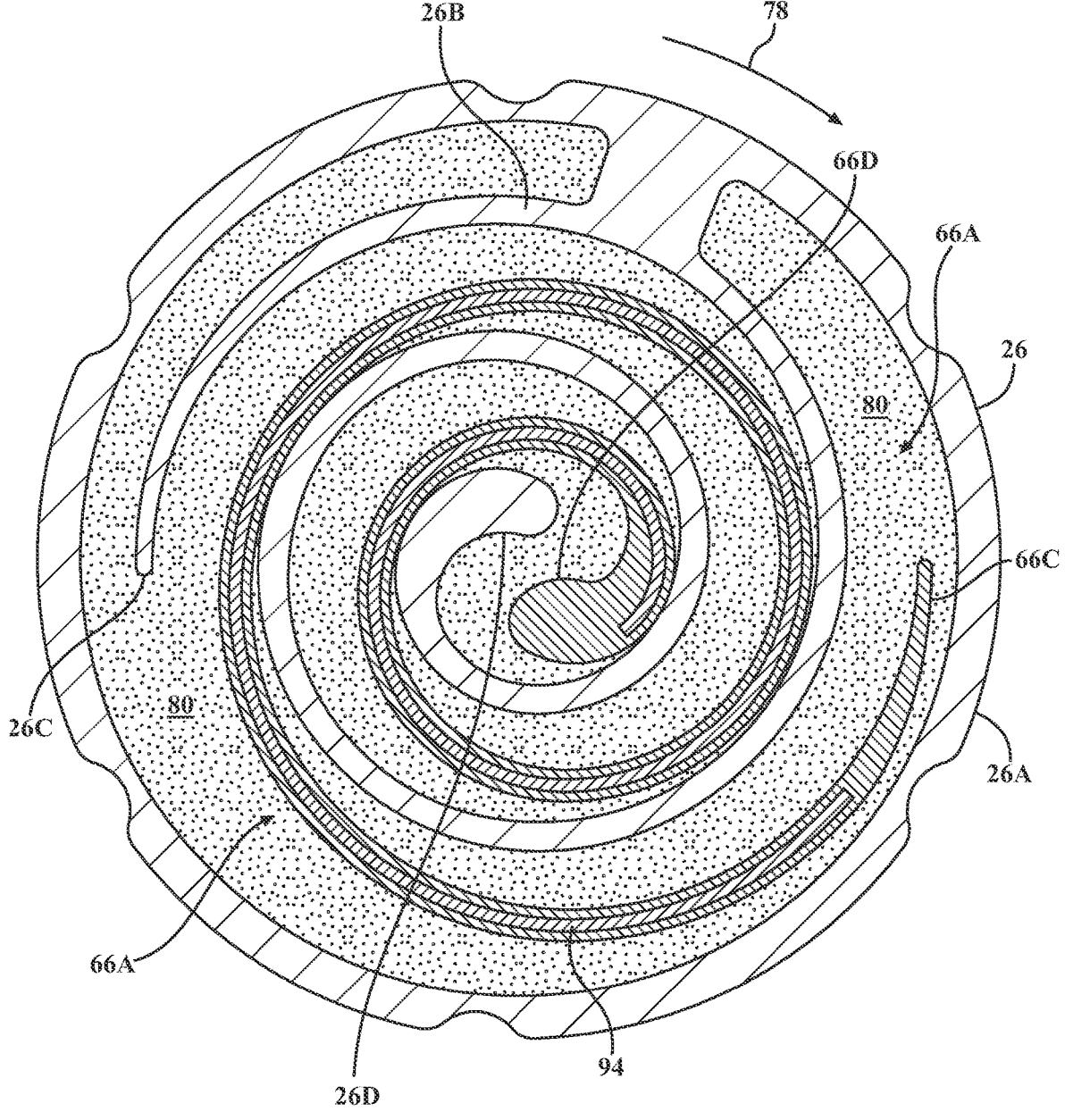
FIGS. 17A-17J are graphic representations of a fixed scroll and an orbiting scroll of a compression device of the electric compressor of FIG. 1, according to an embodiment of the present invention.
Figure 17B:
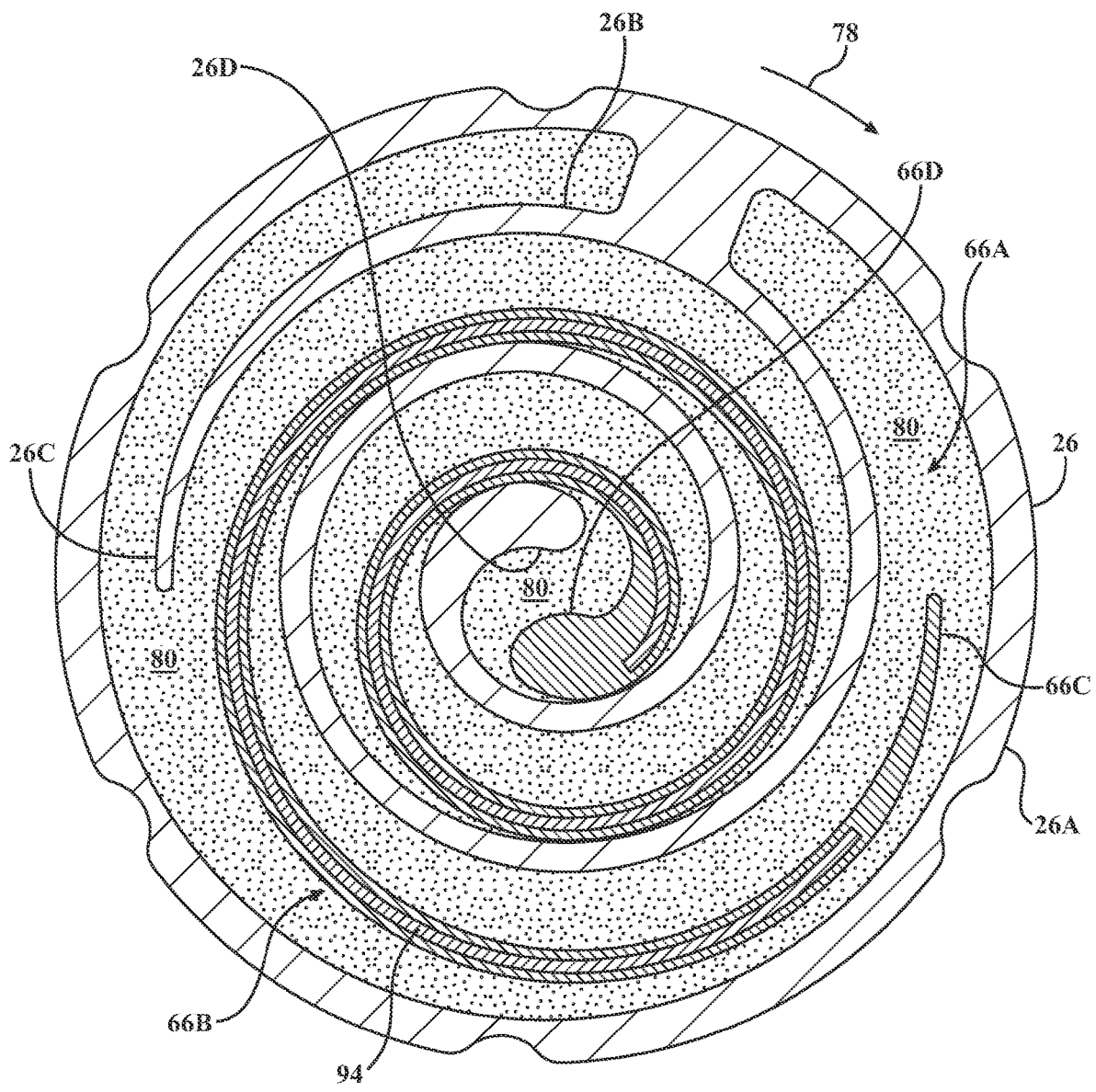
Figure 17C:
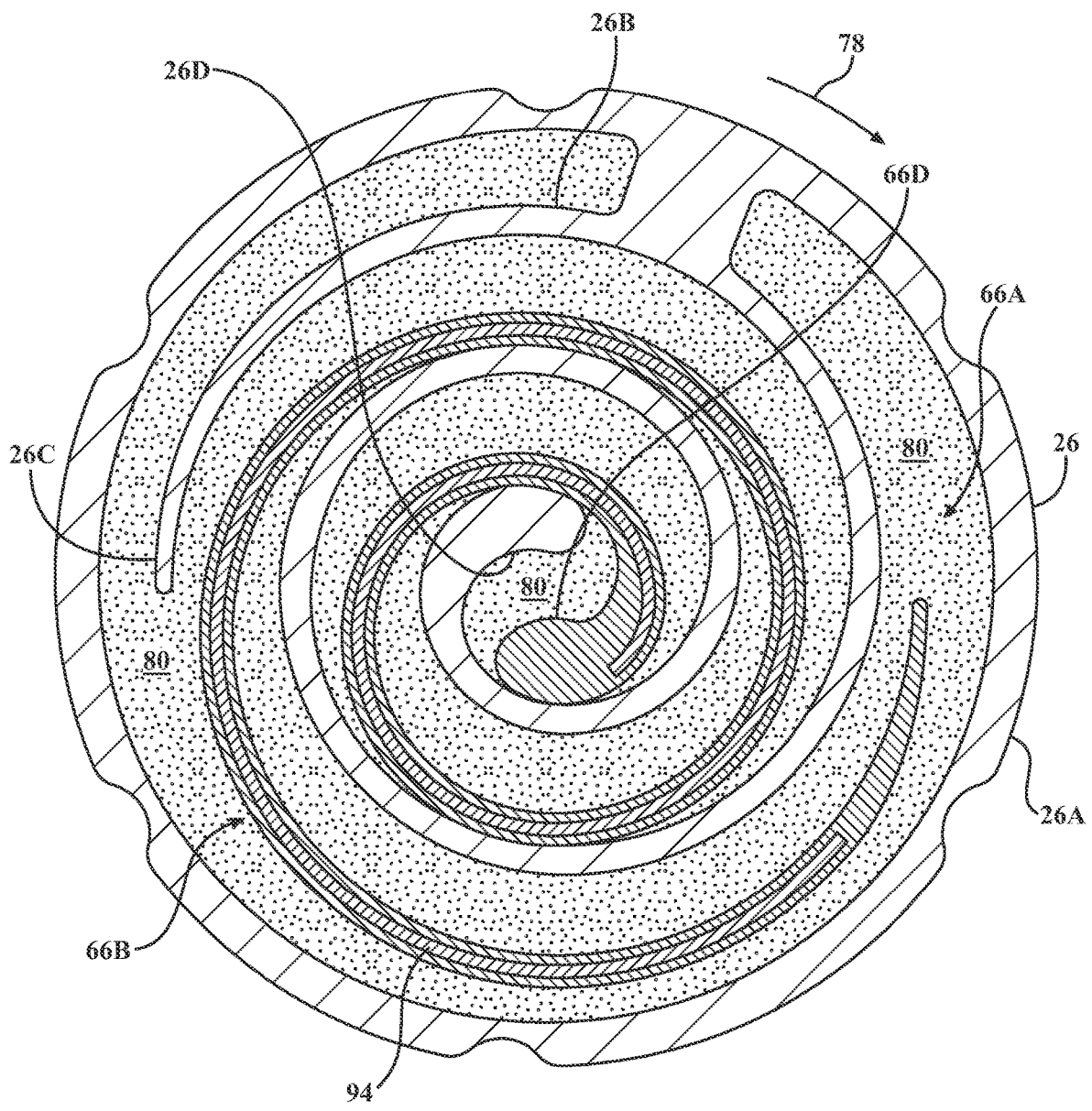
Figure 17D:
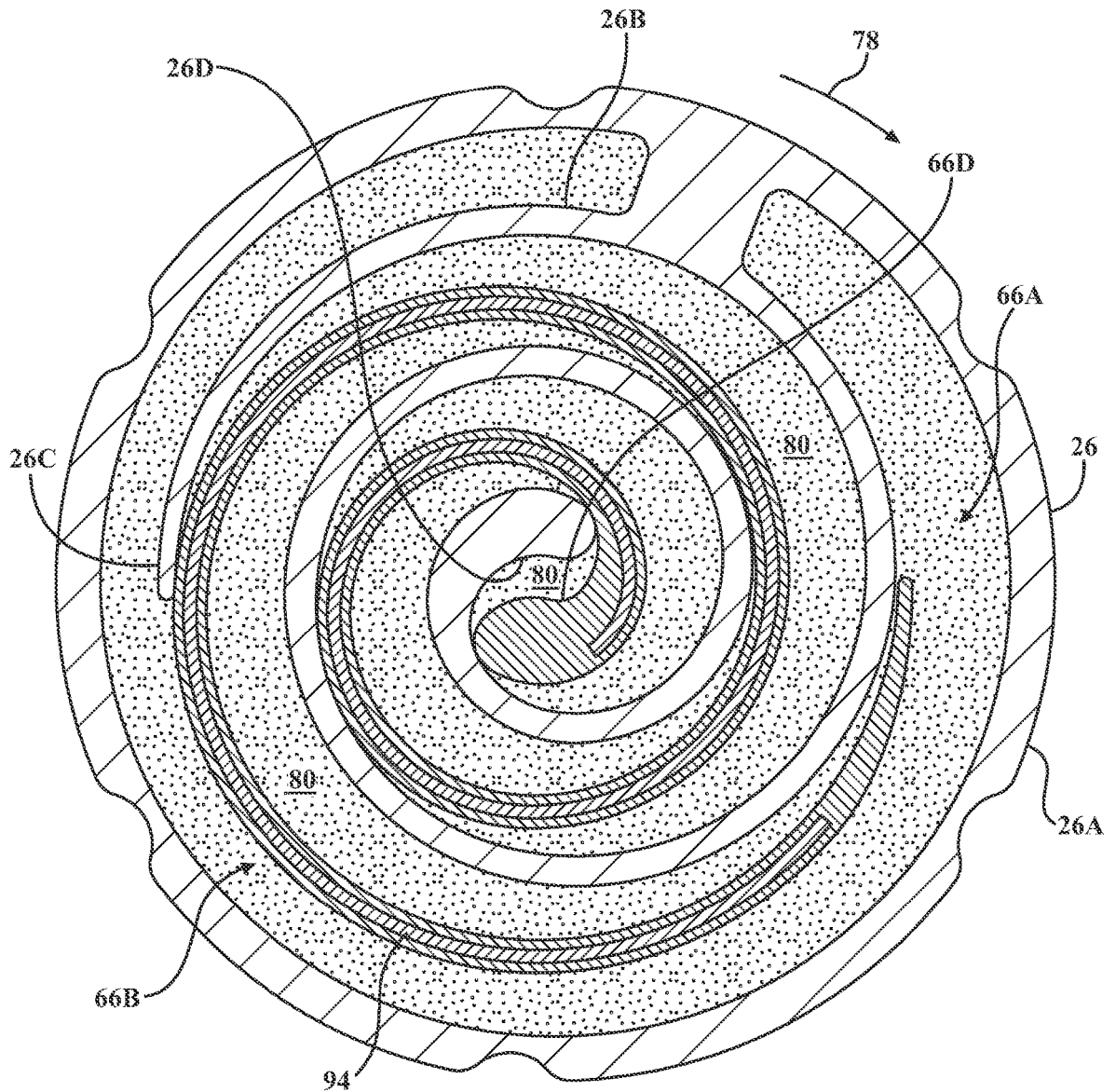
Figure 17E:
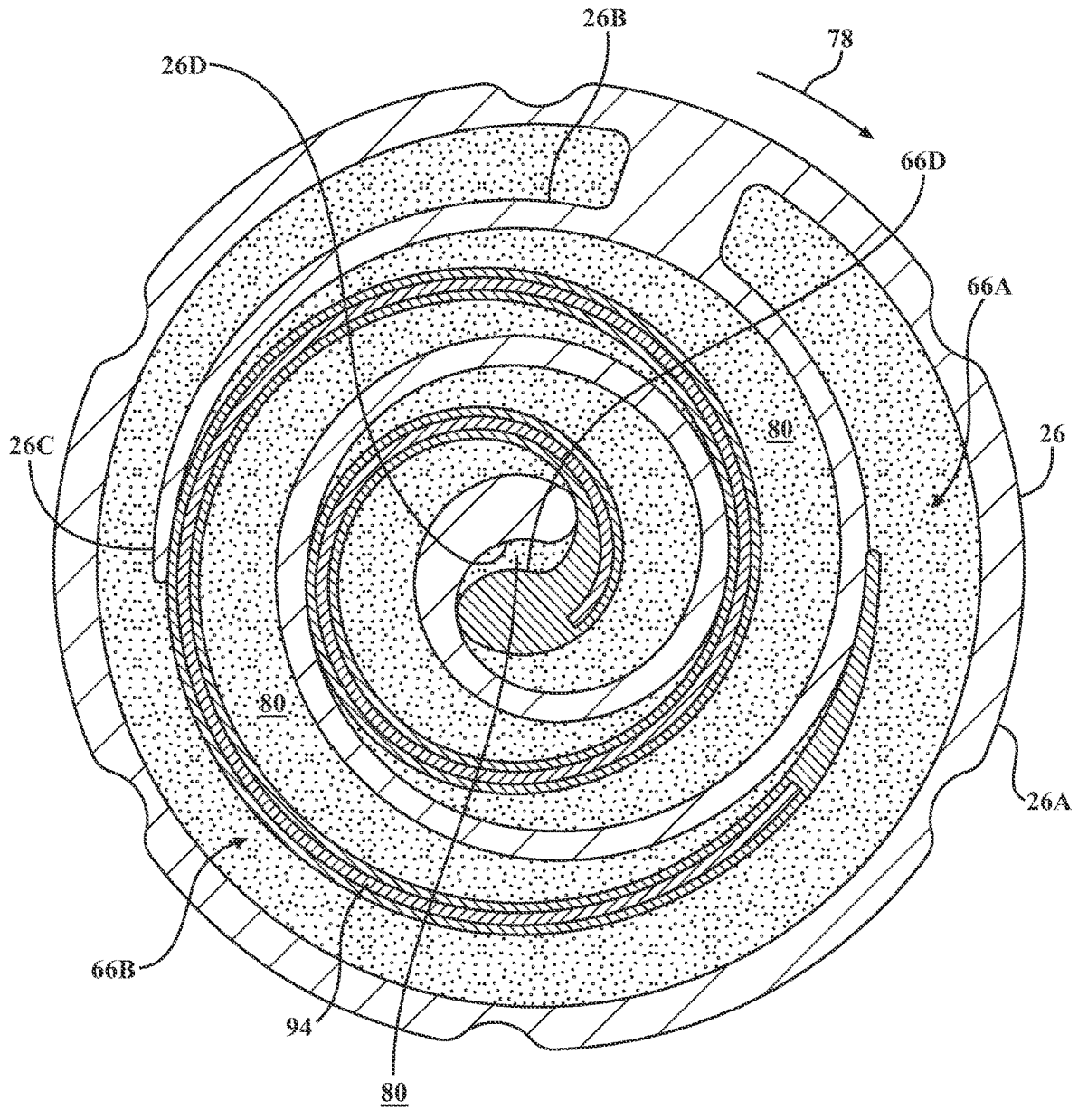
Figure 17F:
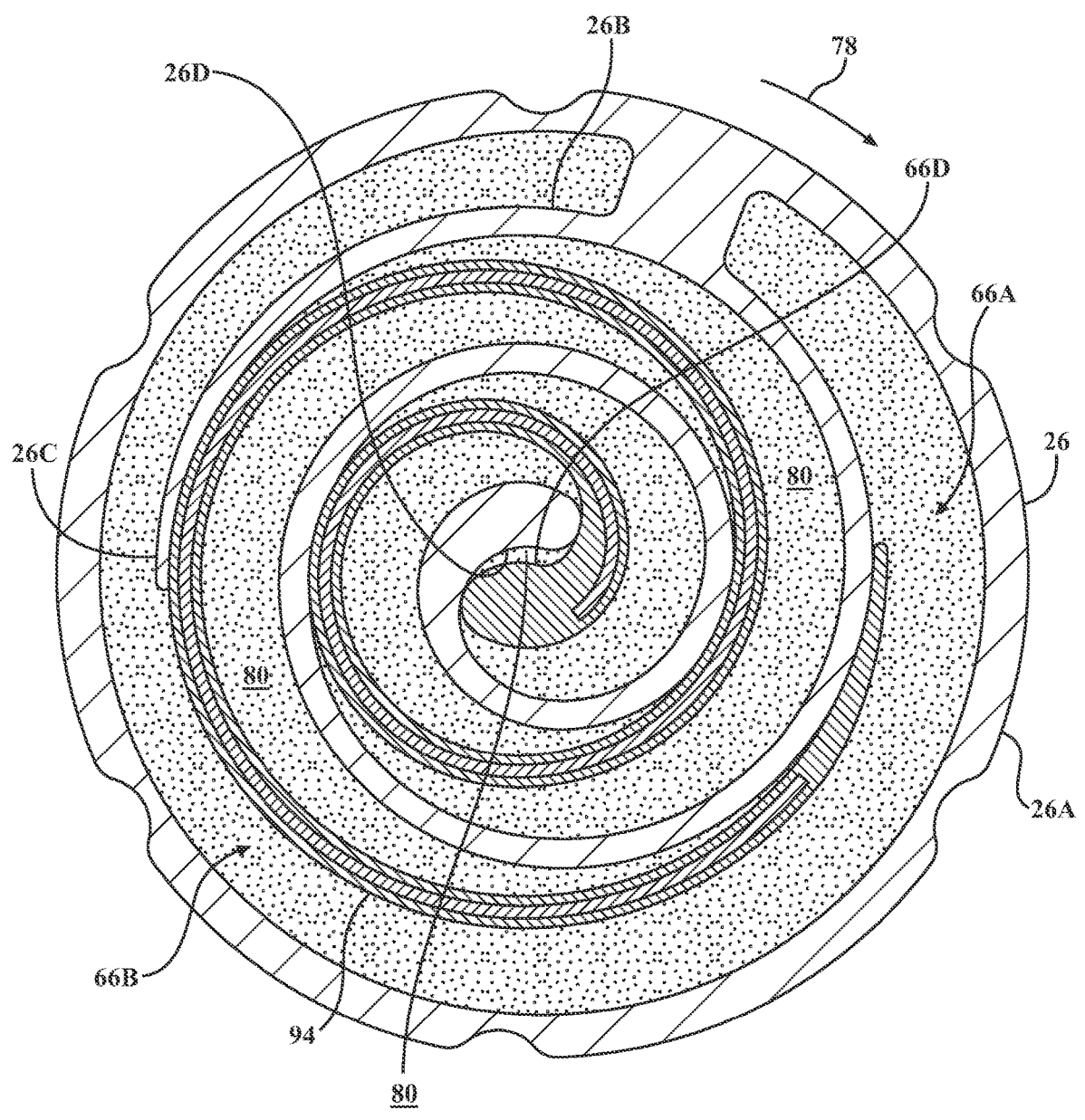
Figure 17G:
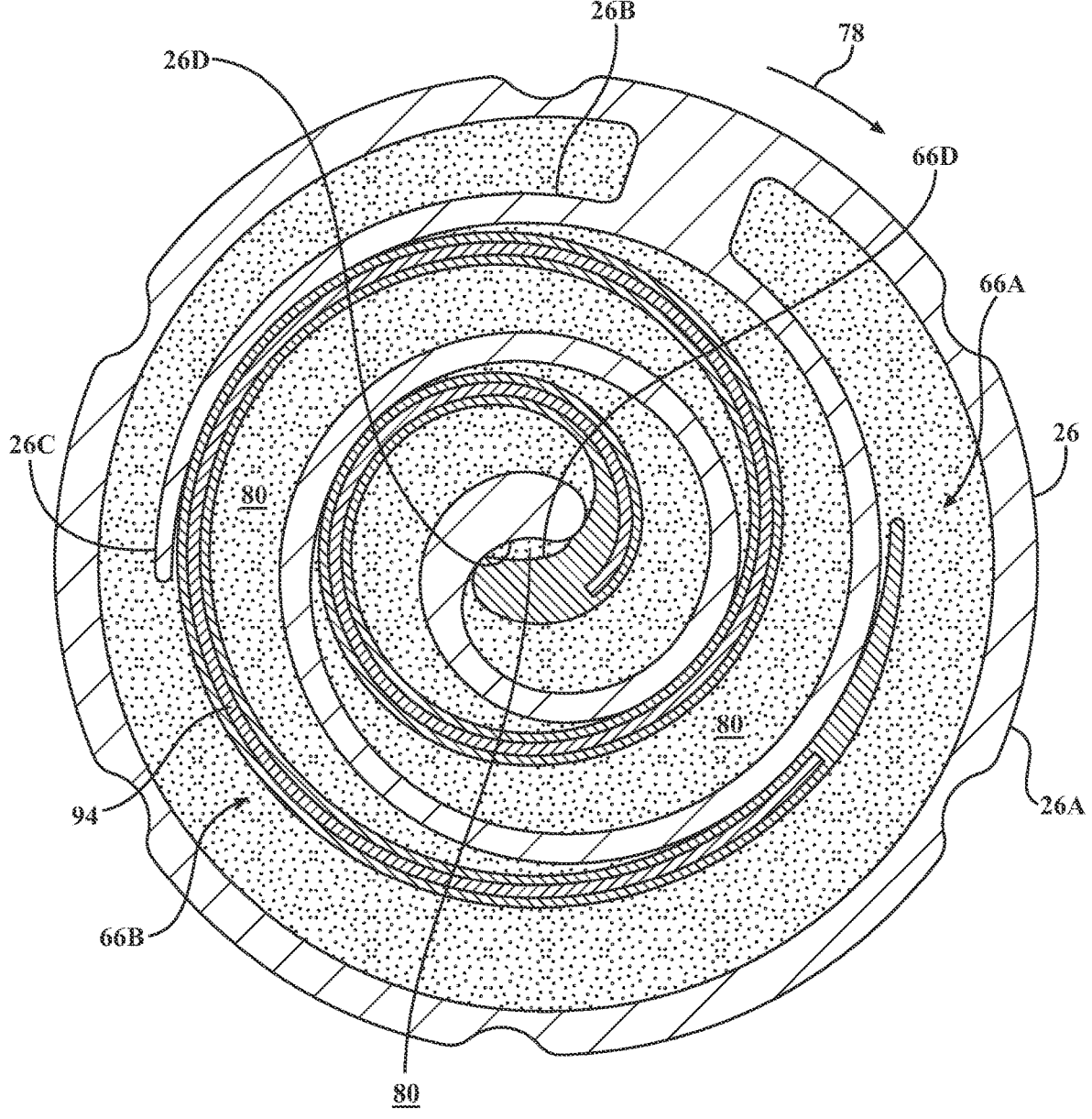
Figure 17H:
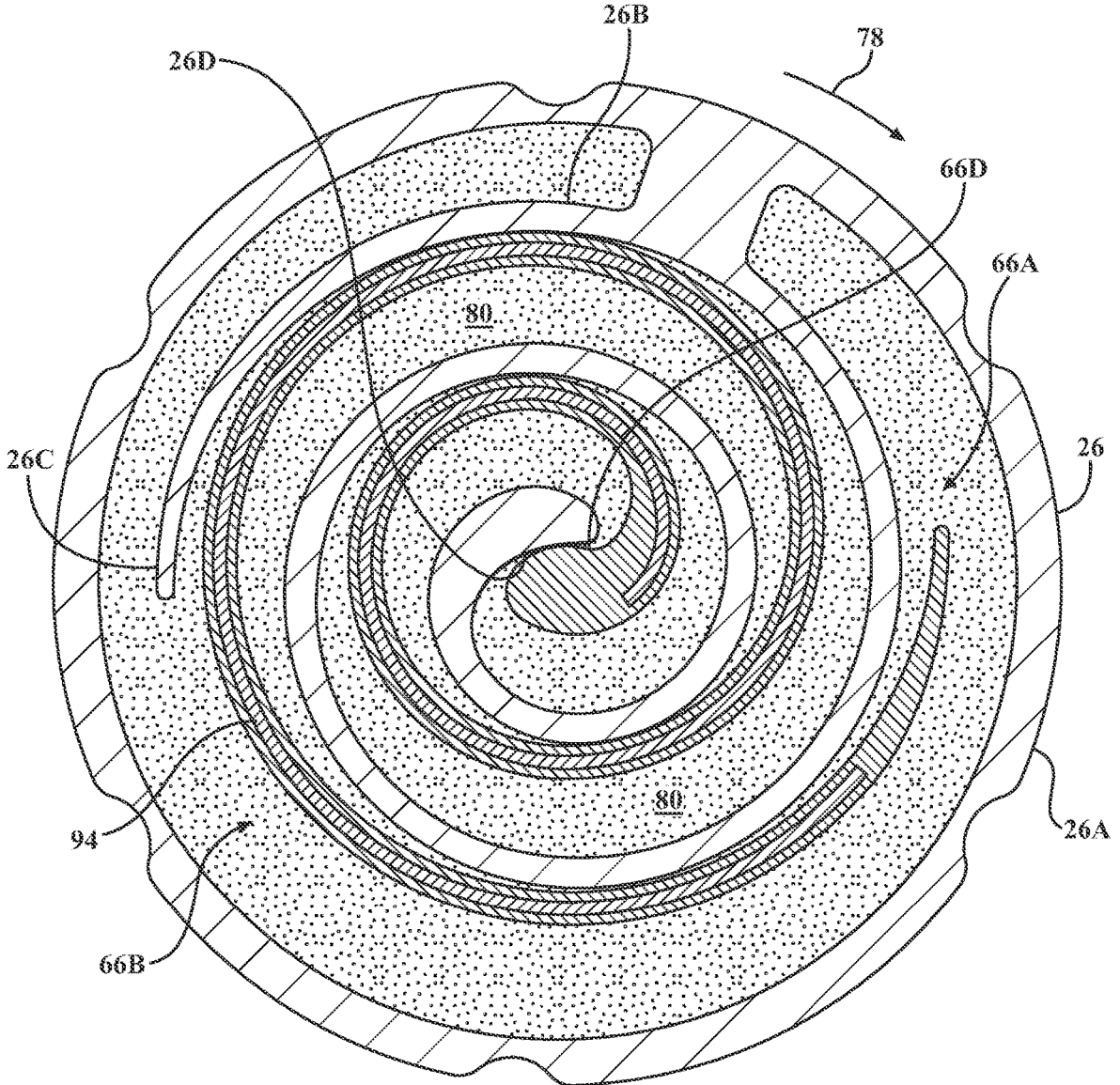
Figure 17I:
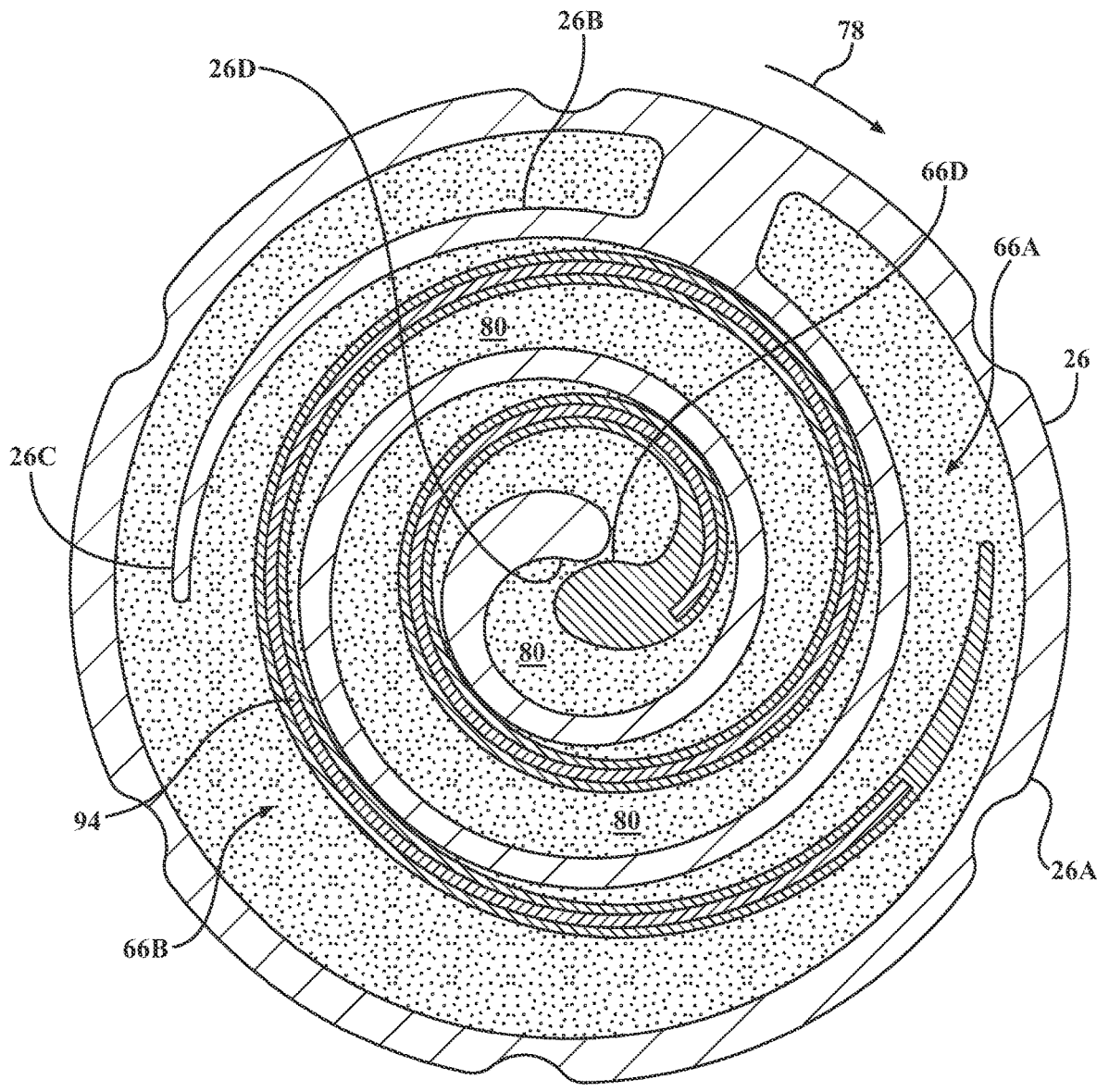
Figure 17J:
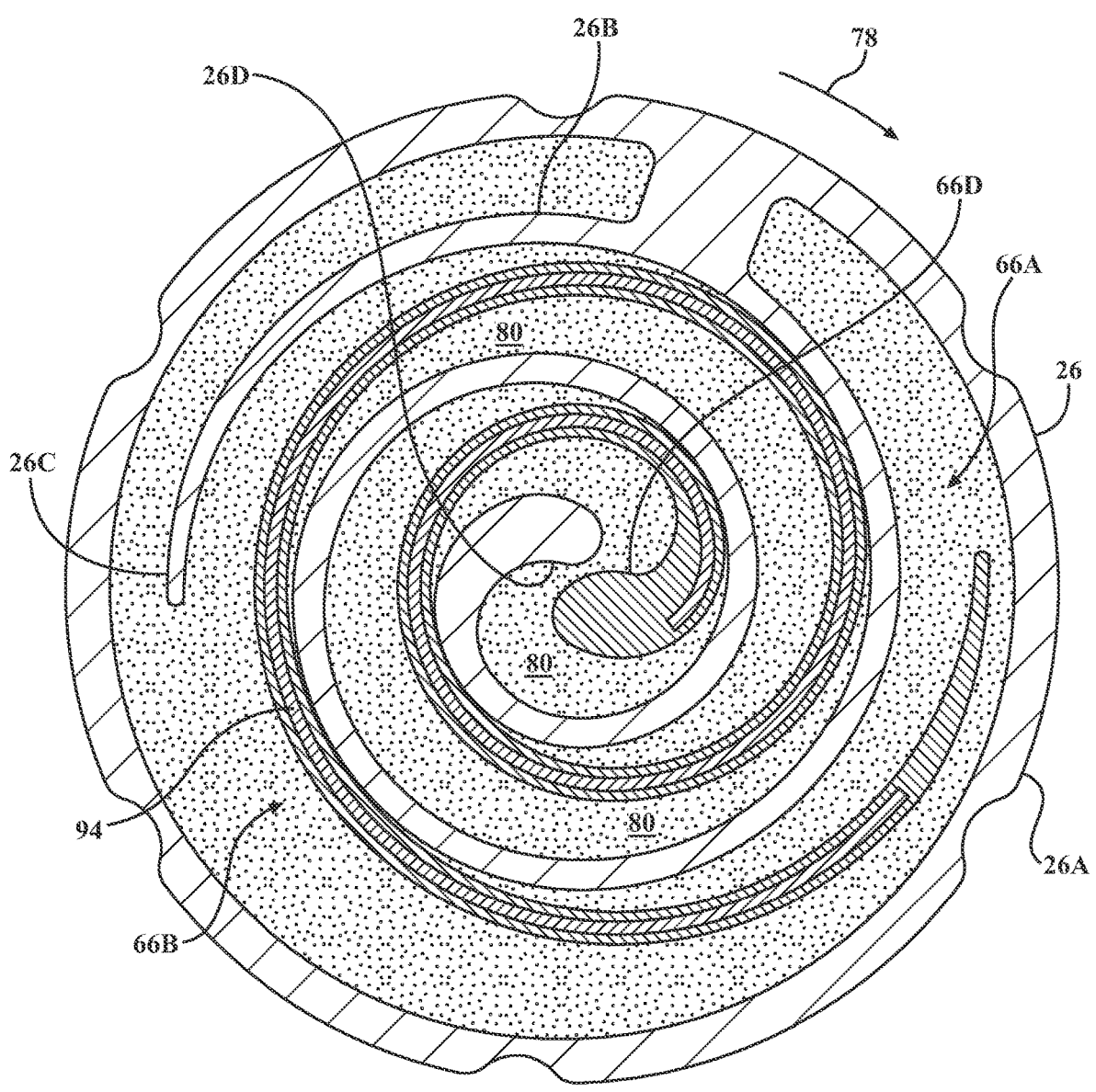

In FIG. 17A, the position of the orbiting scroll 66 at the beginning of a cycle is shown. As shown, in this initial position, the tail ends 16B, 66B are spaced apart from the other scroll lap 66BA 16. At this point, the compression chambers 80 are open to the compression intake volume 76 allowing refrigerant under low pressure to fill the compression chambers 80 from the compression intake volume 76. As the orbiting scroll 66 moves along path 78, the space between the tail ends 16A, 66A and the other scroll 66, 16 decreases until the compression chambers 80 are closed off from the compression intake volume 76 (FIGS. 17B-17E). As the orbiting scroll 66 continues to move along 78, the volume of the compression chambers 80 is further reduced, thus pressurizing the refrigerant in both compression chambers 80 (FIGS. 17F-H). As shown in FIGS. 17I-18J, as the orbiting scroll 66 continues to orbit, the two compression chambers 80 are combined into a single volume. This volume is further reduced until the pressurized refrigerant is expelled from the compression device 18 (see below)

As discussed below, the refrigerant enters chambers formed between the walls of the orbiting scroll 66 and the fixed scroll 26. During the cycle of the compressor 10, the refrigerant is transported towards the center of these chambers. The orbiting scroll 66 orbits or moves in a circular motion indicated by arrow 78 formed by the relative position of the orbiting scroll 66 relative to the fixed scroll 26 is shown during one cycle of the electric compressor 10.

Returning to FIG. 1, the front cover 28 forms a discharge volume 82. The discharge volume 82 is in communication with the refrigerant output port 70. As discussed in more detail below, pressurized refrigerant leaves the compression device 18 through an orifice 84 in the fixed scroll 26 (see FIGS. 18C and 18E) The release of pressurized refrigerant is controlled by a reed mechanism 86. In the illustrated embodiment, a single reed mechanism 86 is used. However, it should be noted that more than one reed mechanisms may be used.

Figure 18A:
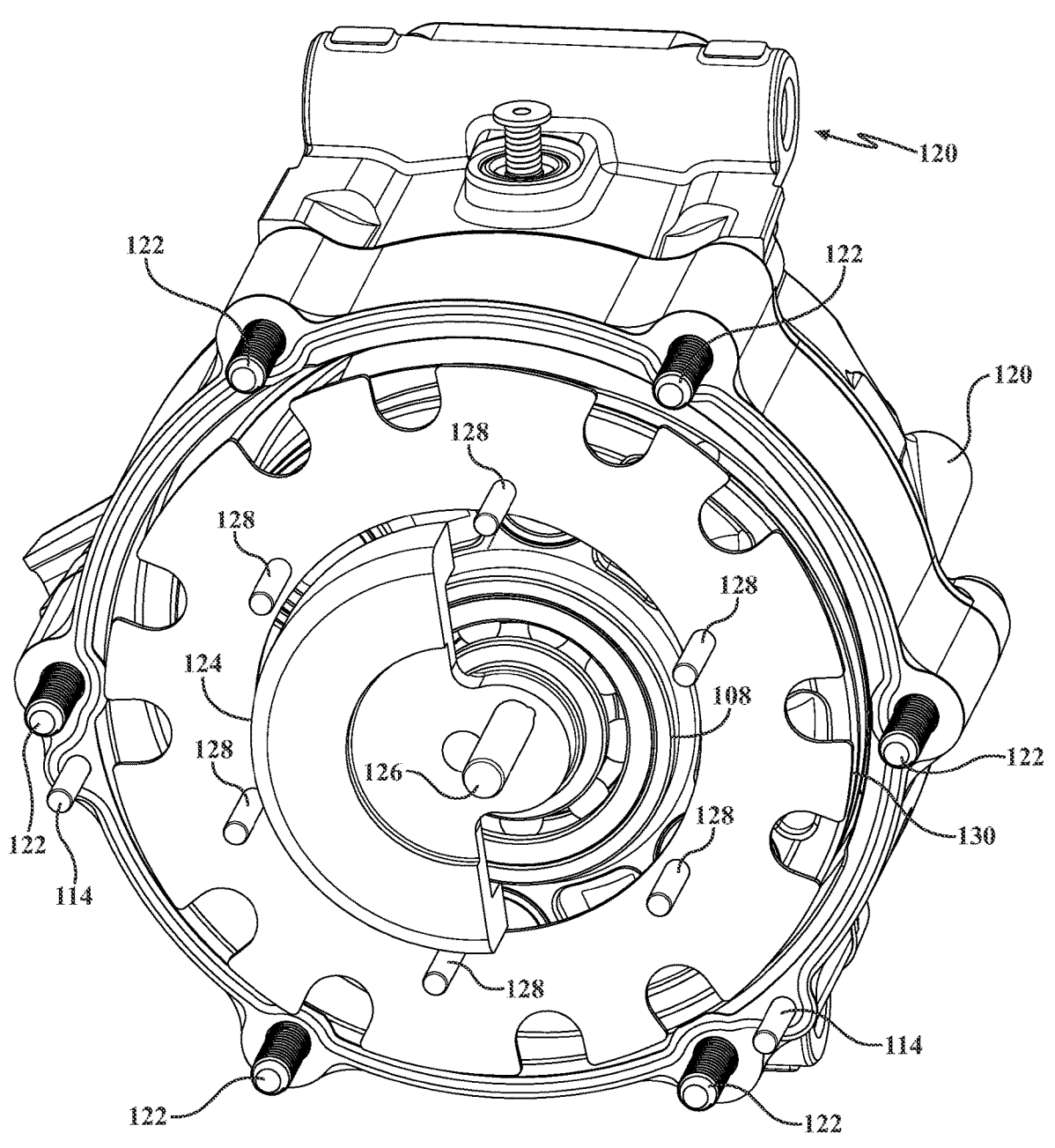
FIG. 18A is a first perspective view of a portion of the compression device of FIG. 13, including a fixed scroll and an orbiting scroll.
Figure 18B:
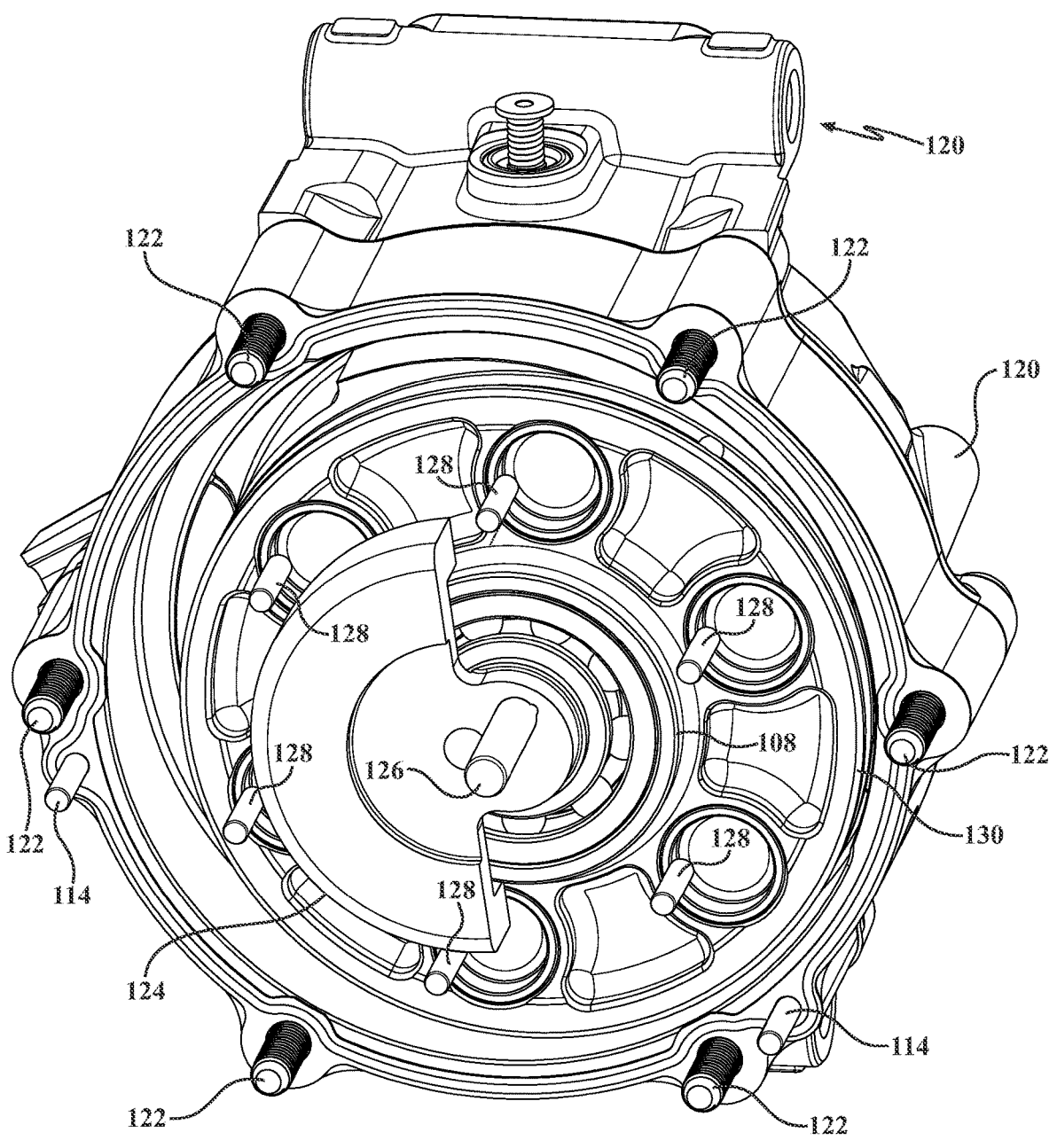
FIG. 18B is a second perspective view of the portion of the compression device of FIG. 18A.
Figure 18C:
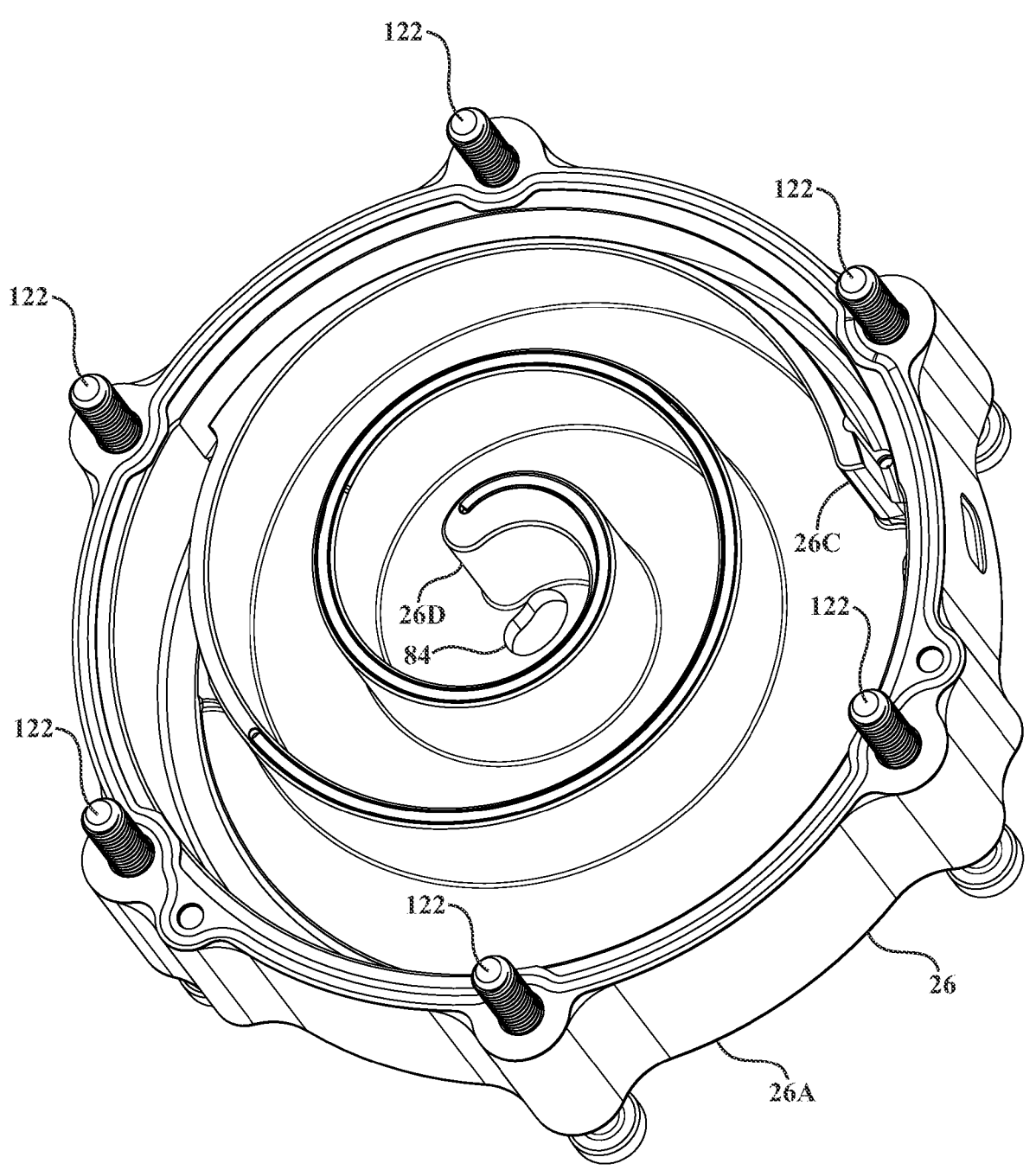
FIG. 18C is a first perspective view of the fixed scroll of the compression device of FIG. 13.
Figure 18D:
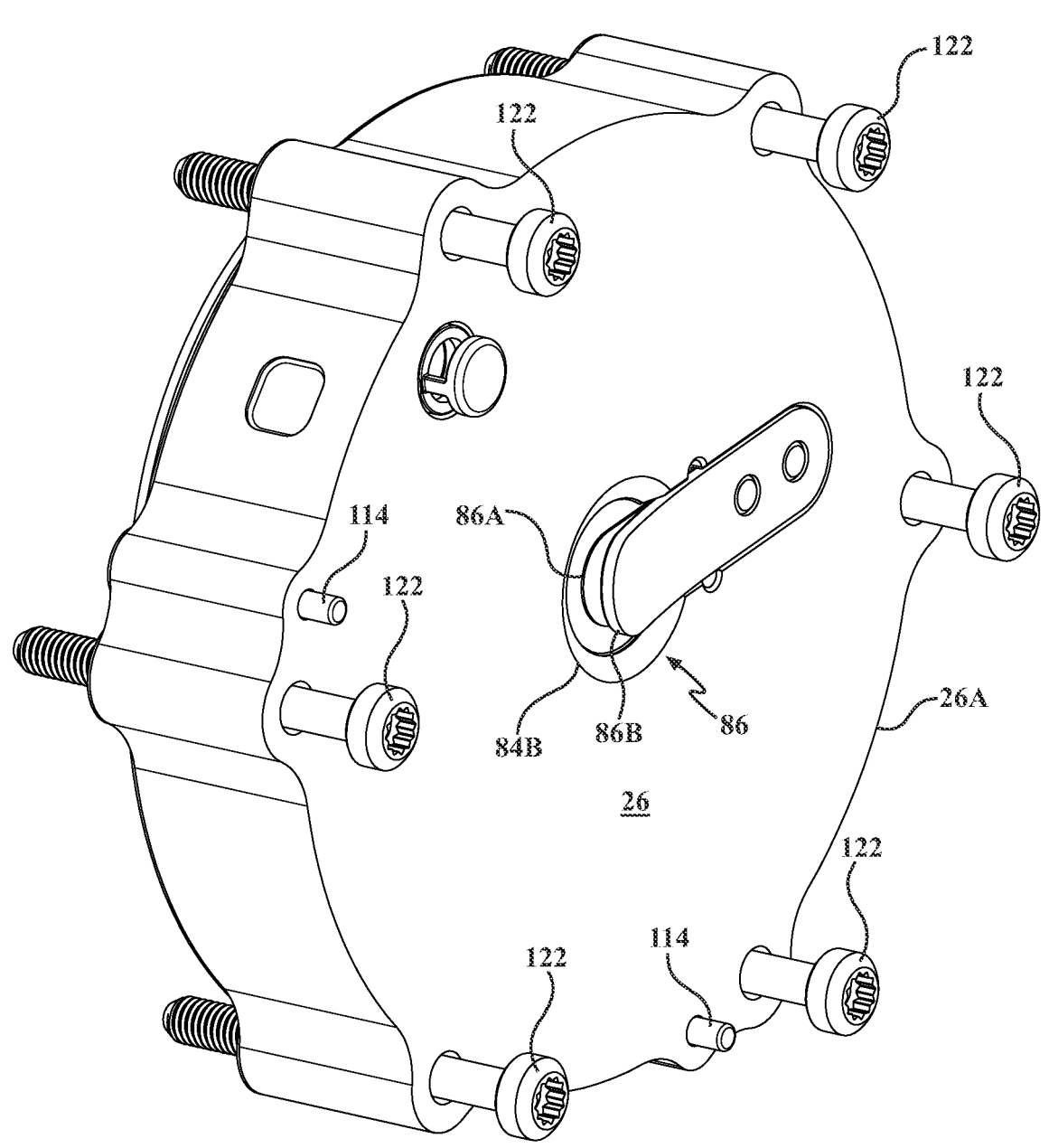
FIG. 18D is a second perspective view of the fixed scroll of the compression device of FIG. 13.
Figure 18E:
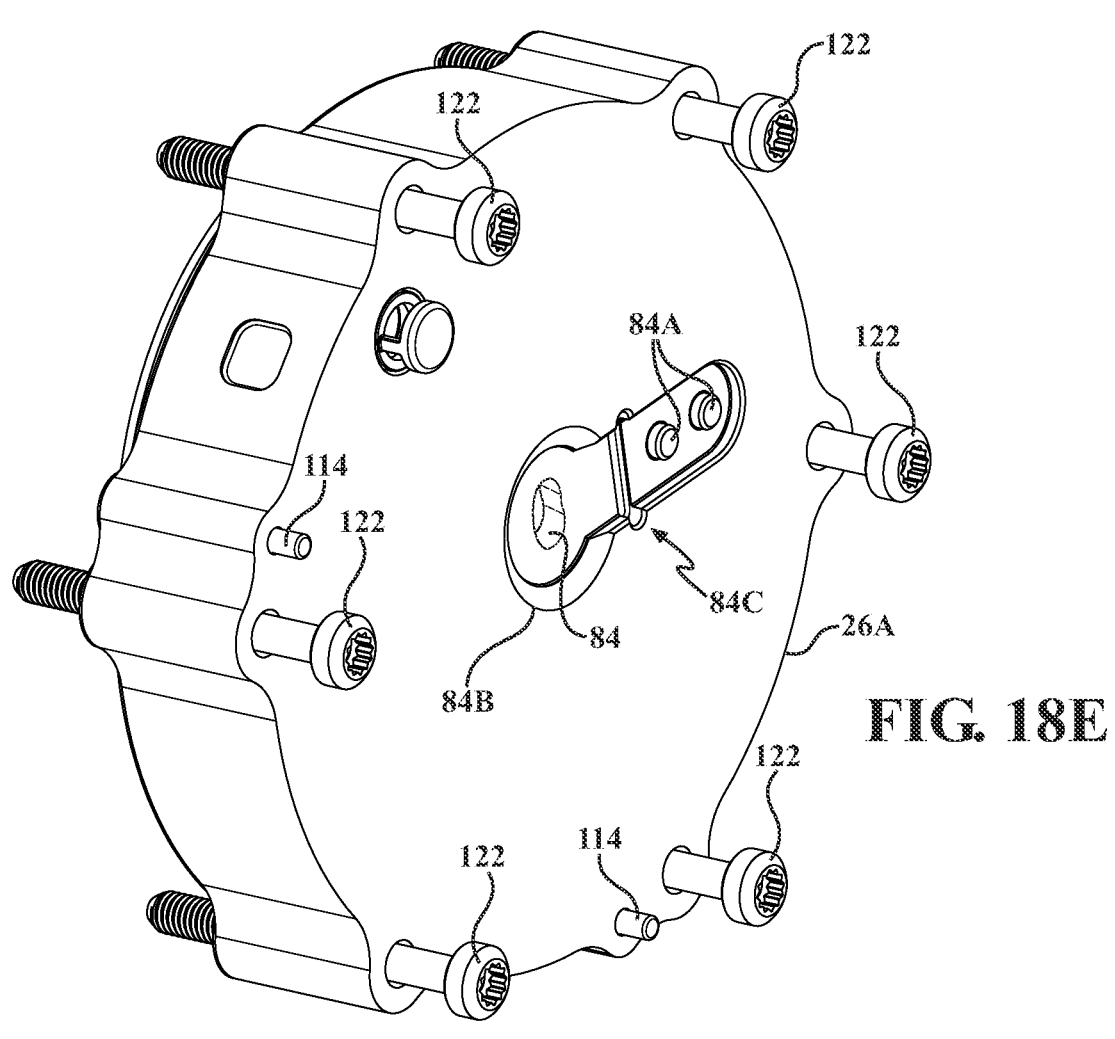
FIG. 18E is a third perspective view of the fixed scroll of the compression device of FIG. 13.

As shown in FIGS. 18D and 18E, in the illustrated embodiment, the reed mechanism 86 includes a discharge reed 86A and a reed retainer 86B. The discharge reed 86A is made from a flexible material, such as steel. The characteristics, such as material and strength, are selected to control the pressure at which the pressurized refrigerant is released from the compression device 18. The reed retainer 86B is made from a rigid, inflexible material, such as stamped steel. The reed retainer 866 controls or limits the maximum displacement of the discharge reed 86A relative to the fixed scroll 26.

Figure 18F:
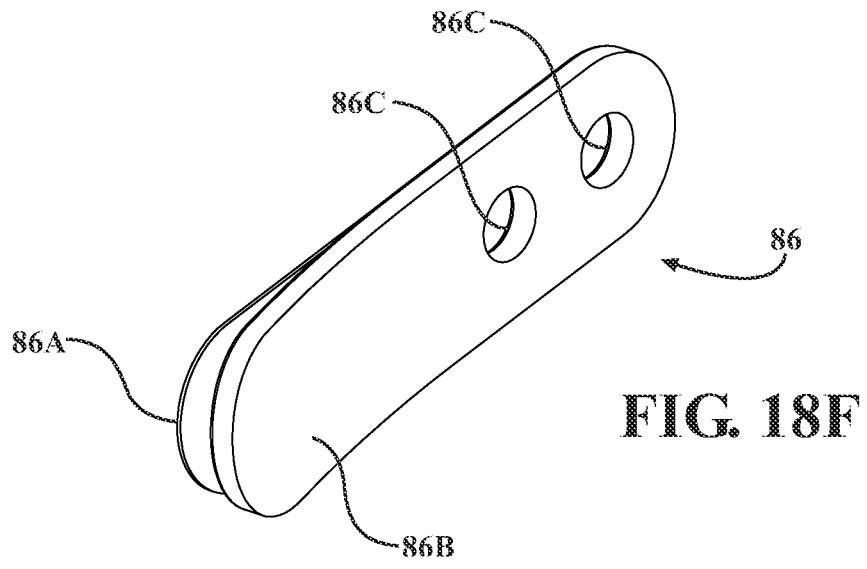
FIG. 18F is a perspective view of a reed mechanism associated with the compression device of FIG. 13.
Figure 19A:
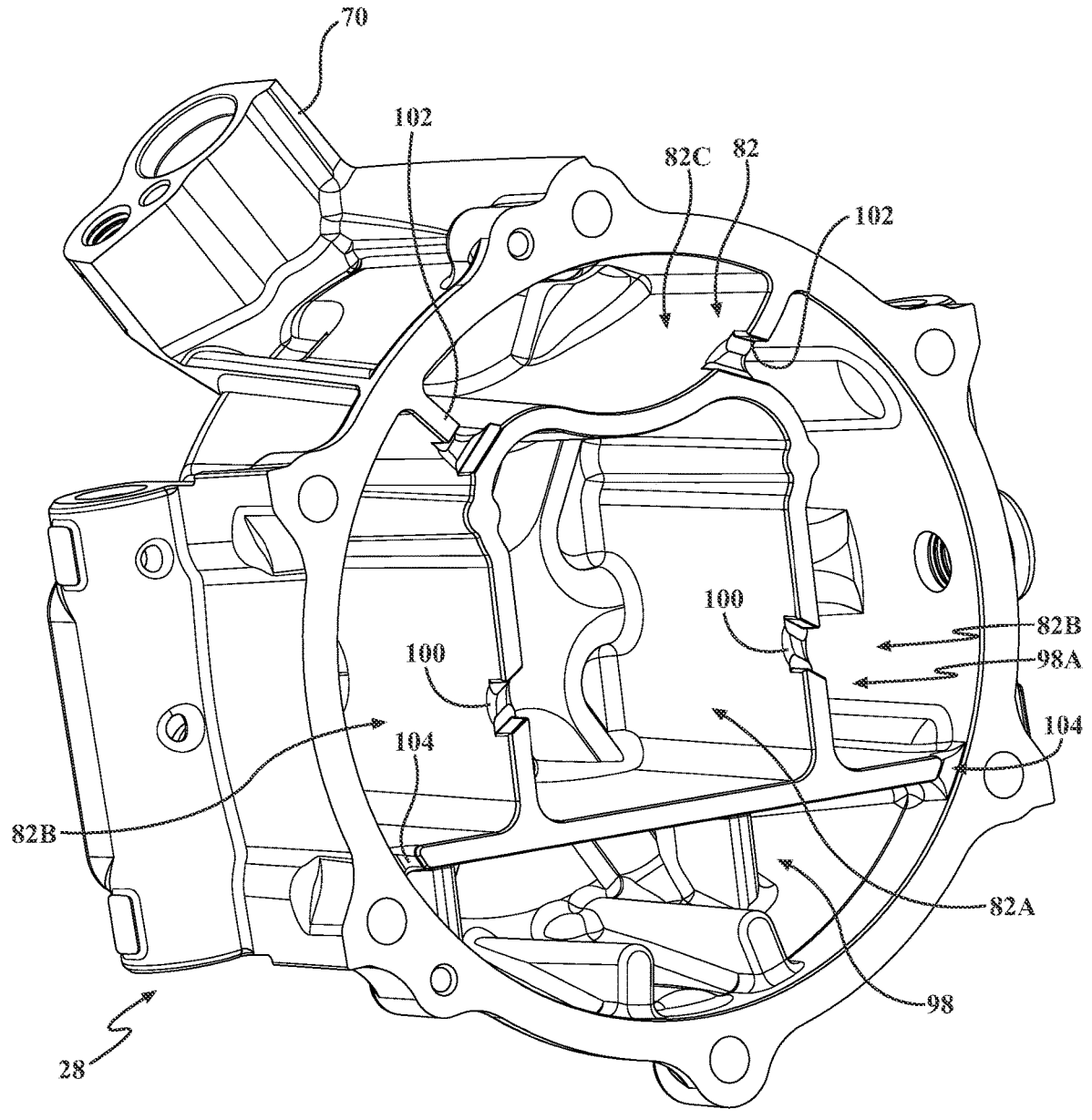
FIG. 19A is a first perspective view of a front cover of an electric compressor forming an oil separator, according to an embodiment of the present invention.
Figure 19B:
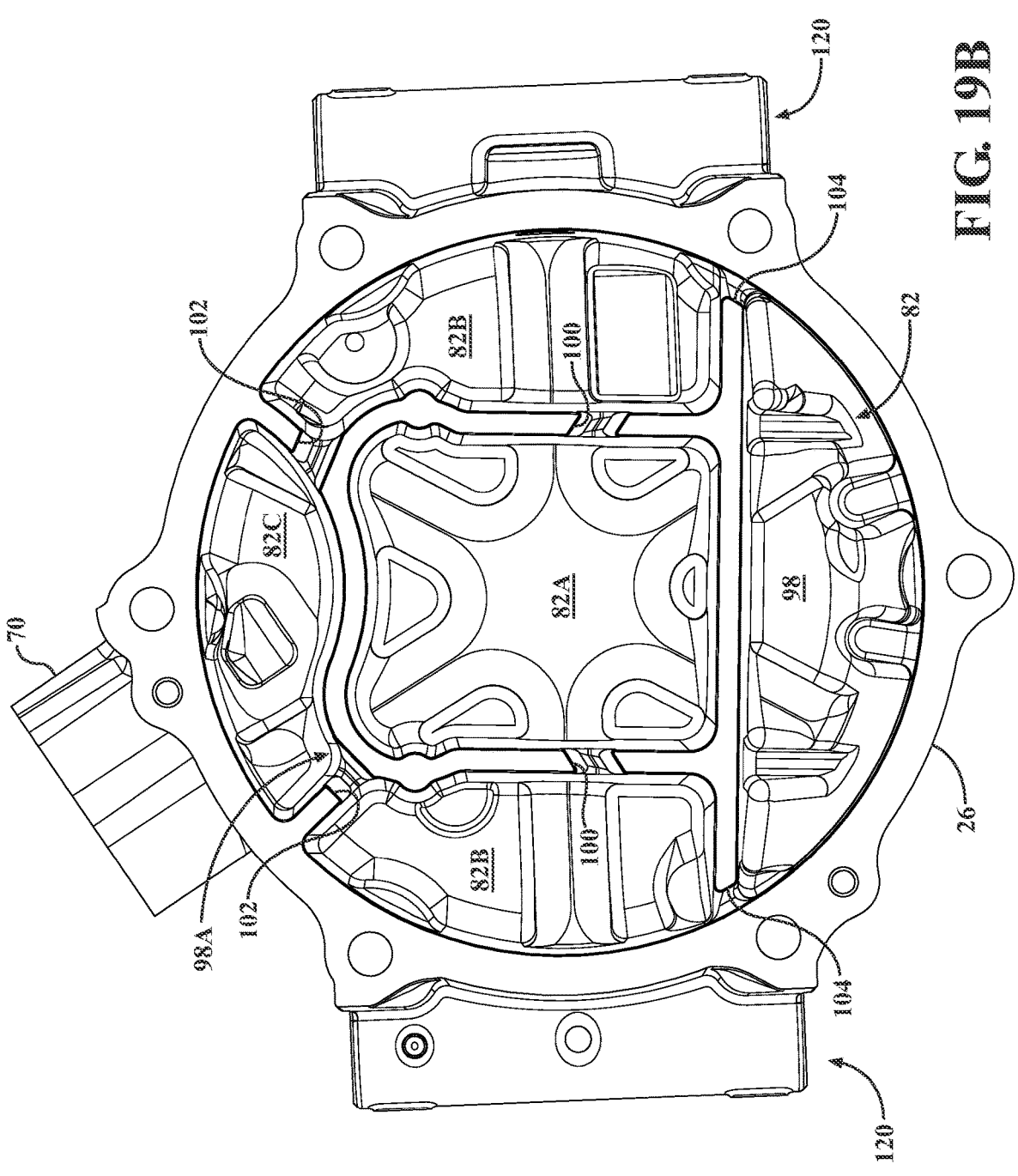
FIG. 19B is a second perspective view of the front cover of FIG. 19A.

In the illustrated embodiment, the read mechanism 86 is held or fixed in place without a separate fastener. As shown in FIGS. 18E and 18F, the reed mechanism 86 incudes a pair of apertures 86C which are configured to receive associated posts 84A on the fixed scroll 26. When the electric compressor 10 is assembled, the reed mechanism 86 is adjacent, and held in place by, the front cover 28. As shown in FIG. 18E, the back surface of the fixed scroll 26 includes a bezel 84B surrounding the orifice 84 which assists in tuning the pressure at which refrigerant exits the compression device 18. Additionally, a debris collection slot 84B collects debris near the orifice 84 to prevent from interference with the reed mechanism 86.

As shown in FIG. 9, the path of refrigerant through the electric compressor is indicated by dashed arrow 72.

The electric compressor 10 utilizes oil (not shown) to provide lubrication to the between the components of the compression device 18 and the motor 54, for example, between the orbiting scroll 66 and the fixed scroll 26 and within the ball bearings 62, 64. The oil intermixes with the refrigerant within the compression device 18 and the motor 54 and exits the compression device 18 via the orifice 84. As discussed in more detail below, the oil is separated from the compressed refrigerant within the front cover 28 and is returned to the compression device 18.

An oil separator 96 facilitates the separation of the intermixed oil and refrigerant. Generally, the oil separator 96 only removes some of the oil within the intermixed oil and refrigerant. The separator oil is stored in an oil reservoir and cycled back through the compression device 18, where the oil is mixed back in with the refrigerant.

Figure 3A:
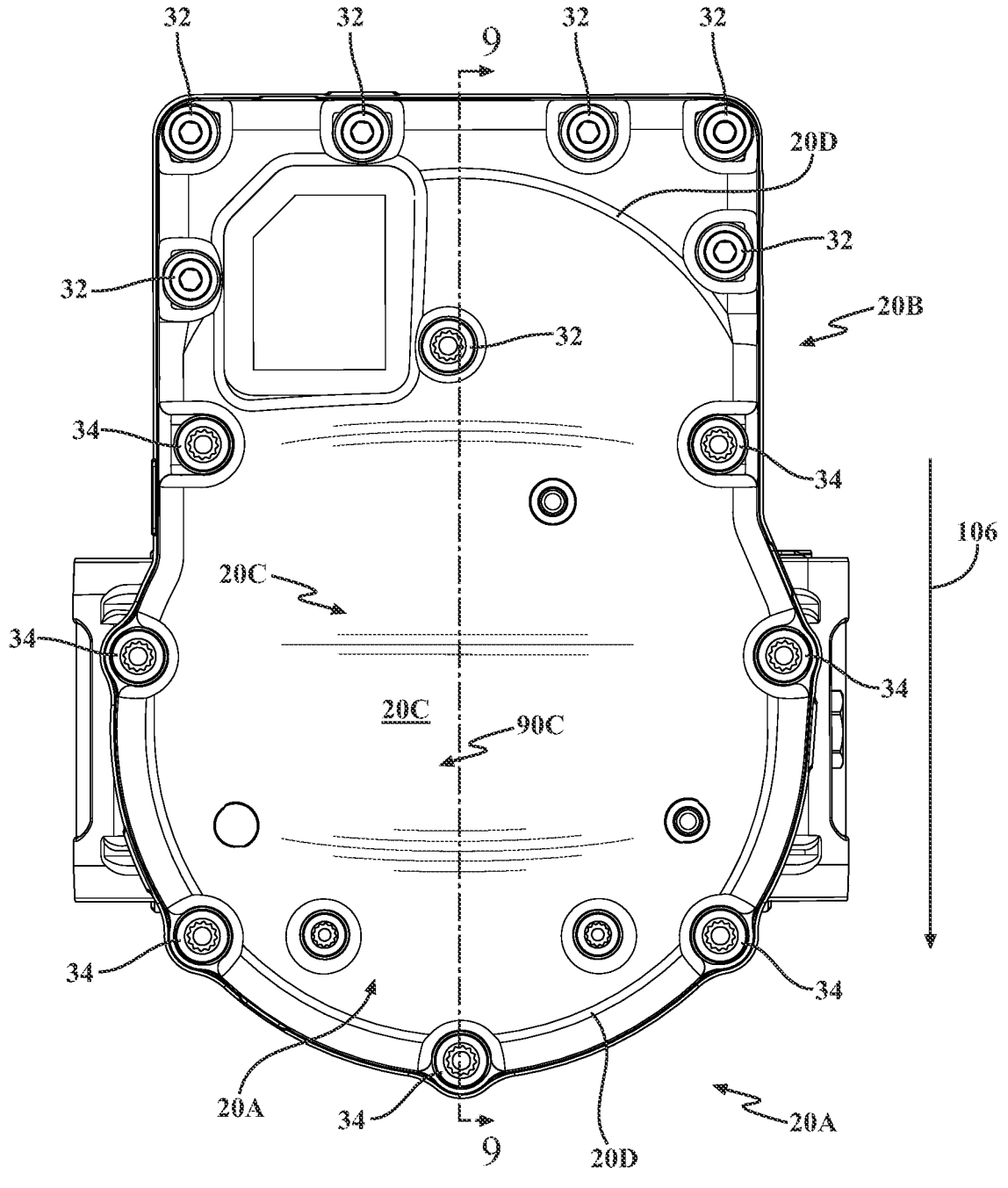
FIG. 3A is a first side view of the electric compressor of FIG. 1 illustrating an inverter back cover of an inverter section.
Figure 4:
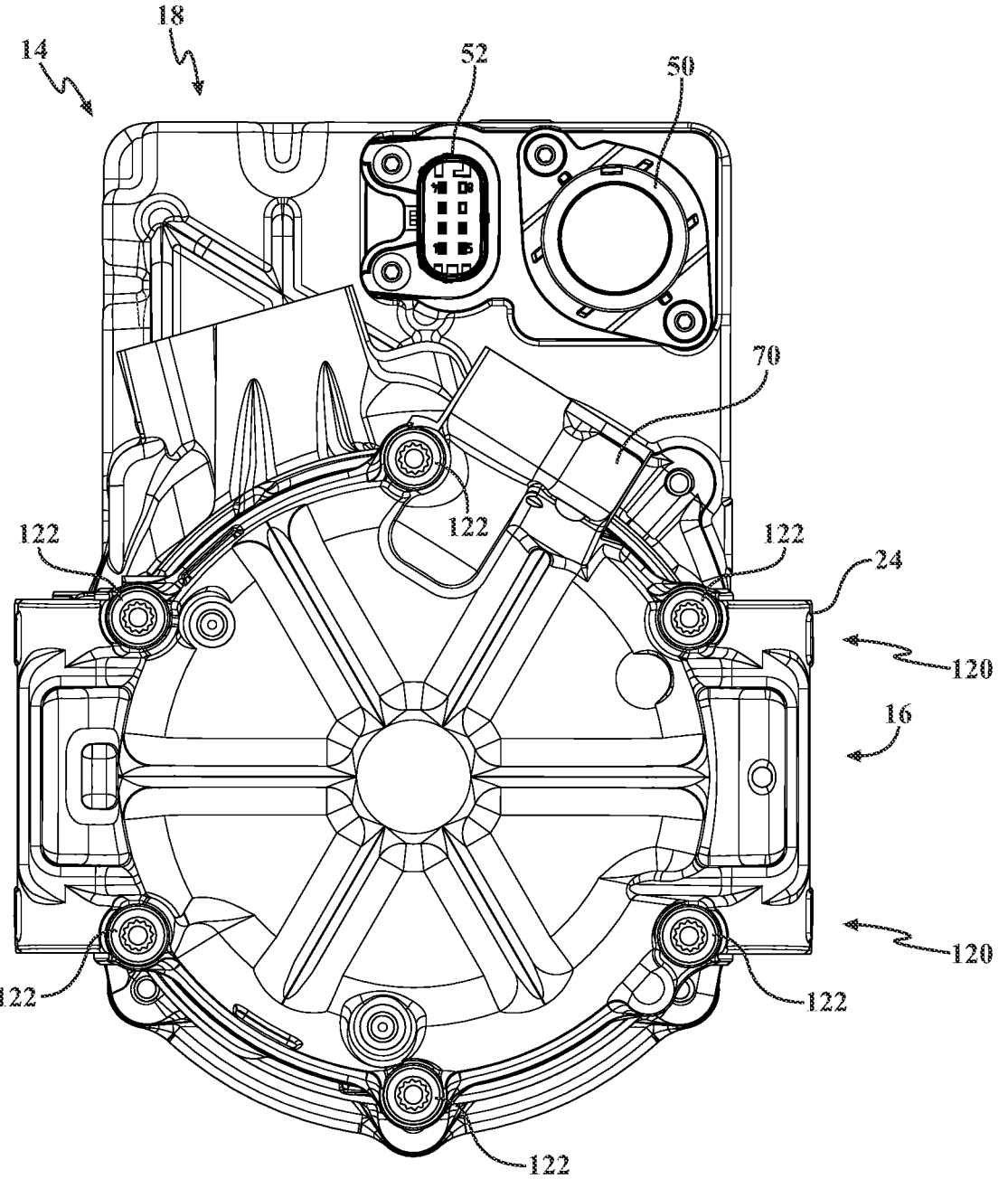
FIG. 4 is a second side view of the electric compressor of FIG. 1.
Figure 5:
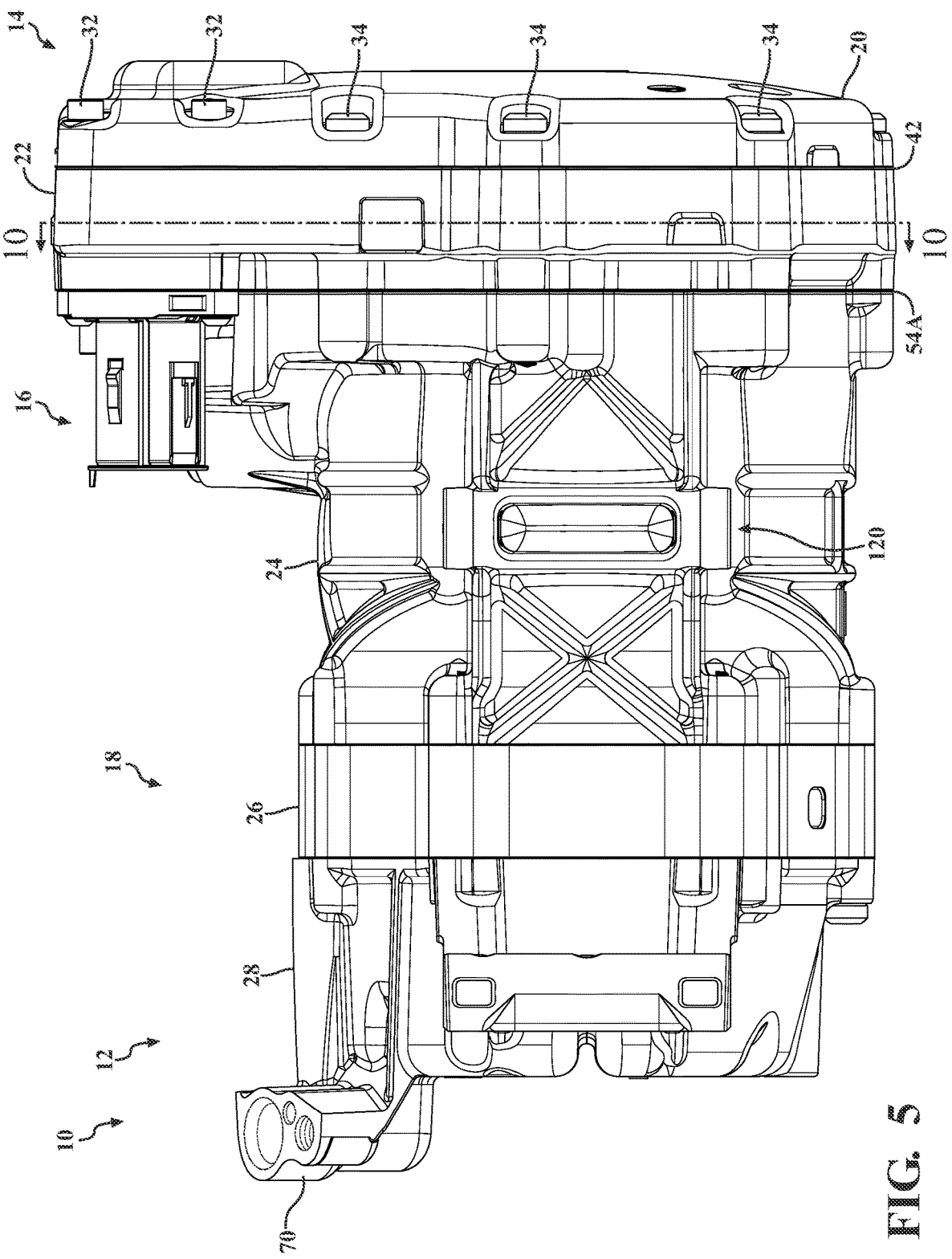
FIG. 5 is a front view of the electric compressor of FIG. 1.
Figure 6:
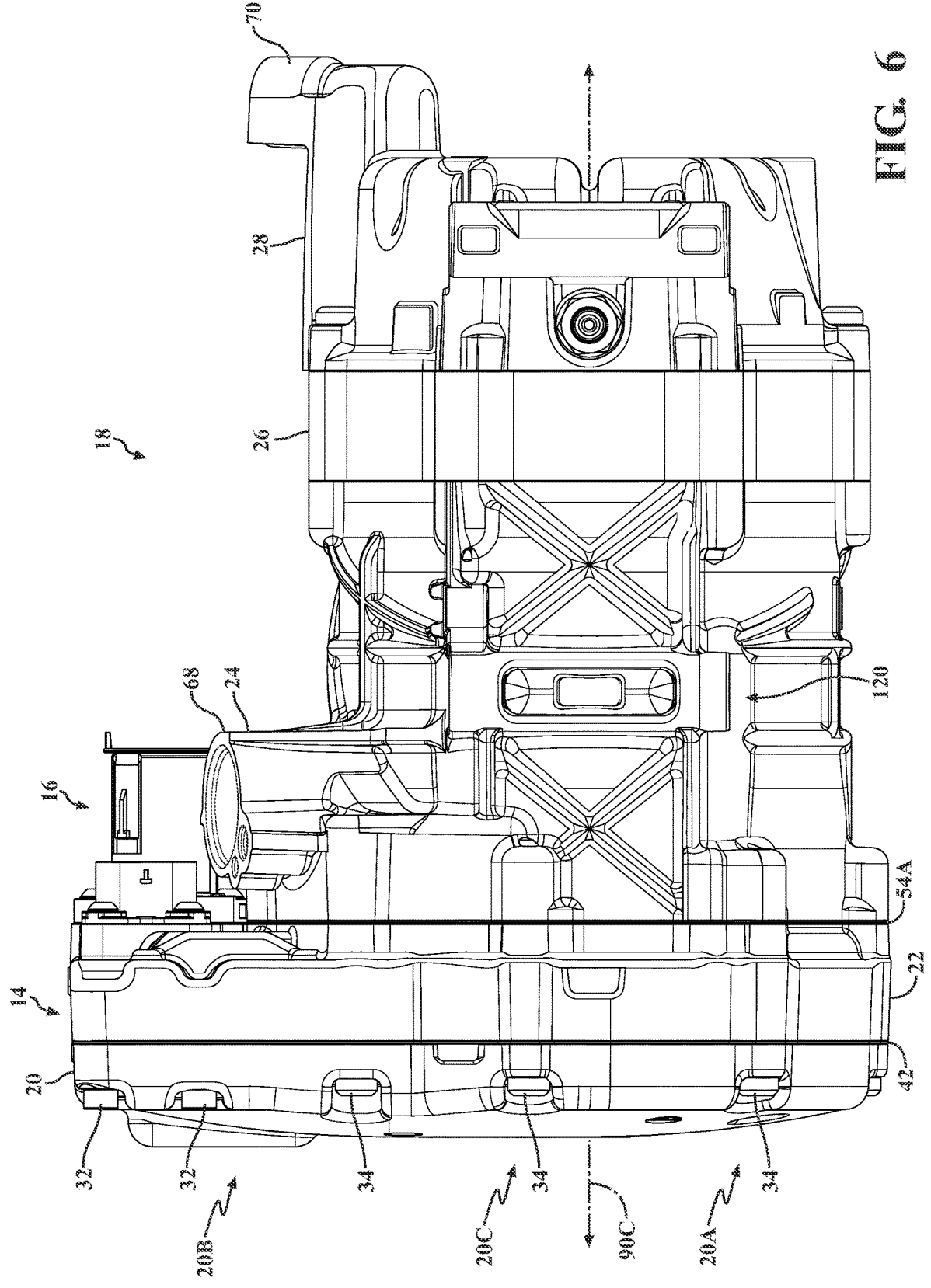
FIG. 6 is a rear view of the electric compressor of FIG. 1.
Figure 7:
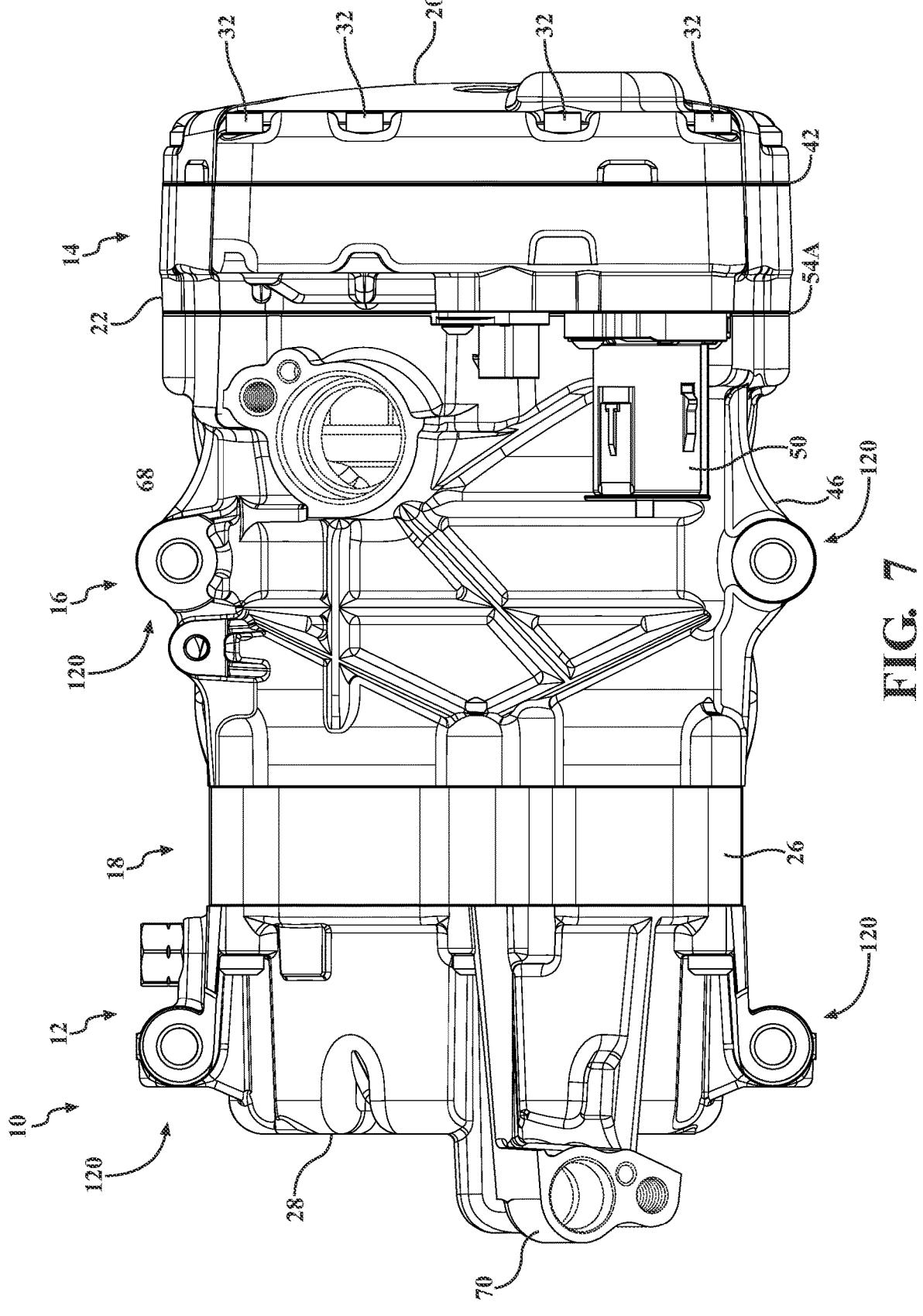
FIG. 7 is a top view of the electric compressor of FIG. 1.
Figure 8:
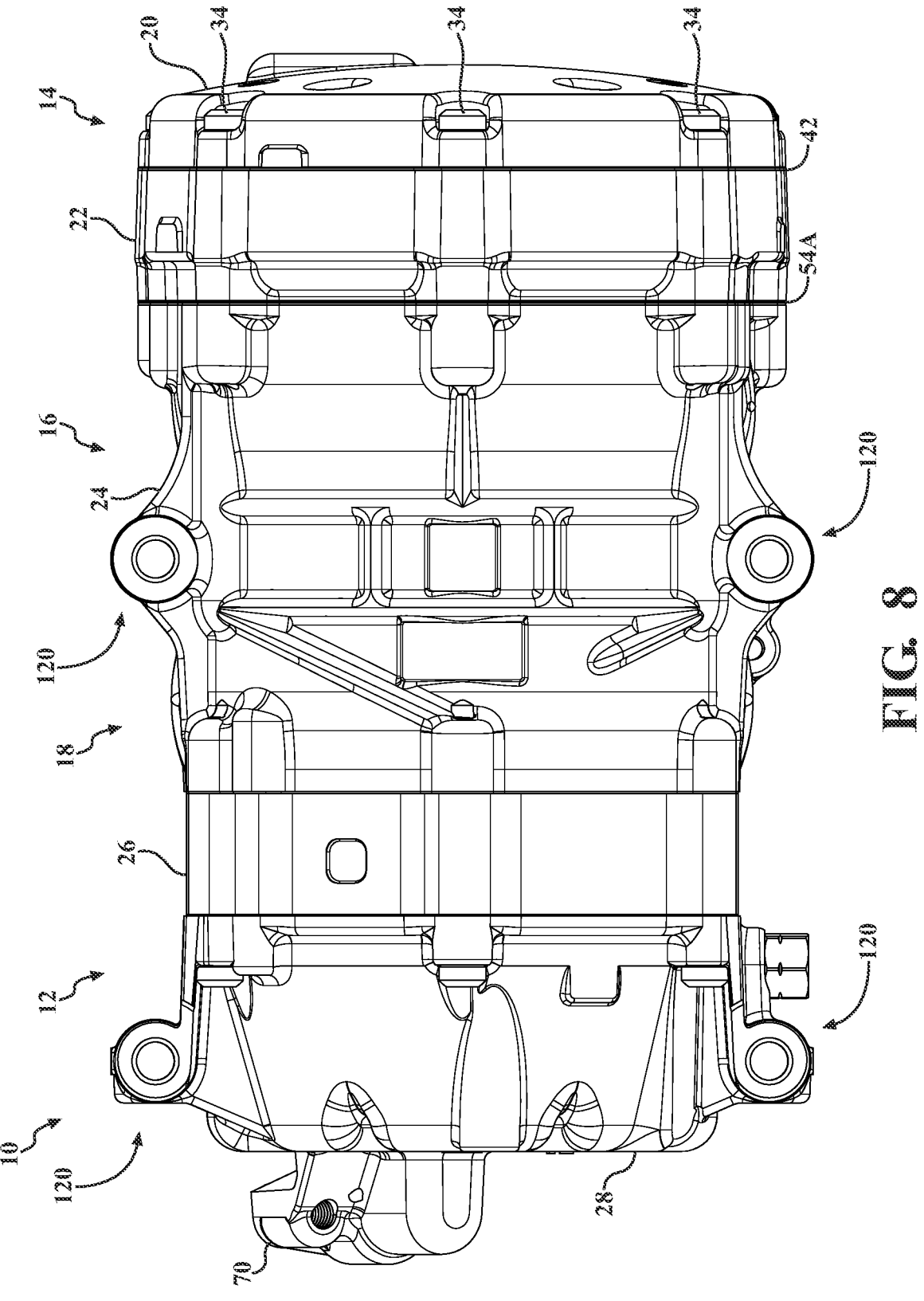
FIG. 8 is a bottom view of the electric compressor of FIG. 1.

In the illustrated embodiment, the oil separator 96 is integrated within the front cover 28. The front cover 28 further defines an oil reservoir 98 which collects oil from the oil separator 96 before the oil is recirculated through the motor 54 and motor cavity 56 and the compression device 18. In use, the electric compressor 10 is generally orientated as shown in FIGS. 3-5, such that gravity acts as indicated by arrow 106 and oil collects within the oil reservoir 98. With reference to FIG. 9, the general path oil travels from the bottom of the electric compressor 10 through the compression device 18, out the orifice 84 to the discharge volume 82 of the front cover 28 and back to the compression device 18 is shown by arrow 88. As shown, the oil is drawn back up into the compression device 18 where the oil is mixed back into or with the refrigerant.

As stated above, refrigerant, which is actually a mixture of refrigerant and oil enters the electric compressor 10 via the refrigerant inlet port 70. The intermix of oil and refrigerant is drawn into the motor section 16, thereby providing lubrication and cooling to the rotating components of the electric compressor 10, such as the rotor 60, the drive shaft 90. Oil and refrigerant enters the interior of the motor 54 to lubricate the second ball bearing 64 and the oil by the rotational forces within the motor section 16. Oil may impact against the motor side 22A of the inverter housing 22. The refrigerant and oil is further directed by the motor side 22A into the ball bearing 62, further discussed below.

In the illustrated embodiment, the front cover 28 and the fixed scroll 26 are mounted to the motor housing 24 by a plurality of bolts 122 inserted through respective apertures therein and threaded into apertures in the motor housing 24.

A fixed head gasket 110 and a rear heard gasket 112, are located between the motor housing 24 and the fixed scroll 26 to provide sealing.

Swing-Link Mechanism and Concentric Protrusion of the Drive Shaft

With specific reference to FIGS. 13-18B, in a first aspect of the electric compressor 10 of the disclosure, an electric compressor 10 includes a swing link mechanism 124 and the drive shaft 90 has a concentric protrusion 126. In one embodiment, the concentric protrusion 126 is integrally formed with the drive shaft 90. As discussed below, the swing-link mechanism 124 is used to rotate the orbiting scroll 66 in an eccentric orbit about the drive shaft 90.

In the prior art, the drive shaft is coupled to a swing-link mechanism by a drive pin and a separate eccentric pin, both of which are pressing into the drive shaft. The drive pin is used to rotate the swing link mechanism 124 which moves the orbiting scroll 66 along its eccentric orbit. The drive pin and the eccentric pin are inserted into respective apertures in the end of the drive shaft. The eccentric pin is used to limit articulation of the orbiting scroll 66 is the orbiting scroll 66 travels along the eccentric orbit. Neither the drive pin, nor the eccentric pin, are located along the central axis of the drive shaft. As the drive shaft is rotated, the drive pin and the eccentric pin are placed under considerable stress. Thus, both pins are composed from a hardened material, such as, SAE 52100 bearing steel. In addition, the eccentric pin may require an aluminum bushing or other slide bearing to prevent damage to the eccentric pin, as the eccentric pin is used to limit the radial movement of the eccentric orbit of the orbiting scroll 66. Also, the prior art eccentric pin requires additional machining on the face of the drive shaft 90, including precise apertures for the drive pin, and eccentric pin.

As discussed in more detail below, the eccentric pin of the prior art is replaced with a concentric protrusion 90F.

In the illustrated embodiment, the electric compressor 10 includes the housing 12, the refrigerant inlet port 68, the refrigerant outlet port 70, the drive shaft 90, the concentric protrusion 90F, the motor 54, the compression device 18, the swing link mechanism 124, a drive pin 126 and a ball bearing 108. The housing 12 defines the intake volume 74 and the discharge volume 82. The refrigerant inlet port 68 is coupled to the housing 12 and is configured to introduce the refrigerant to the intake volume 74. The refrigerant outlet port 70 is coupled to the housing 12 and is configured to allow compressed refrigerant to exit the electric compressor 10 from the discharge volume 82. The drive shaft 90 is located within the housing 12 and has first and second ends 90A, 90B. The drive shaft 90 defines, and is centered upon, a center axis 90C.

The concentric protrusion 90F is located at the second end 90B of the drive shaft 90 and is centered on the center axis 90C. The concentric protrusion 90F and extends away from the drive shaft 90 along the central axis 90C. The concentric protrusion 90F includes a drive pin aperture 90E. The motor 54 is located within the housing 12 and is coupled to the drive shaft 90 to controllably rotate the drive shaft 90 about the center axis 90C. The drive pin 126 is located within the drive pin aperture 90E and extends away from the drive shaft 90. The drive pin 126 is parallel to the concentric protrusion 90F.

The concentric pin 90F may further include an undercut 90G, and the outer surface may be surface hardened or after treated with a coating or bearing surface. The concentric pin 90F may be further machined simultaneously with the drive shaft 90.

As explained above, the compression device 18 includes the fixed scroll 26 and the orbiting scroll 66. The fixed scroll 26 is located within, and being fixed relative to, the housing 12. The orbiting scroll 66 is coupled to the drive shaft 90. The orbiting scroll 66 and the fixed scroll 26 form compression chambers 80 (see above) for receiving the refrigerant from the intake volume 74 and for compressing the refrigerant as the drive shaft 90 is rotated about the center axis 90C. The orbiting scroll 66 has an inner circumferential surface 66E.

The swing-link mechanism 124 is coupled to the drive shaft 90 and has first and second apertures 124A, 124B for receiving the concentric protrusion 90F and the drive pin 126. The swing-link mechanism 124 further includes an outer circumferential surface 124C.

The ball bearing 108 is positioned between, and adjacent to each of, the inner circumferential surface 66E of the orbiting scroll 66 and the outer circumferential surface 124C of the swing-link mechanism 124. The drive shaft 90, drive pin 126, orbiting scroll 66 and swing-link mechanism 124 are arranged to cause the orbiting scroll 66 to rotate about the central axis 90C in an eccentric orbit.

In one embodiment, the concentric protrusion 90F is integrally formed with the drive shaft 90. The drive shaft 90, concentric protrusion 90F, and swing-link mechanism 124 may be machined from steel. The concentric protrusion 90F being formed simultaneously and within the same machining operation with the drive shaft 90 further increases manufacturing efficiencies.

Figures 16C, 16D, 16E:
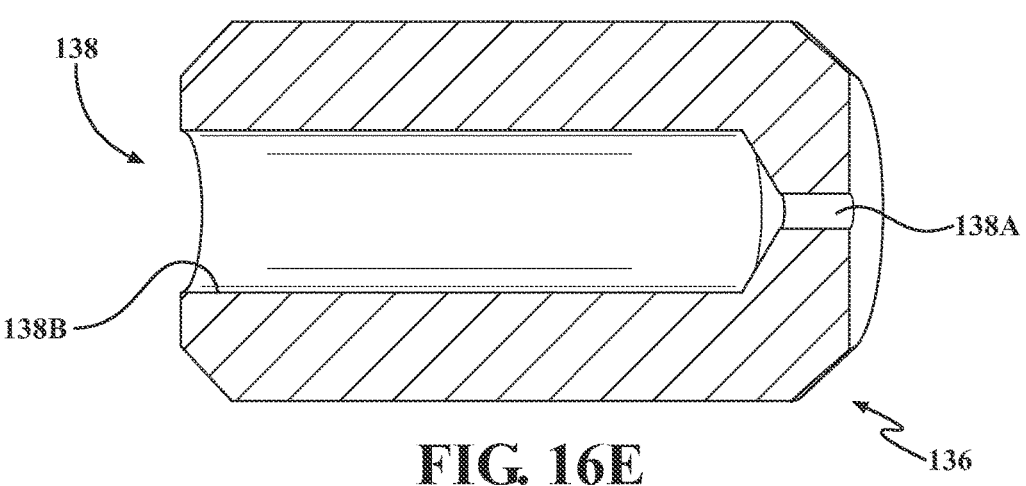
FIG. 16C is a perspective view of a plug of the compression device of FIG. 13.
FIG. 16D is a second perspective view of the plug of FIG. 16C.
FIG. 16E is a cross-sectional view of the plug of FIG. 16C.
Figure 16F:
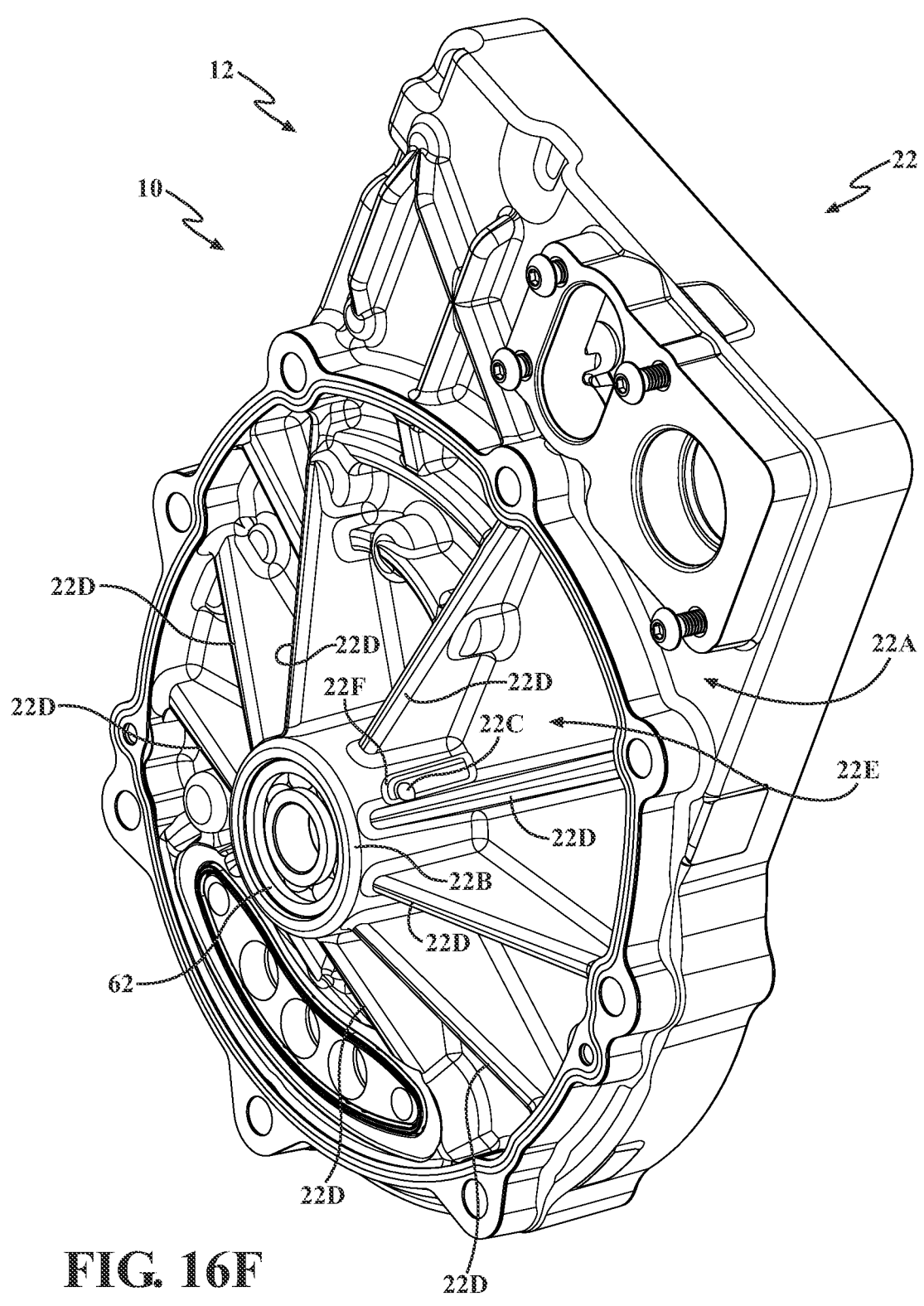
FIG. 16F is a perspective view of an inverter housing of the inverter of FIG. 11.
Figure 16G:
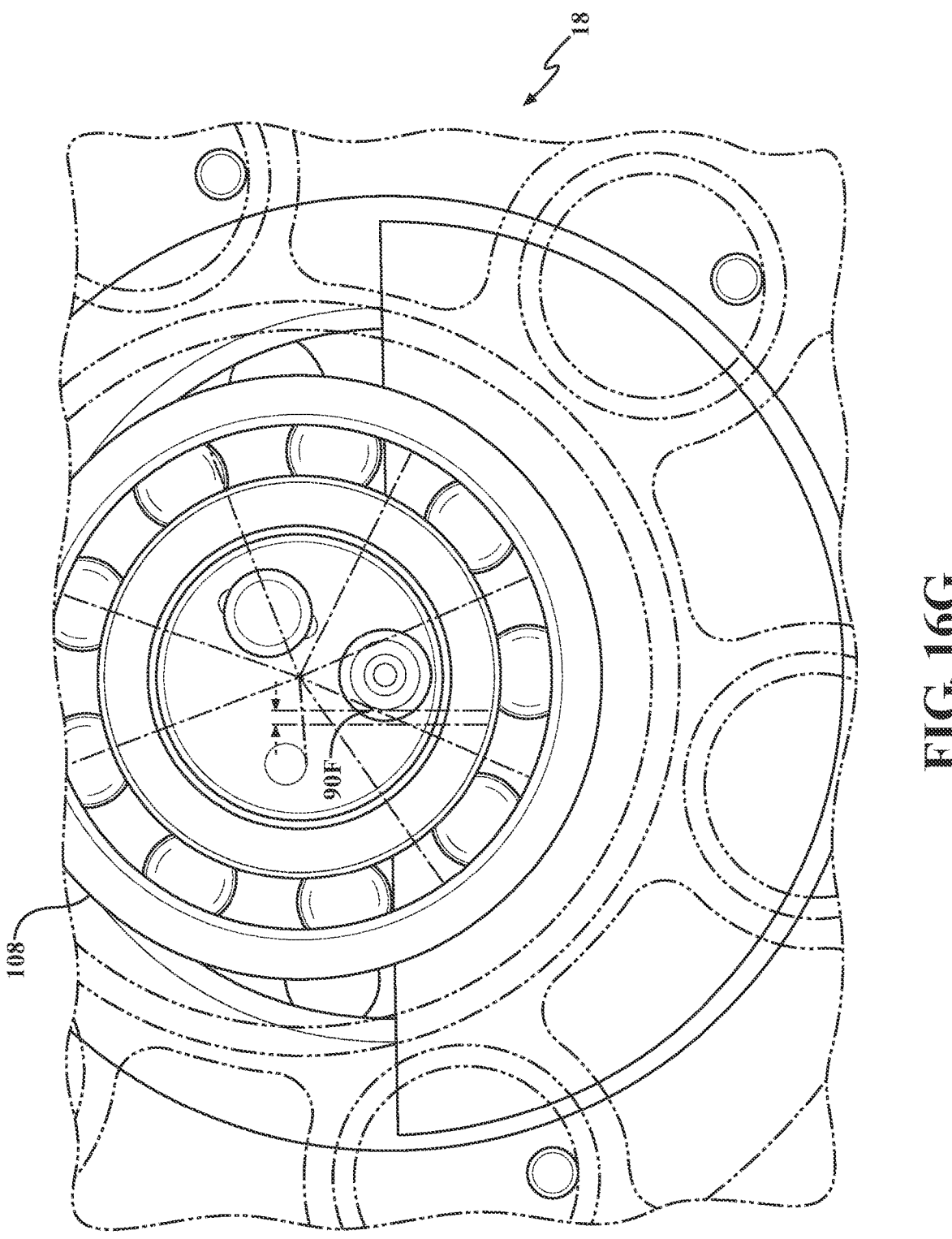
FIG. 16G is a partial expanded view of the compression device of FIG. 13.

The expanded view of a portion of the compression device 18 illustrated in FIG. 16G, further illustrates the concentric protrusion 90F. The concentric protrusion 90F interacts and guides the swing-link mechanism 124. The concentric protrusion 90F is sized and machined with a controlled tolerance with the first aperture 124A to create a controlled gap that limits the radial movement of the eccentric orbit of the orbiting scroll 66. Unlike the prior art, the concentric protrusion 90F does not require a second pin, or any additional machining operations. The concentric protrusion 90F further co-operates with the guidance pins 128 and the slots 66G on a lower surface 66F of the orbiting scroll 66, further discussed below.

The electric compressor 10 includes an inverter section 14, a motor section 16, and the compression device 18. The motor section 16 includes a motor housing 54 that defines a motor cavity 56. The compression section 18 includes the fixed scroll 26. The housing 12 is formed, at least in part, the fixed scroll 26 and the motor housing 24.

With specific reference to 13, 16B, and 18A-18F in the illustrated embodiment, the orbiting scroll 66 has a lower surface 66F. The lower surface 66F has a plurality of ring-shaped slots 66G. The motor housing 24 includes a plurality of articulating guidance pin apertures 128. The guidance pins 128 are located within the guidance pin apertures 66G and extend towards the compression device 18 and into the ring-shaped slots 66G. The guidance pins 128 are configured to limit articulation of the orbiting scroll 66 as the orbiting scroll 66 orbits about the central axis 90C. In one embodiment, each of the ring-shaped slots 66G includes a ring sleeve 118. A thrust plate 130 is located between motor housing 24 and the fixed scroll 26 and provides a wear surface therebetween.

Discharge Head Design Having an Oil Separator

In a second aspect of the electric compressor 10 of the disclosure, an electric compressor 10 includes an oil separator 96 located in the discharge volume 82. which may be located in the discharge volume 82 and integrally formed with the discharge head or front cover 28. As discussed above, oil is used to provide lubrication between the moving components of the electric compressor 10. During operation, the oil and the refrigerant become mixed. The oil separator 96 is necessary to separate some of the oil from the mixture of the oil and refrigerant before the refrigerant leaves the electric compressor 10.

Generally, refrigerant is released from the compression device 18 once per revolution (or orbit) of the orbiting scroll 66. This creates a first order pulsation within the compressed refrigerant released by the electric compressor 10. The relative strong amplitude and low frequency of the pulsation creating in the refrigerant may excite other components (internal or external to the electric compressor 10) which may create undesirable noise, vibration and harshness (NVH) and low durability conditions. The oil separator 96 of the second aspect (described below), connects the discharge chambers (see below) by relatively small channels to create pressure drops between the chambers. This acts to smooth out the flow of compressed refrigerant out of the electric compressor 10. Additionally, the oil separator 96 utilizes two parallel paths between the compression device 18 and the refrigerant outlet port 70 to reduce the net pressure drop while maintaining the reduction in this pulsation.

The oil separator 96 may include a series of partitions 98A extending from an inner surface of the front cover 28. As shown, the walls 98A separate the discharge volume 82 into a central discharge chamber 82A, two side discharge chambers 82B, am upper discharge chamber 82C and the oil reservoir 98. The central discharge chamber 82A is adjacent the reed mechanism 86 and receives intermixed pressurized refrigerant and oil from the compression device 18 through the slot 84 via the reed mechanism 86. The central discharge chamber 82 is in fluid communication with the two side discharge chambers 82B via respective side channels 100 which are in fluid communication with the upper discharge chamber 82C and the oil reservoir 98 via upper discharge channels 102 and lower discharge channels 104, respectively.

In the illustrated embodiment, the oil separator 96 is formed within the discharge chamber 82 of the housing 12 between the compression device 18 and the refrigerant outlet port 70. As shown, the oil separator 96 includes a central discharge chamber 82A, a pair of side discharge chambers 82B, an oil reservoir 98 and an upper discharge chamber 82C. The central discharge chamber 82A is formed adjacent the compression device outlet port or slot 84 for receiving the intermixed oil and compressed refrigerant. The pair of side discharge chambers 82B are located on opposite sides of the central discharge chamber 82A and are connected to the central discharge chamber 82A via respective side discharge channels 100.

The side chambers 82B are configured to separate the intermixed oil and compressed refrigerant. Generally, the intermixed oil and compressed refrigerant exit the central discharge chamber 82 through the side channels 100 at a high velocity. Separation of the oil and compressed refrigerant occurs as the intermixed oil and compressed refrigerant hits the interior outer wall of the respective side chambers 82B.

The oil reservoir 98 is located below the pair of side chambers and is connected thereto via the respective lower discharge channels 104. The oil reservoir is configured to receive oil separated from the compressed refrigerant in the side chambers. Gravity acting on the oil assists in the separation and the oil falls through the lower discharge channels 104 located in the side discharge chambers 82B into the oil reservoir 98.

The upper discharge chamber 82C is formed above the pair of side chambers 82B and is connected thereto via the respective upper discharge channels 102. Refrigerant, after being separated from the oil, rises through the upper discharge channels 102, located at the top of the side discharge chambers 82 and enters the uppers discharge chamber 82 before passing through the refrigerant outlet port 70, As shown, each side discharge channel 100 is configured to direct the intermixed oil and compressed refrigerant towards an opposite interior wall of the respective side channel 82B. For instance, the side discharge channel is generally at a 90-degree angle from the opposite wall of the side discharge chamber 82B.

Figure 20:
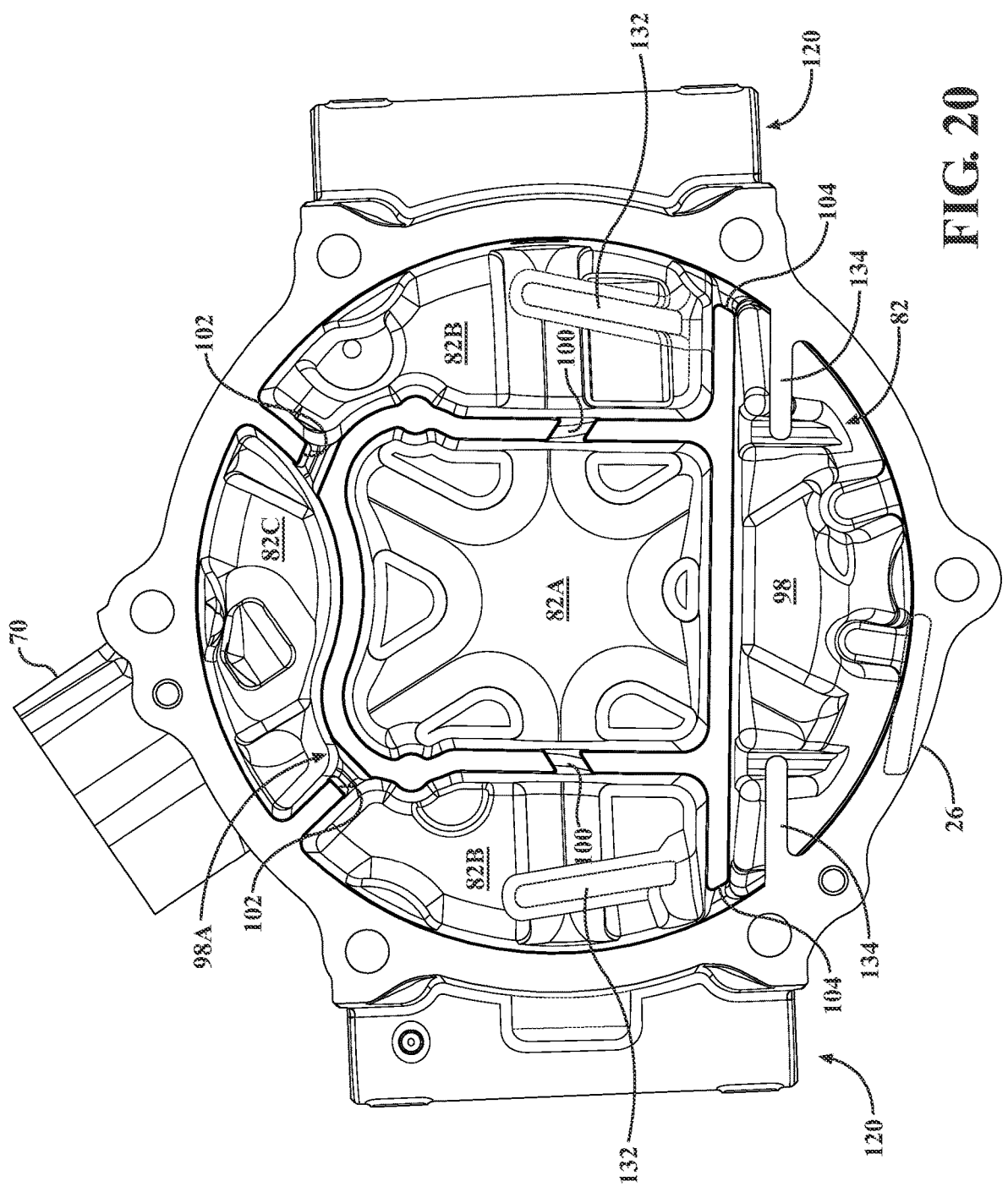
FIG. 20 is a first perspective view of a front cover of an electric compressor forming an oil separator, according to a second embodiment of the present invention.

In an alternative embodiment, as shown in FIG. 20, each side discharge chamber 82B may include a side baffle 132 located within an interior portion of the respective side chamber 82B. The side discharge channels 100 are configured to direct the intermixed oil and compressed refrigerant towards a respective side baffle. The side baffle 132 creates, on the back side opposite the discharge channels 100, a low-pressure area within the side discharge chambers 82B which assists in the separation of the oil and refrigerant. The low-pressure area may further assist gravity and reduce the oil from being carried upwards toward the upper discharge channels 102. The side discharge channels 100 may incorporate a downward angle that may further assist the gravity forces on the oil and by directing the discharge of the mixture toward a lower area of the side discharge chamber 82B, adjacent to the lower discharge channel 104, to further increase the distance for the oil to fall out of the compressed mixture, and by creating a longer tortuous path to separate the oil downward and away from the high velocity compressed refrigerant entering into the upper discharge channels 102. Also, the side baffles 132 may be arranged to create an impact surface perpendicular to the angled discharge flow path of the oil and refrigerant exiting from the side discharge channel 100. The perpendicular impact surface on the side baffles 132 creates additional turbulence to the discharging mixture and with the lower pressure area behind the side baffles 132 may further increase the gravitational effect on the heavier oil to separate within and direct the oil into the lower discharge channel 104.

Additionally, as shown in FIG. 20, the oil reservoir 98 may include an oil reservoir baffle 134 located beneath each lower discharge channel 104. The oil reserve baffle 134 assists in preventing oil within the oil reservoir 98 from being drawn out of the oil reservoir back into the side discharge chambers 82B. The side baffle 132 and the oil reserve baffle 134 may be used in combination or separately to reduce the oil from traveling upwards along the walls of the side discharge chamber 82B, and by creating the low-pressure side further reducing the draw or venturi effect that may be created due to the high velocity flow of the refrigerant exiting through the upper discharge channel 102.

Scroll Bearing Oil Orifice

In a third aspect of the electric compressor 10 of the disclosure, an electric compressor 10 having a scroll bearing oil injection orifice is provided. As discussed above, the compression device 18 of the present disclosure includes a ball bearing 108. In the illustrated embodiments, the ball bearing 108 is located between the swing-link mechanism 124 and the orbiting scroll 66. However, as a result of the location of the ball bearing 108 within the compression device 18, there may be limited oil delivery to the ball bearing 108 resulting in reduced durability.

The electric compressor 10 may include a housing 12, a refrigerant inlet port 68, a refrigerant outlet port 70, an inverter module 144, a motor 54, a drive shaft 90 and a compression device 18. The housing 12 defines an intake volume 74 and a discharge volume 82. The refrigerant inlet port 68 is coupled to the housing 12 and is configured to introduce the refrigerant to the intake volume 74. The refrigerant outlet port 70 is coupled to the housing 12 and is configured to allow compressed refrigerant to exit the electric compressor 10 from the discharge volume 82. The inverter module 144 is mounted inside the housing 12 and adapted to convert direct current electrical power to alternating current electrical power. The motor 54 is mounted inside the housing 12. The drive shaft 90 is coupled to the motor 54. The compression device 18 receives the refrigerant from the intake volume 74 and compresses the refrigerant as the drive shaft 90 is rotated by the motor 54. The compression device 18 includes a fixed scroll 26, an orbiting scroll 66, a swing-link mechanism 124, a ball bearing 108 and a pin 136.

The fixed scroll 26 is located within, and is fixed relative to, the housing 12. The orbiting scroll 66 is coupled to the drive shaft 90. The orbiting scroll 66 and the fixed scroll 26 form compression chambers 80 for receiving the refrigerant from the intake volume 72 and compressing the refrigerant as the drive shaft 90 is rotated about the center axis 90C. The orbiting scroll 66 has a first side (or the lower surface) 66F and a second side (or upper surface) 66G. The orbiting scroll 66 has an oil aperture 140 through the orbiting scroll 66 from the first side 66F to the second side 66G.

The swing-link mechanism 124 is coupled to the drive shaft 90. The ball bearing 108 is positioned between and adjacent to each of the orbiting scroll 66 and the swing-link mechanism 124. The drive shaft 90, orbiting scroll 66 and swing-link mechanism 124 are arranged to cause the orbiting scroll 66 to orbit the central axis 90C in an eccentric orbit.

As shown in FIG. 16C, the tip of the orbiting scroll 66 includes a plug 136 and has an oil orifice 138. The plug 136 may be press fit within the oil aperture 140 of the orbiting scroll 66. The oil orifice 138 is configured to allow oil with a controlled flow rate or compressed refrigerant to pass through the orbiting scroll 66 to the ball bearing 108.

The size of the oil orifice 138 may be tuned to the specifications of the electric compressor 10. For example, given the specifications of the electric compressor 10, the diameter of the oil orifice 138 may be chosen such that only oil is allowed to pass through and to limit the equalization of pressure between the first and second sides of the orbiting scroll 66. By using a separate plug 136, rather than machining the oil orifice 138 directly in the orbiting scroll 66, manufacturing efficiencies may be achieved. And the plug 136 may have an oil orifice 138 that is specifically designed and tuned to allow for oil flow and refrigerant flow to increase or decrease depending on the diameter and geometry of the oil orifice 138.

As shown in FIGS. 16D-16E, in one embodiment, the oil orifice 138 may have a first bore 138A and a second bore 138B, wherein a diameter of the first bore 138A is less than a diameter of the second bore 138B. For example, in one application of this embodiment the first bore 138A has an approximate diameter of 0.3 mm. The second bore 138B has a diameter greater than the diameter of the first bore 138A and is only used to shorten the length of the first bore 138A. The flow of the oil and coolant is designed to provide thermal and lubricant to the ball bearing 108 supporting the radial forces created by the eccentric orbit of the orbiting scroll 66.

Further, as discussed above, the orbiting scroll 66 has an orbiting scroll base 66A and an orbiting scroll lap 66B. The orbiting scroll lap 66B may have an orbiting scroll tail end 66C and an orbiting scroll center end 66D. As shown, the oil aperture 140 is located within the orbiting scroll center end 66D. The plug 136 may be secured into the oil aperture 140, by press fit or any other method that will secure the plug 136.

As shown in FIG. 9, the oil orifice 138 allows oil (and refrigerant) to travel from the discharge chamber 82 to the ball bearing 108 along the bath 73 (which may be referred to as the "nose bleed" path).

Bearing Oil Communication Hole

In a fourth aspect of the electric disclosure of the disclosure, an electric compressor 10 having a bearing oil communication hole is provided. As discussed above, in the illustrated embodiment, a drive shaft 90 is rotated by the motor 54 to controllably actuate the compression device 18. The drive shaft 90 has a first end 90A and a second and 90B. The housing 10 of the electric compressor 10 forms a first drive shaft supporting member 22B and a second drive shaft support member 24A. In the illustrated embodiment, the first drive shaft supporting member 22B is formed in a motor side 22 of the inverter housing 22A and the second drive shaft supporting member 24A is formed within the motor housing 24. First and second ball bearings 62, 64 are located within the first and second drive shaft support members 22B, 24A.

The location of the first drive shaft supporting members 22B is not a flow-through area for refrigerant (and oil). This may result in a low lubricating condition and affect the durability of the electric compressor 10.

As shown in FIG. 16F, the first drive supporting member 22B may include one or more holes 22C to allow oil and refrigerant to enter the first drive support member 22B and lubricate the first ball bearing 62.

In the illustrated embodiment, the electric compressor 10 includes a housing 12, a first ball bearing 62, a second ball bearing 64, a refrigerant inlet port 68, a refrigerant outlet port 70, an inverter module 44, a motor 54, a drive shaft 90, and a compression device 18.

The housing 12 defines an intake volume 74 and a discharge volume 82 and includes first and second drive shaft supporting members 22B, 24A. The first ball bearing 62 is located within the first drive shaft supporting member 22B. The first drive shaft support member 22B of the housing 12 includes an oil communication hole 22C for allowing oil to enter the first ball bearing 62.

The second ball bearing 64 is located within the second drive shaft supporting member 24A. The refrigerant inlet port 68 is coupled to the housing 12 and is configured to introduce the refrigerant to the intake volume 74. The refrigerant outlet port 70 is coupled to the housing 12 and is configured to allow compressed refrigerant to exit the electric compressor 10 from the discharge volume 82. The inverter module 144 is mounted inside the housing 12 and is adapted to convert direct current electrical power to alternating current electrical power. The motor 54 is mounted inside the housing 12. The drive shaft 90 is coupled to the motor 54. The drive shaft 90 has a first end 90A and a second end 90B. The first end 90A of the drive shaft 90 is positioned within the first bearing 62 and the second end 90B of the drive shaft 90 is positioned within the second bearing 64. The compression device 18 receives the refrigerant from the intake volume 74 and compresses the refrigerant as the drive shaft 90 is rotated by the motor 54. As discussed above, in the illustrated embodiment, the first drive shaft support member 22 may be formed on the motor side 22A of the inverter housing 22. The rotational movement within the motor section 16 of the compression device 18 creates a flow path and movement to the oil from the oil reservoir 98, as shown by arrows 88 in FIG. 9. As shown the oil flows from the oil reservoir 98 toward the motor section 16 and continues toward the stator 58 and rotor 60. The rotational motion of the orbiting scroll, rotor and drive shaft pulls the oil upward to mix with the inlet flow of the refrigerant path 72. The rotational movement of the rotor 60 and drive shaft 90 will further propel the oil against the motor side 22A of the inverter housing 22. The motor side 22A further includes a series of ribs 22D, shown in FIG. 16F. The ribs 22D provide the needed rigidity for supporting the first drive shaft support member 22 and allow for a ridged backing and pocket to secure the first bearing 62. The inverter housing 22 further defines an oil cavity 22E where oil collected between the ribs 22D is directed by gravity downward and into the oil cavity 22E. The ribs 22D and the sloped surface of the motor side 22A cooperate to capture and direct the oil splashed or propelled against the motor side 22A by the rotor 60 or drive shaft 90, to assist in increasing the oil flow into the oil cavity 22E and first bearing 62. FIG. 16F illustrates only one oil communication hole 22C, but it is appreciated additional oil communication holes 22C may be included above and between the ribs 22D on the motor side 22A of the inverter housing 22. For example, in the illustrated embodiment the communication hole 22C is 3.5 mm in diameter and the motor side 22A includes a sloping wall between the ribs 22D. In addition, the motor side 22A may include an outer oil collection area or depression 22F surrounding the communication holes 22C.

Domed Inverter Cover

In the fifth aspect of the electric compressor 10 of the present disclosure, an electric compressor 10 is configured to compress a refrigerant. The electric compressor 10 includes the housing 12, the refrigerant inlet port 68, the refrigerant outlet port 70, the inverter module 44, the motor 54, the drive shaft 90, the compression device 18 and the inverter cover 20. The housing 12 defines the intake volume 70 and the discharge volume 82. The housing 12 has a generally cylindrical shape and the central axis 90C. The refrigerant inlet port 68 is coupled to the housing 12 and is configured to introduce the refrigerant to the intake volume 70. The refrigerant outlet port 82 is coupled to the housing 12 and is configured to allow compressed refrigerant to exit the electric compressor 10 from the discharge volume 82.

The inverter module 44 is mounted inside the housing 12 and adapted to convert direct current electrical power to alternating current electrical power. The motor 54 is mounted inside the housing 12. The drive shaft 90 is coupled to the motor 54. The compression device 18 is coupled to the drive shaft 90 and is configured to receive the refrigerant from the intake volume and to compress the refrigerant as the drive shaft 90 is rotated by the motor 54.

As discussed above, the compression device 18 may rotate at a high speed (>2,000 RPM) which may create undesirable noise, vibration, and harshness (NVH) and low durability conditions. In the prior art, the inverter cover 20 is generally flat and tends to amplify and/or focus, the vibrations from the compression device 18.

As shown in FIGS. 3A-3D, to disperse vibrations rather than focus, the vibrations from the compression device 18, the inverter back cover 20 of the electric scroll-like compressor 10 of the fifth aspect of the disclosure is provided with a generally curved or domed profile.

As shown in the FIGS., specifically FIGS. 1, 3A-3B and 6, the inverter cover 20 is located at one end of the electric compressor 10 and includes a first portion 20A and a second portion 20B. The first portion 20A includes an apex or apex portion 20C and is generally perpendicular to the central axis 90C and has an apex 20C and an outer perimeter 20D. The first portion 20A has a relatively domed-shaped such that the inverter cover 20 has a curved profile from the apex 20C towards the outer perimeter 20D. The amount and location of the curvature may be dictated or limited by other considerations, such as packaging constraints, i.e., the space in which the electric compressor 10 must fit, and constraints placed by internal components, i.e., location and size). The first portion 20A may also have to incorporate other features, e.g., apertures to receive fastening bolts. The second portion 20B may include a portion of the inverter cover 20 that is not domed, i.e., is relatively flat that is located about the perimeter of the inverter cover.

Figure 3B:
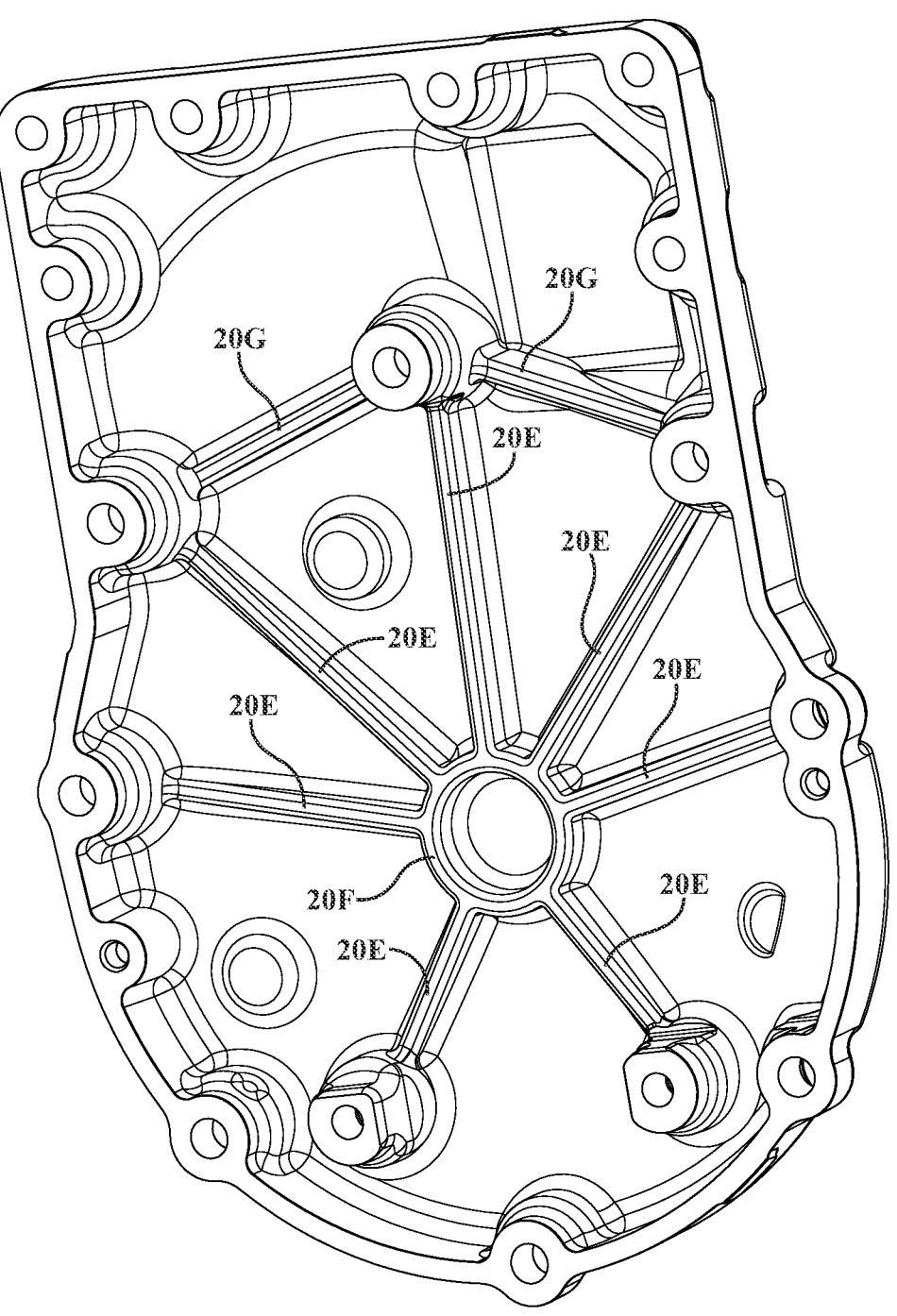
FIG. 3B is a perspective view of the inverter back cover of FIG. 3A.

In FIG. 3B, the rear side of the inverter cover 20 may include a plurality radial ribs 20E extending outwardly from a center circular rib 20F to provide rigidity and support for the curved first portion 20A of the inverter back cover 20. As shown, the radial ribs 20E are not equally spaced about the center circular rib 20F. The inverter back cover 20 may also include additional ribs 20G to add additional strength.

Figures 3C, 3D:
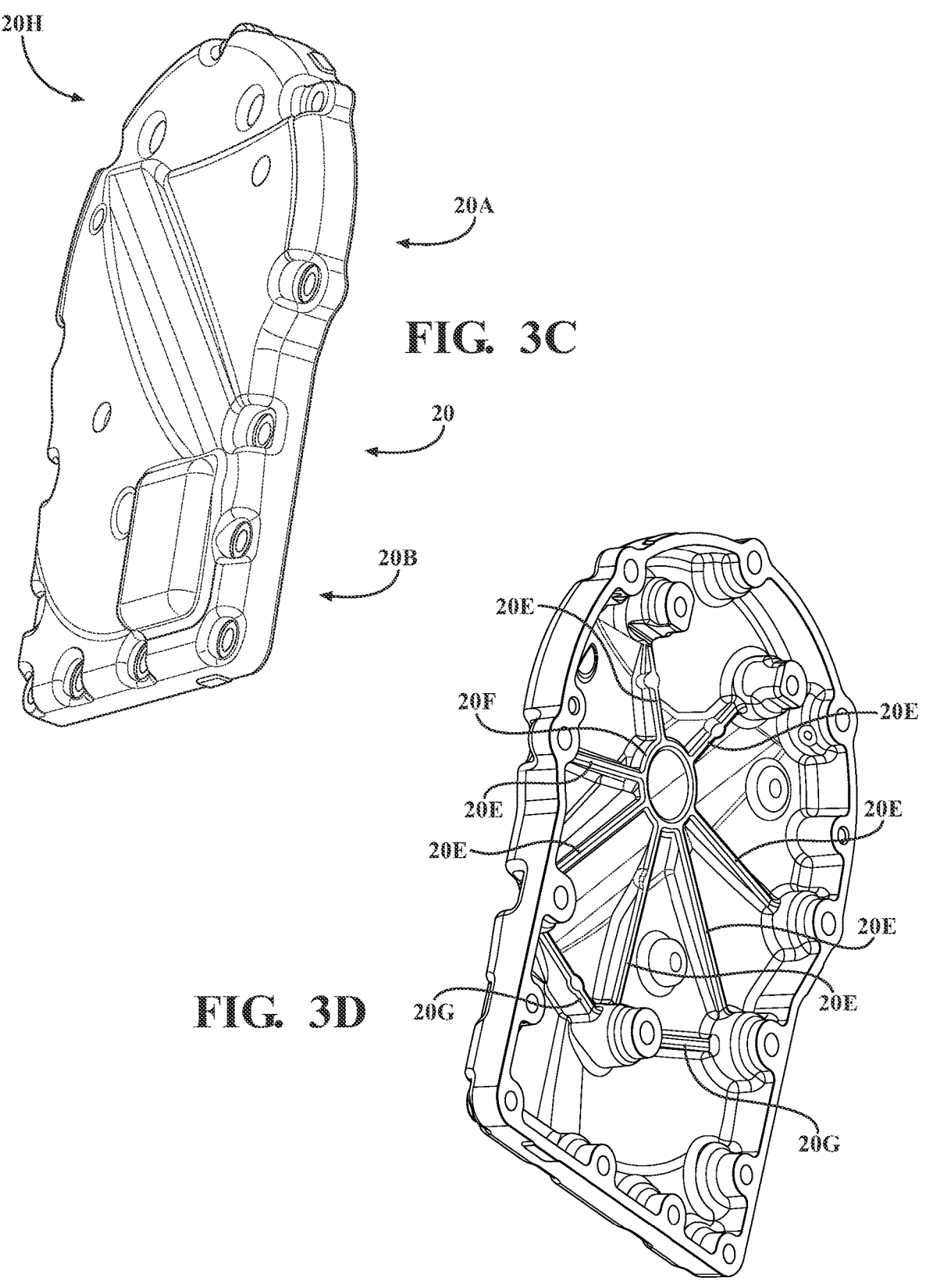
FIG. 3C is a first perspective view of an inverter back cover, according to an alternative embodiment of the present invention.
FIG. 3D is a second perspective view of the inverter back cover of FIG. 3C.

With reference to FIGS. 3C and 3C, an alternative embodiment if the inverter cover 20 is shown. In some applications, the inverter cover 20, in particular, the first portion 20A may have to be modified to take into account external constraints, such as packaging or size restraints. In the illustrated embodiments, the illustrated embodiment includes a channel 20H that runs through the first portion 20A that is necessary to accommodate an external support structure.

Motor Connector Assembly

With reference to FIGS. 21, 22A-22H, and 23A-23G (in which like components are numbered the same as in the above embodiments), in one aspect of the present invention, the compressor 10 may include one or more motor connector assemblies 152. As discussed in more detail below, the motor connector assemblies 152 allows for quick, removable connection of the windings of the motor 54 to the inverter module 44. Further, the motor connector assembly 152 may be configured to allow the winding connections to be easily insulated to reduce or minimize electrical current leakage.

Figure 21:
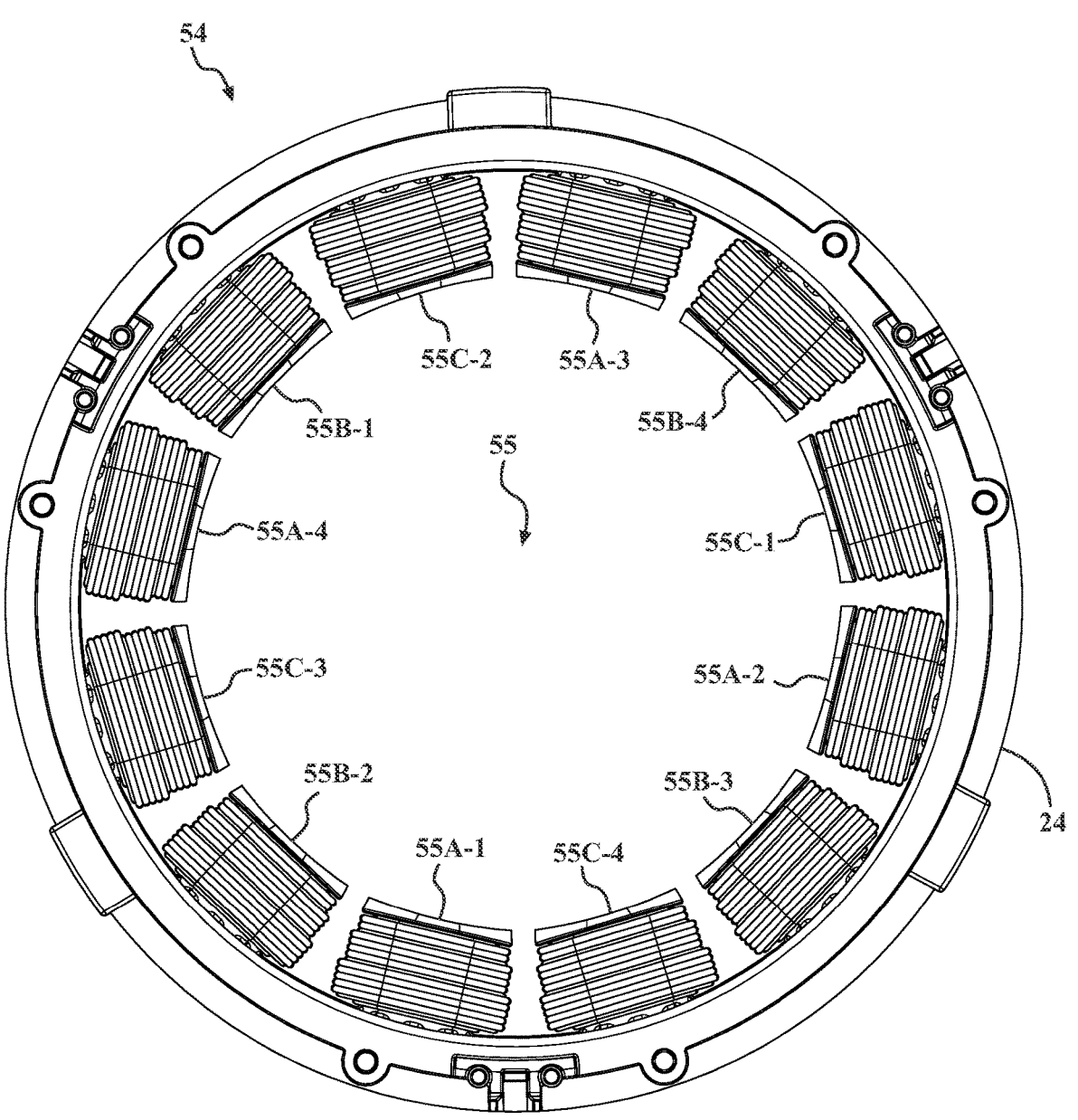
FIG. 21 is a top down view of an electric motor of an electric compressor.

With particular reference to FIGS. 21, in the illustrated embodiment, the motor 54 is a three-phase AC motor 54. Each phase includes a plurality of windings 55, for example, four. In the illustrated embodiments, the first phase includes windings 55A-1, 55A-2, 55A-3, 55A-4; the second phase includes windings 55B-1, 55B-2, 55B-3, 55B-4, and the third phasing includes windings 55C-1, 55C-2, 55C-3, 55C-4. Electrically the windings 55 are connected serially in the following order: 55A-1, 55A-2, 55A-3, 55A-4, 55B-1, 55B-2, 55B-3, 55B-4, 55C-1, 55C-2, 55C-3, 55C-4 (see FIG. 22H). The junction between each phase 57 is connected to the PC board 48 via a respective connector assembly 152.

Figure 22A:
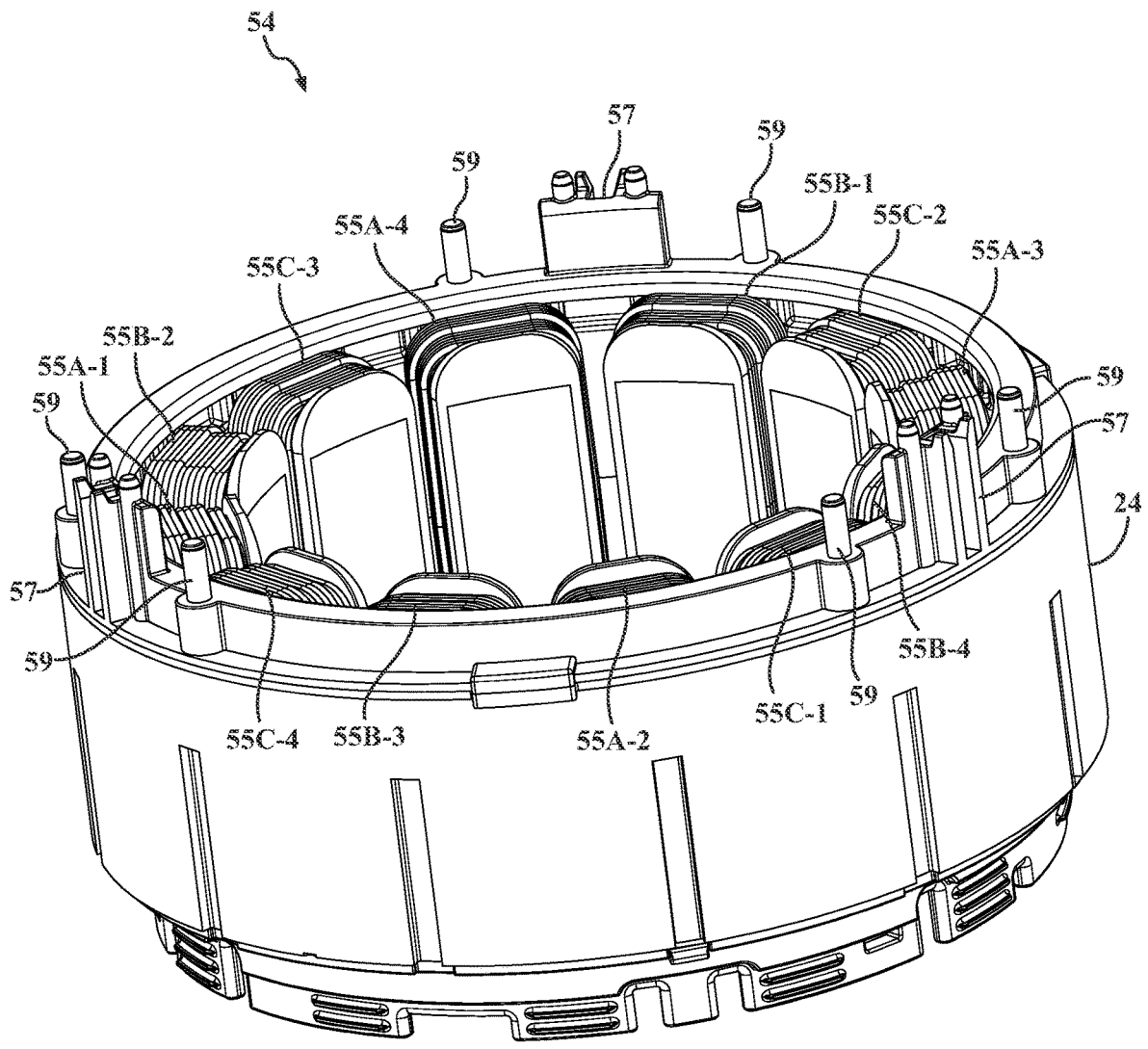
FIG. 22A is a first perspective view of an electric motor of an electric compressor, according to an embodiment of the present invention.
Figure 22B:
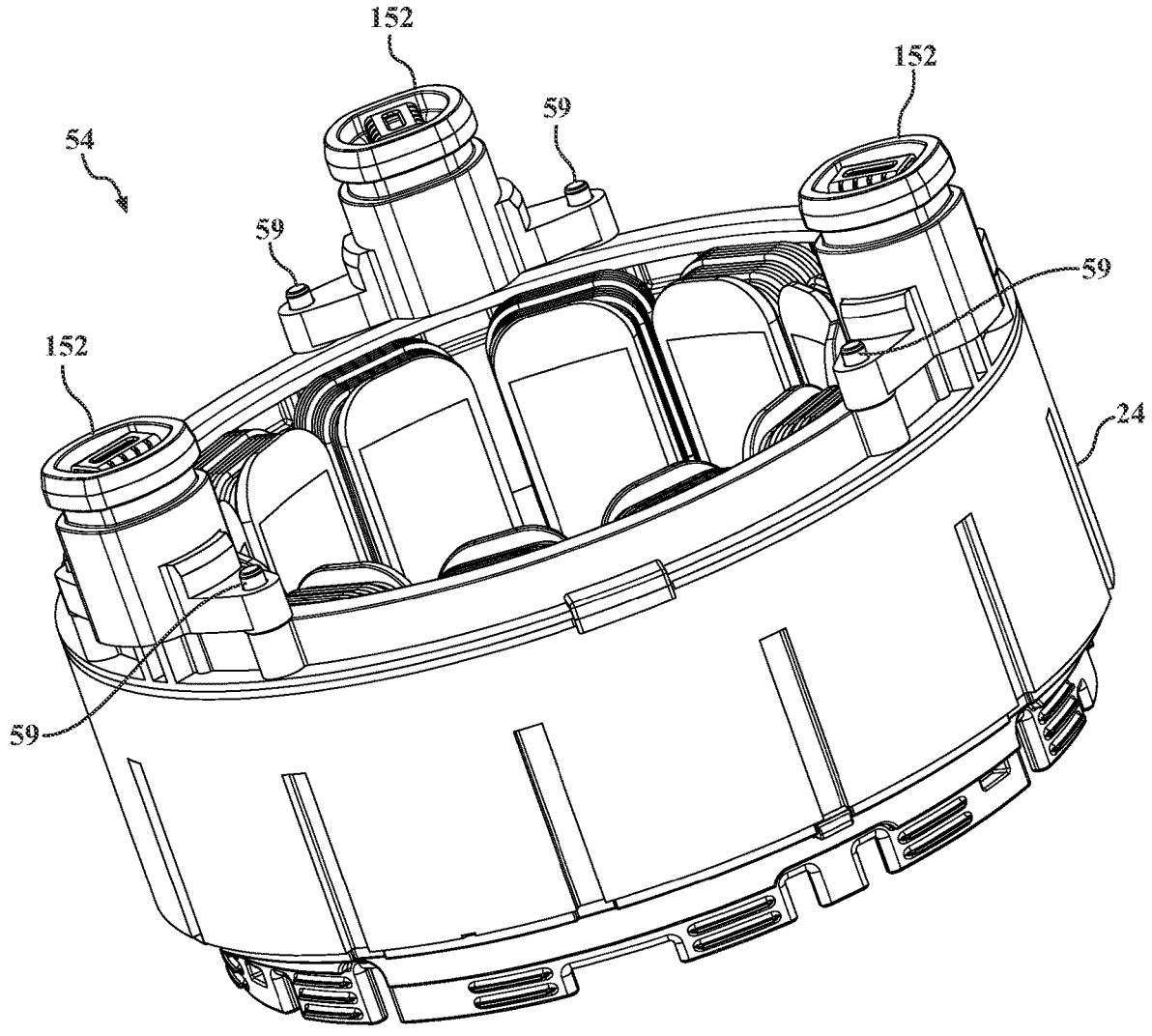
FIG. 22B is a second perspective view of the electric motor including three motor assemblies, according to a first embodiment of the present invention.
Figures 22C, 22D, 22E:
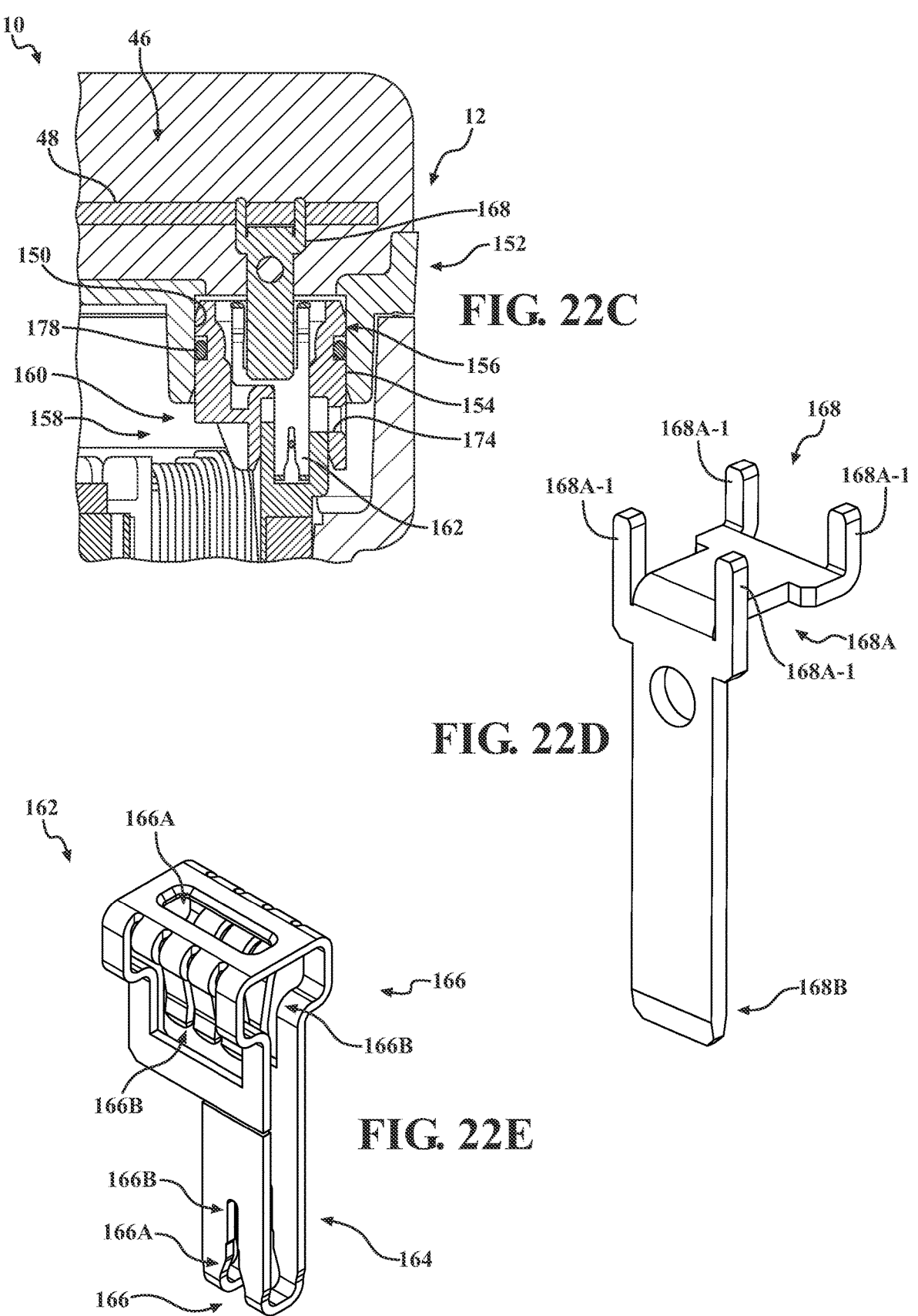
FIG. 22C is a partial cross-sectional view of one of the motor connector assemblies of FIG. 22B.
FIG. 22D is a perspective view of a second motor connector of the motor connector assembly of FIG. 22B.
FIG. 22E is a perspective view of a first motor connector of the motor connector assembly of FIG. 22B.
Figure 22F:
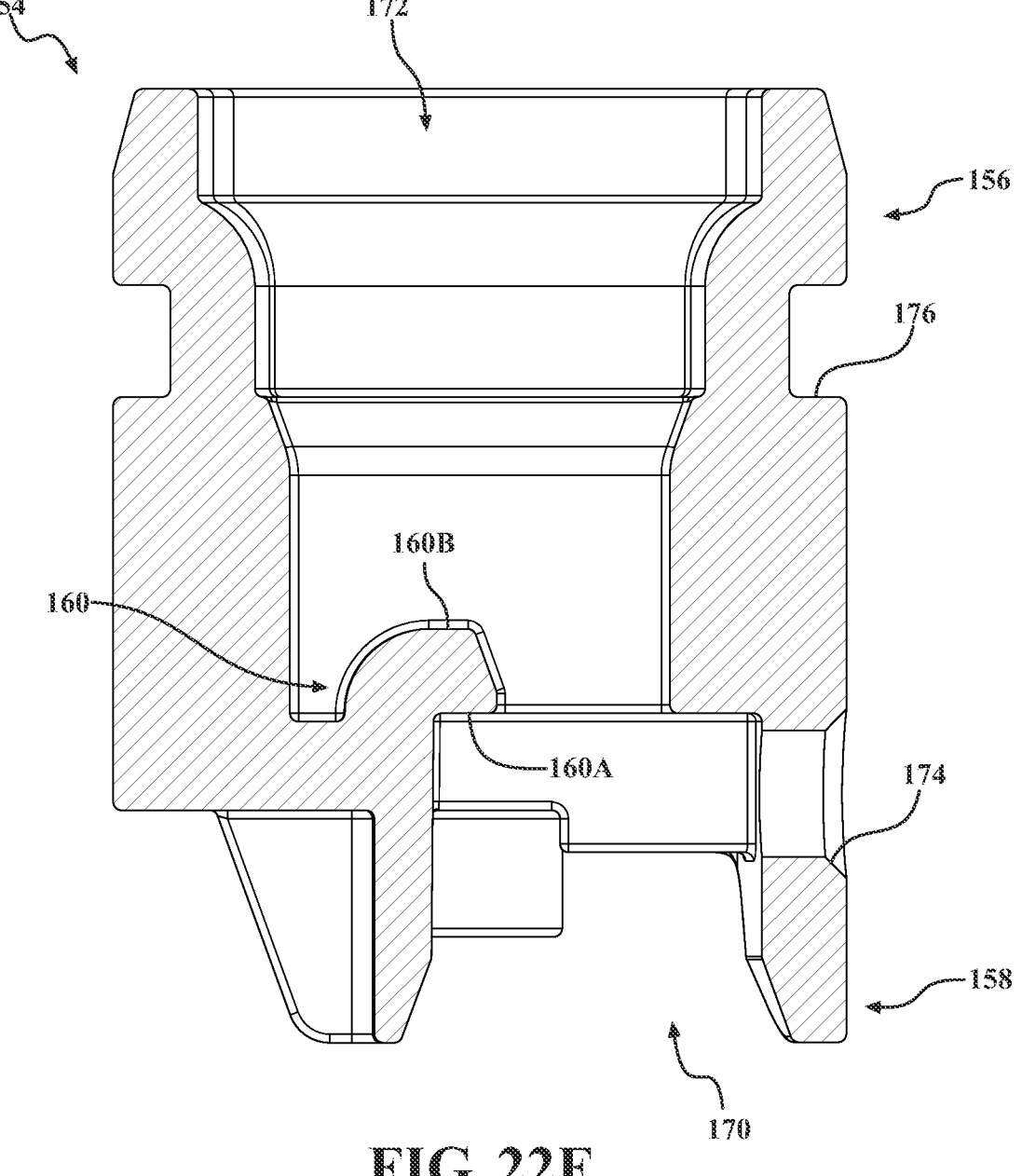
FIG. 22F is a cross-sectional view of a motor connector housing of the motor connector assembly of FIG. 22B.
Figure 22G:
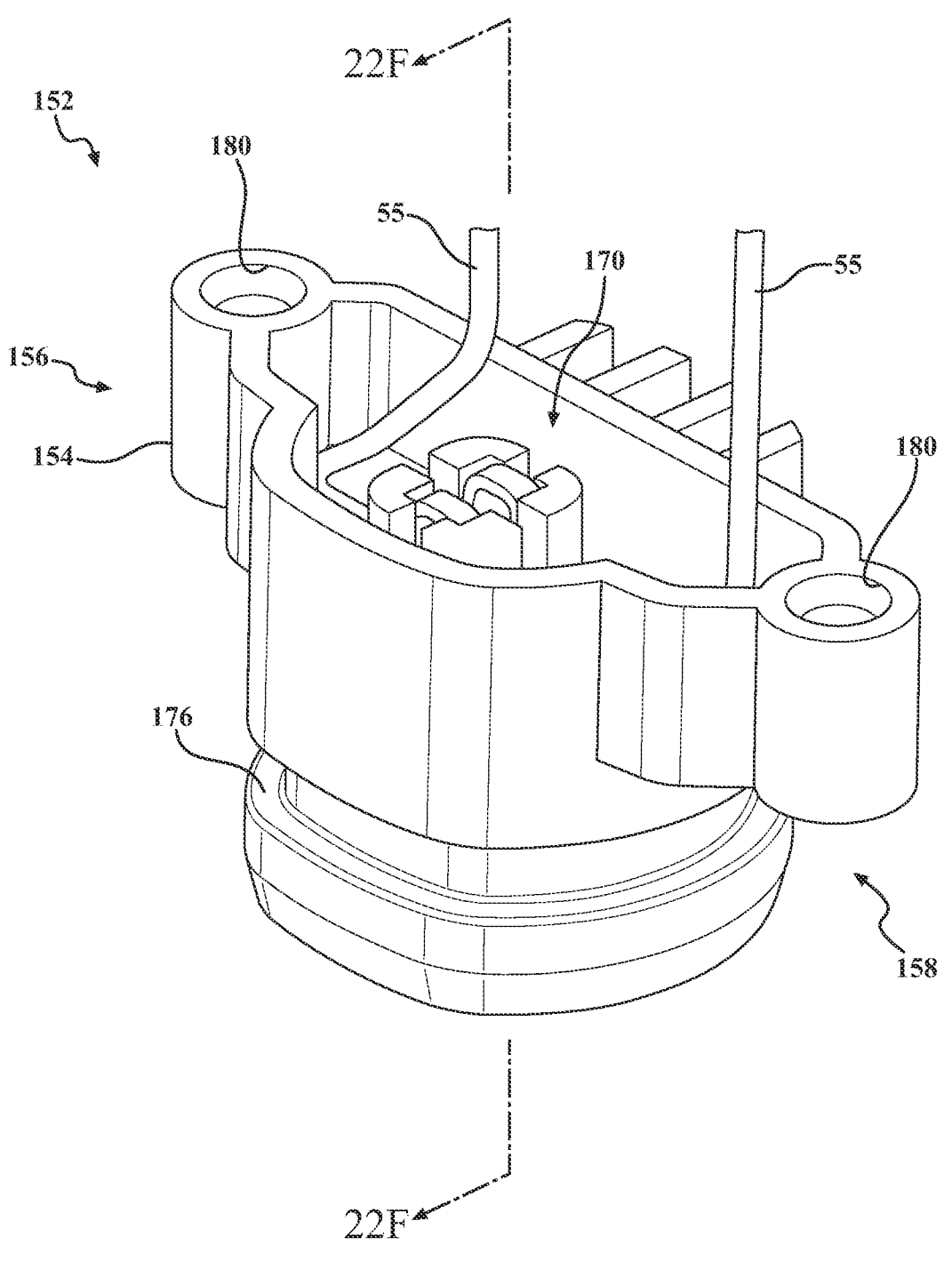
FIG. 22G is a perspective view of the motor connector housing of FIG. 22F.
Figure 22H:
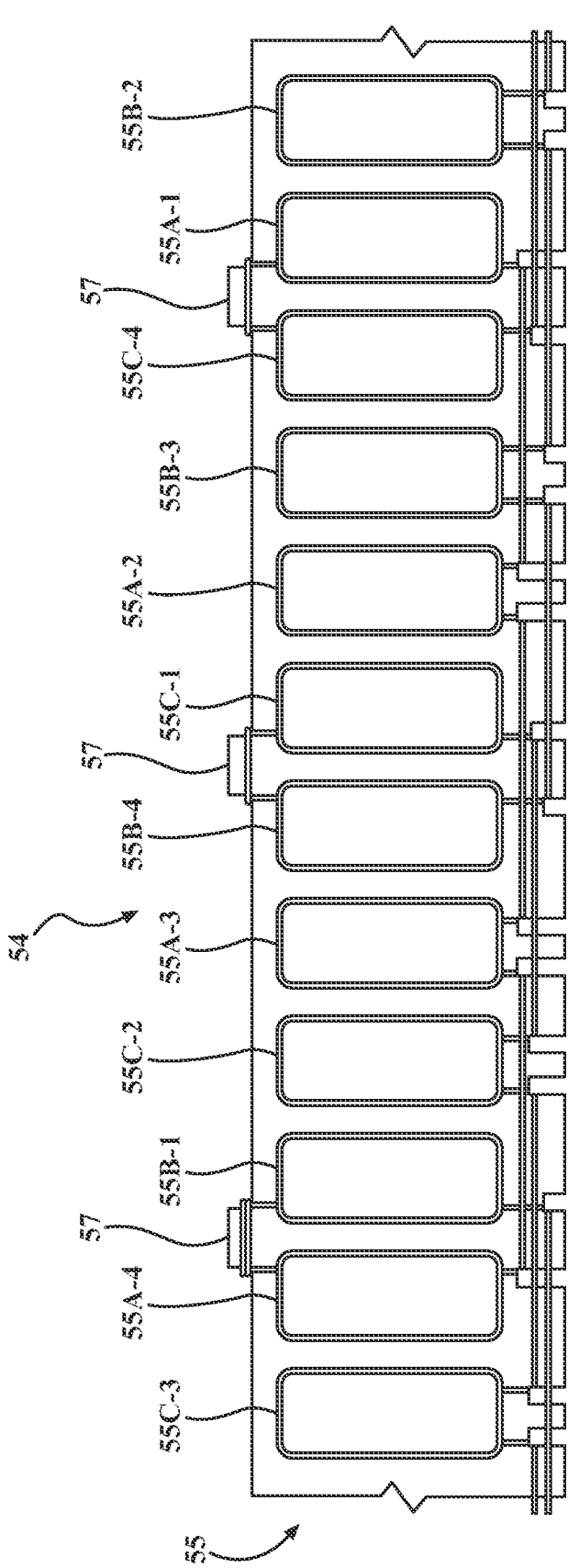
FIG. 22H is a wiring diagram associated with the electric motor of FIG. 22A, according to an embodiment of the present invention.

With particular reference to FIGS. 22A-22G, a motor connector assembly 152 according to a first embodiment is shown. With particular reference to FIGS. 22A, 22G, the electric compressor 10 includes a three-phase electric motor 54 with a junction 57 between each phase. Each junction 57 is connected to the PC board 48 via a respective connector assembly 152. A set of location pins 59 assist in correctly positioning each motor connector assembly 152 relative to the motor 54. In the illustrated embodiment, the junctions 57 and connector assemblies 152 are spaced 120 degrees along the electric motor 54, although it should be noted that other configurations, requiring a different wiring of the electric motor 54 may be utilized. For discussion purposes, only one motor connector 152 is shown in FIGS. 22C-22G. However, the other motor connectors 152 are the same or similar.

As discussed in further detail below, each motor connector assembly 152 includes a motor connector housing 154, a first motor connector 162, and a second motor connector 168. The motor connector housing 154 is positioned or located within a motor connector aperture 150 of the housing 12 of the compressor 10. In the illustrated embodiment the electric compressor 10 includes an inverter housing 22 that separates the intake volume 74 from the inverter cavity 30. As shown, the motor connector aperture 150 is within the inverter housing 22.

The motor connector housing 154 includes an inverter end 156 adjacent the inverter cavity 30 and an intake end 158 within the intake volume 74. The motor connector housing 154 includes an internal wall 160. The internal wall 160 includes having an intake side 160A and an inverter side 160B and is positioned between the inverter end 156 and the intake end 158 thereby separating the intake volume 74 and the inverter cavity 30.

The first motor connector 162 passes through the internal wall 160 of the motor connector housing 154. and has a first end 164 located adjacent the intake side 160A of the internal wall 160 and a second end 166 located adjacent the inverter side 160B of the internal wall 160. One of the motor windings 54C is electrically connected to the first end 164 of the first motor connector 162.

The second motor connector 168 is coupled to the inverter module 44 and is configured to be removably coupled to the second end 166 of the first motor connector 162.

In the illustrated embodiment, the motor connector housing 154 defines a connector intake cavity 170 located within the intake volume 74 and a connector inverter cavity 172. The first end 164 of the first motor connector 162 is at least partially located within the connector intake cavity 172 and the second end 166 of the first motor connector 162 is at least partially located within the connector inverter cavity 172.

Figure 22J:
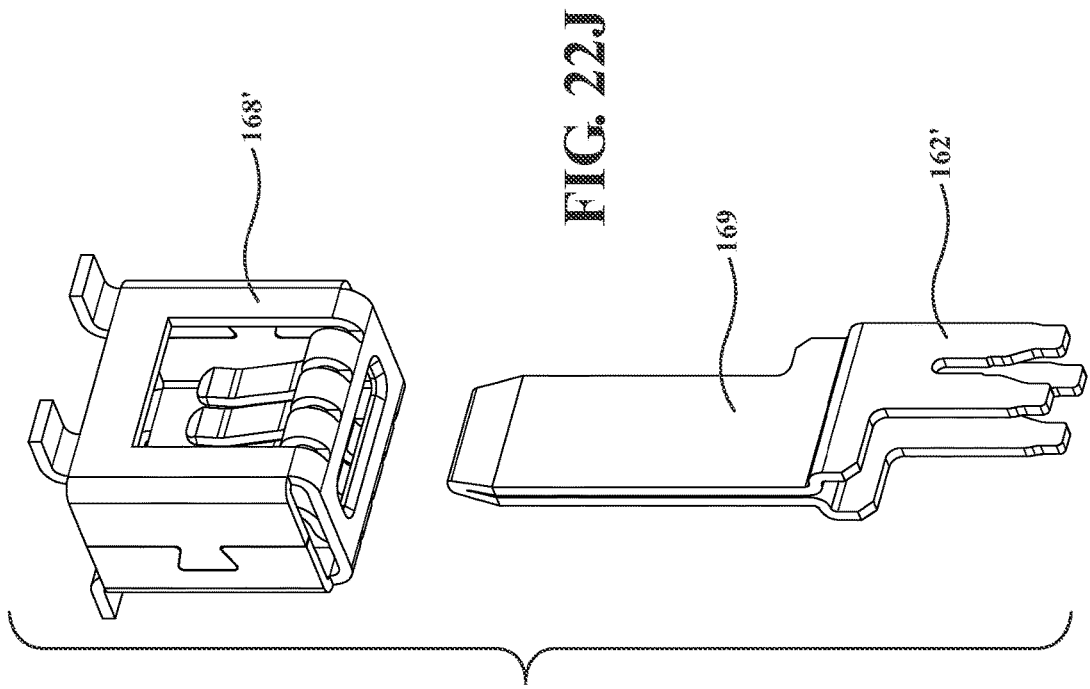
FIG. 22J is a perspective view of first and second motor connectors and a blade of the motor connector assembly of FIG. 22I.
Figure 22I:
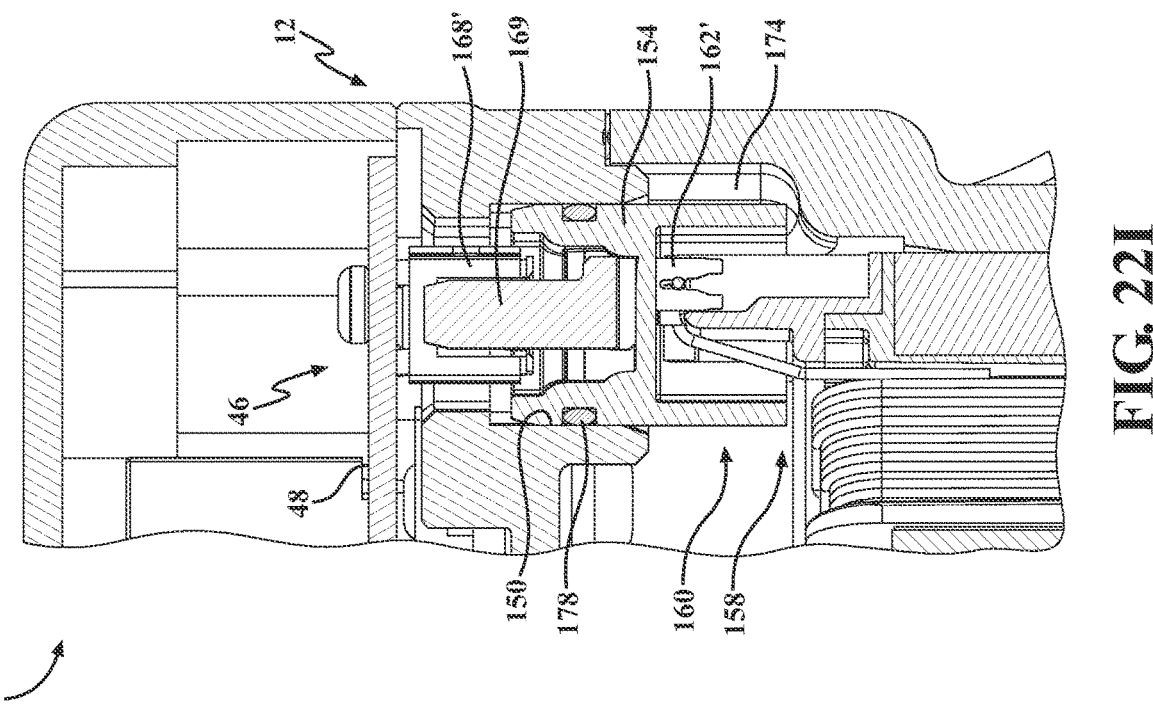
FIG. 22I is a partial cross-sectional view of one of the motor connector assemblies of FIG. 22B, according to an alternative embodiment of the present invention.
Figure 23A:
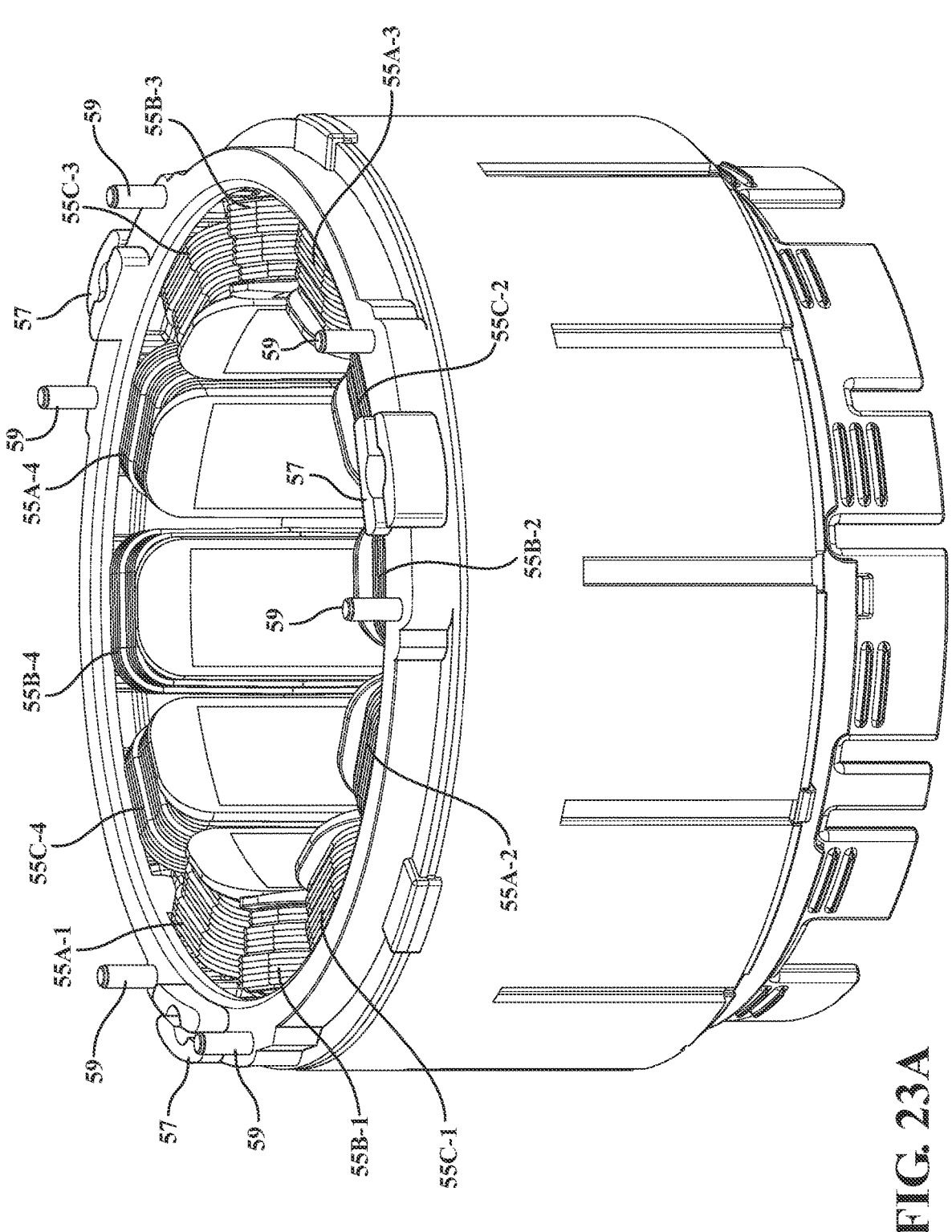
FIG. 23A is a first perspective view of an electric motor of an electric compressor, according to another embodiment of the present invention.
Figure 23B:
FIG. 23B is a second perspective view of the electric motor including three motor assemblies, according to a second embodiment of the present invention.
Figure 23C:
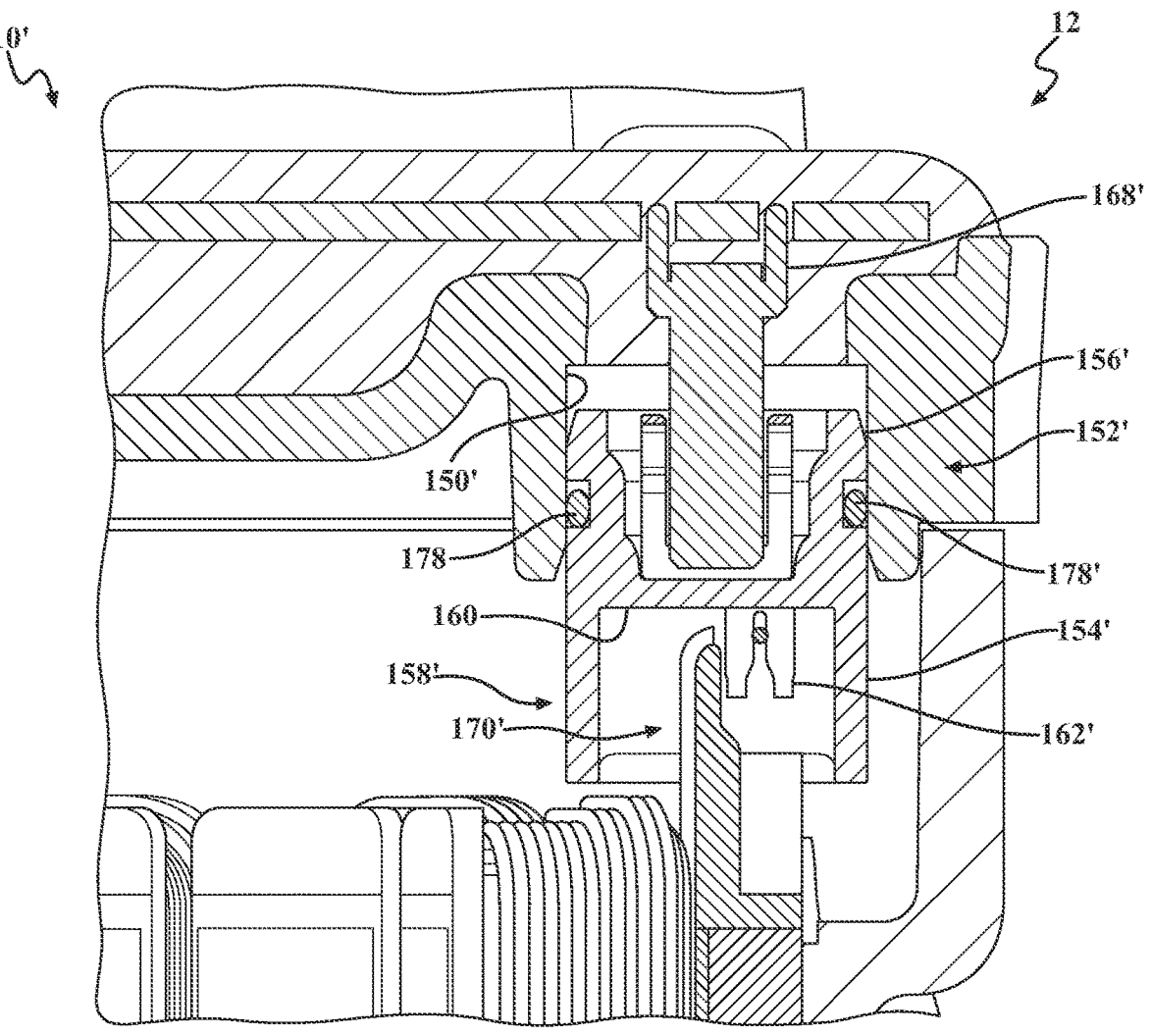
FIG. 23C is a partial cross-sectional view of one of the motor connector assemblies of FIG. 23B.
Figure 23D:
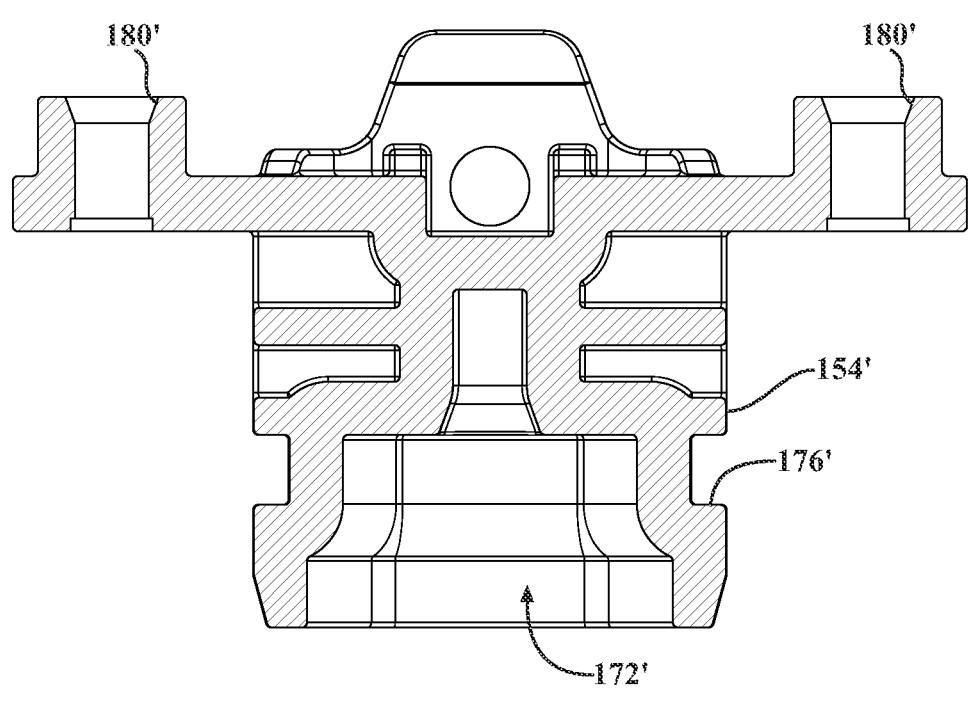
FIG. 23D is a first cross-sectional view of a motor connector housing of the motor connector assembly of FIG. 23C.
Figure 23E:
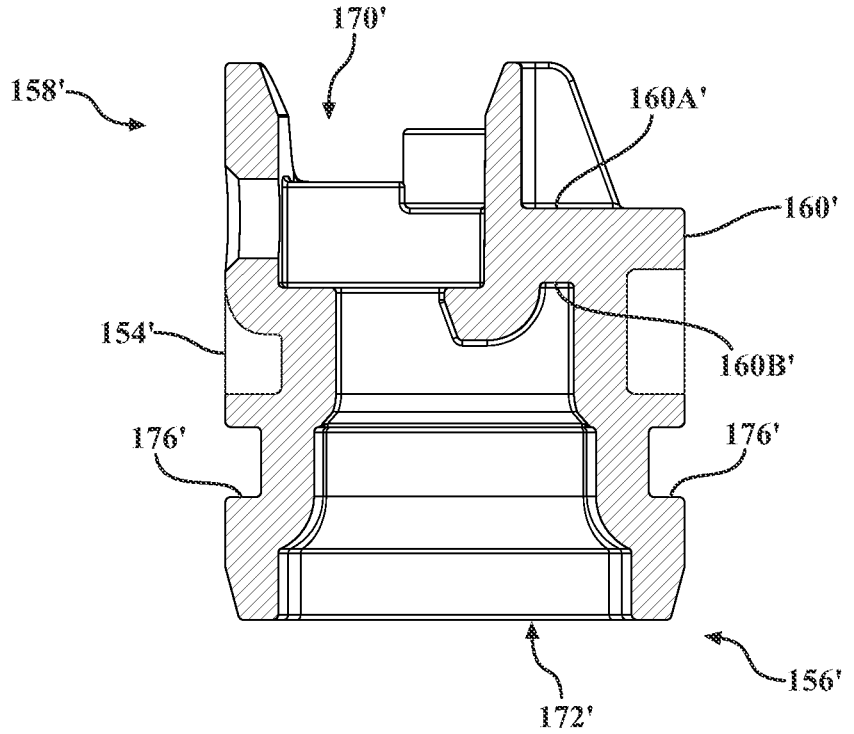
FIG. 23E is a second cross-sectional view of the motor connector housing of the motor connector assembly of FIG. 23C.
Figures 23F, 23G:
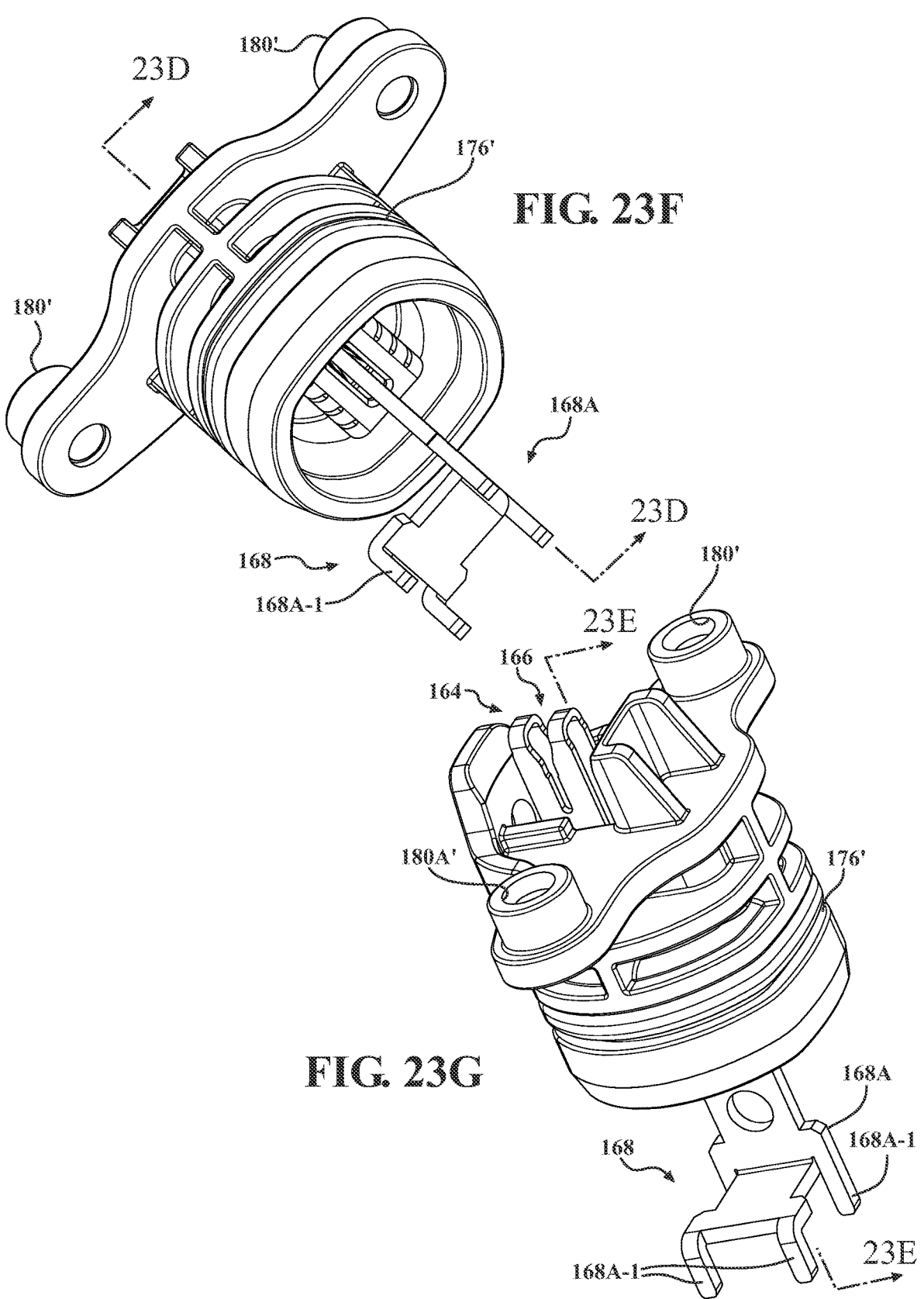
FIG. 23F is a first perspective view of a motor connector housing of the motor connector assembly of FIG. 23C, according to an embodiment of the present invention.
FIG. 23G is second perspective view of a motor connector housing of the motor connector assembly of FIG. 23C.

With reference to FIGS. 22I-22J, a motor connector assembly 152 having an alternative arrangement is shown. The alternative motor connector assembly 152 of FIGS. 22I-22J includes an alternative first connector 162', an alternative second connector 168'. and a separate blade 169. The alternative first and second connectors 162', 168' are configured to receive the separate blade 169 to provide electrical connection therebetween.

As discussed in more detail below, the motor connector housing 154 further includes a port 174 that allows the injection of a potting material, such as an epoxy or a silicon based material, into the connector intake cavity 172 after the motor winding 56 has been connected to the first motor connector 162 (see below). In the illustrated embodiment, the port 174 is located within a side wall of the motor connector housing 154. The potting material electrically insulates the connection between the winding 56 and the first motor connector 162. A recess 176 is located around an outer periphery of the motor connector housing 154. The recess 176 is configured to receive an O-ring 178 that provides a seal between the motor connector housing 154 and the motor connector aperture 154 of the housing 12 of the electric compressor 10. The potting material and the O-ring 178 assists in providing a seal between the relatively high pressure of the refrigerant in the intake volume 74 and the inverter cavity 30.

With particular reference to FIG. 22D, in the illustrated embodiment the second motor connector 168 includes a first end 168A and a second end 168B. The first end 168A is configured to be connected to the PC board 48, and in the illustrated embodiment includes a number of connecting pins 168A-1 which connect directly to the PC board 48 when electric compressor 10 is assembled. The second end 168B is configured to be removably connected to the first connector 162, and in the illustrated embodiment is in the shape of a blade as shown.

With particular reference to FIGS. 22E, the first end 166 of the first motor connector 162 includes a receptacle 166A for receiving the blade or second end 168B of the second motor connector 168. A plurality of flexible members 166B are biased towards a center of the receptacle 166A and ensure electrical contact between the second end 162B of the second motor connector 162A and the first motor connector 162. The second end 166 of the first motor connector 162 includes a slot 166 that forms an insulation displacement connector. The slot 166 include an open end 166A and a connection end 166B. As shown, the slot 166 narrows from the open end 166A towards the connection end 166B. The slot 166 is configured to receive the one of the windings 55 of the motor 54 and to slice or cut through the insulation of the windings 55 to provide electrical connection thereto. Each motor connector housing 154 includes one or more apertures 180 for receiving a respective pin 59.

With particular reference to FIGS. 23A-23G (in which similar elements are numbered similarly to FIGS. 22A-22G), a motor connector assembly 152' according to a second embodiment is shown. As discussed above, the electric compressor 10 includes a three-phase electric motor 54 with a junction 57 between each phase. Each junction 57 is connected to the PC board 48 via a respective connector assembly 152'. A set of location pins 59 assist in correctly positioning each motor connector assembly 152' relative to the motor 54. For discussion purposes, only one motor connector 152' is shown in FIGS. 23C-23G. However, the other motor connectors 152' are the same or similar.

As discussed in further detail below, each motor connector assembly 152' includes a motor connector housing 154', a first motor connector 162', and a second motor connector 168'. The motor connector housing 154' is positioned or located within a motor connector aperture 150' of the housing 12 of the compressor 10. In the illustrated embodiment the electric compressor 10 includes an inverter housing 22 that separates the intake volume 74 from the inverter cavity 30. As shown, the motor connector aperture 150' is within the inverter housing 22.

The motor connector housing 154' includes an inverter end 156' adjacent the inverter cavity 30 and an intake end 158' within the intake volume 74. The motor connector housing 154' includes an internal wall 160'. The internal wall 160' includes having an intake side 160A' and an inverter side 160B' and is positioned between the inverter end 156' and the intake end 158' thereby separating the intake volume 74 and the inverter cavity 30.

The first motor connector 162' passes through the internal wall 160' of the motor connector housing 154' and has a first end 164' located adjacent the intake side 160A' of the internal wall 160' and a second end 166' located adjacent the inverter side 160B' of the internal wall 160'. One of the motor windings 54C is electrically connected to the first end 164' of the first motor connector 162'.

The second motor connector 168' is coupled to the inverter module 44' and is configured to be removably coupled to the second end 166' of the first motor connector 162'.

In the illustrated embodiment, the motor connector housing 154' defines a connector intake cavity 170' located within the intake volume 74' and a connector inverter cavity 172'. The first end 164' of the first motor connector 162' is at least partially located within the connector intake cavity 172' and the second end 166' of the first motor connector 162' is at least partially located within the connector inverter cavity 172'.

As discussed in more detail below, during assembly, a potting material, such as an epoxy or a silicon based material, may be injected directly into the connector intake cavity 172' after the motor winding 56 has been connected to the first motor connector 162' (see below). The potting material insulates the connection between the winding 56 and the first motor connector 162'. A recess 176' is located around an outer periphery of the motor connector housing 154. The recess 176; is configured to receive an O-ring 178; that provides a seal between the motor connector housing 154; and the motor connector aperture 154' of the housing 12 of the electric compressor 10.

The first and second motor connectors 162', 168' are similar to the first and second motor connectors 162, 168 shown in FIGS. 22D-22E. Each of the motor connector housing 154' includes one or more apertures 180' for receiving a respective pin 59.

Assembly of the Motor Connector Assembly

With reference to FIG. 24, a partial flow diagram of an assembly process or method M10 of an electric compressor 10 having at least one motor connector assembly 152, 152' is shown. In a first step S12 each connector housing 154, 154' is clamped to the stator 58, for example, through a weld process. The second motor connector 168, 168' has been preassembled with the connector housing 154, 154'. In a second step S14, the first motor connector 162, 162' is then installed into the connector housing 154, 154'. This step creates the connection between the motor winding 58 and the first motor connection 162, 162' by mechanically removing the insulation layer of the winding 58.

In a third step, the connector intake cavity 170 with the potting material. In the first embodiment, the potting material is injected into the connector intake cavity 170 via the port 174. In the second embodiment, the potting material is injected directly into the connector intake cavity 170. The connector assembly 152 is arranged such that the intake end 158 of the motor connector housing 154 is above the inverter end 156 of the motor connector housing 154. This allows gravity to assist in filling the connector intake cavity 170 with the potting material.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. An electric compressor configured to compress a refrigerant, comprising:
   a housing defining an intake volume, a discharge volume and an inverter cavity, the housing having a generally cylindrical shape and having a central axis, the housing defining a motor connector aperture located between the intake volume and the inverter cavity;
   an inverter module mounted inside the inverter cavity of the housing and adapted to convert direct current electrical power to alternating current electrical power;
   a motor having a plurality of motor windings and being mounted inside the housing, the motor having a motor inverter end and including a set of locating pins located at along an outer periphery of the motor at the motor inverter end and extending towards the inverter module;
   a compression device, coupled to the motor, for receiving the refrigerant from the intake volume and compressing the refrigerant as the motor is rotated; and,
   a motor connector assembly including:
   a motor connector housing having an inverter end adjacent the inverter cavity and an intake end within the intake volume and being positioned within the motor connector aperture, the motor connector housing including an internal wall having an intake side and an inverter side and being positioned between the inverter end and the intake end separating the intake volume and the inverter cavity, the motor connector housing being located at the motor inverter end of the motor and including a set of apertures configured to receive the locating pins; and,
   a first motor connector passing through the internal wall and having a first end located adjacent the intake side of the internal wall and a second end located adjacent the inverter side of the internal wall, one of the motor windings being electrically connected to the first end of the first motor connector; and,
   a second motor connector coupled to the inverter module and being configured to be removably coupled to the second end of the first motor connector.

2. The electric compressor, as set forth in claim 1, the motor connector housing defining a connector intake cavity located within the intake volume and a connector inverter cavity, the first end of the first motor connector being at least partially located within the connector intake cavity and the second end of the first motor connector being at least partially located within the connector inverter cavity.

3. The electric compressor, as set forth in claim 2, the connector intake cavity being configured to receive a potting material for electrically insulating a junction between the first end of the first motor connector and the one of the motor windings.

4. The electric compressor, as set forth in claim 3, wherein the motor connector housing includes a port for allowing the injection of the potting material.

5. The electric compressor, as set forth in claim 1, the second motor connector having a first end and a second end, the first end of the second motor connector being configured to be removably in contact with the inverter module, the second end of the second motor connector being configured to be removably in contact with the second end of the first motor connector.

6. The electric compressor, as set forth in claim 5, wherein the second end of the second motor connector is in the shape of a blade, the second end of the first motor connector including a receptacle configured to receive the second end of the second motor connector.

7. The electric compressor, as set forth in claim 6, wherein the second end of the first motor connector includes a plurality of flexible fingers positioned with the receptacle.

8. The electric compressor, as set forth in claim 6, wherein the first end of the second motor connector includes one or more connecting pins.

9. The electric compressor, as set forth in claim 1, wherein the first end of the first motor connector forms an insulation displacement connector.

10. The electric compressor, as set forth in claim 1, wherein the motor connector housing includes at least one aperture configured to receive a locating pin.

11. The electric compressor, as set forth in claim 1, wherein the motor is a three phase AC motor, the electric compressor including three motor connector assemblies.

12. An electric compressor configured to compress a refrigerant, comprising:

a housing defining an intake volume, a discharge volume and an inverter cavity, the housing having a generally cylindrical shape and having a central axis, the housing defining a motor connector aperture located between the intake volume and the inverter cavity;

an inverter module mounted inside the inverter cavity of the housing and adapted to convert direct current electrical power to alternating current electrical power;

a three-phase motor having first, second, and third motor windings and being mounted inside the housing, the motor having a motor inverter end and including first, second, and third sets of locating pins, associated with the first, second, and third windings, respectively, located along an outer periphery of the motor at the motor inverter end and extending towards the inverter module;

a compression device, coupled to the motor, for receiving the refrigerant from the intake volume and compressing the refrigerant as the motor is rotated; and, first, second, and third motor connector assemblies located at the motor inverter end of the motor and including a set of apertures configured to receive the respective set of locating pins, each motor connector assembly including:

a motor connector housing having an inverter end adjacent the inverter cavity and an intake end within the intake volume and being positioned within the motor connector aperture, the motor connector housing including an internal wall having an intake side and an inverter side and being positioned between the inverter end and the intake end separating the intake volume and the inverter cavity, the motor connector housing defining a connector intake cavity located within the intake volume and a connector inverter cavity, the first end of the first motor connector being at least partially located within the connector intake cavity and the second end of the first motor connector being at least partially located within the connector inverter cavity;

a first motor connector passing through the internal wall and having a first end located adjacent the intake side of the internal wall and a second end located adjacent the inverter side of the internal wall, one of the motor windings being electrically connected to the first end of the first motor connector; and, a second motor connector coupled to the inverter module and being configured to be removably coupled to the second end of the first motor connector, the second motor connector having a first end and a second end, the first end of the second motor connector being configured to be removably in contact with the inverter module, the second end of the second motor connector being configured to be removably in contact with the second end of the first motor connector.

13. The electric compressor, as set forth in claim 12, the connector intake cavity being configured to receive a potting material for electrically insulating a junction between the first end of the first motor connector and the one of the motor windings.

14. The electric compressor, as set forth in claim 13, wherein the motor connector housing includes a port for allowing the injection of the potting material.

15. The electric compressor, as set forth in claim 12, wherein the second end of the second motor connector is in the shape of a blade, the second end of the first motor connector including a receptacle configured to receive the second end of the second motor connector.

16. The electric compressor, as set forth in claim 15, wherein the second end of the first motor connector includes a plurality of flexible fingers positioned with the receptacle.

17. The electric compressor, as set forth in claim 15, wherein the first end of the second motor connector includes one or more connecting pins.

18. The electric compressor, as set forth in claim 12, wherein the first end of the first motor connector forms an insulation displacement connector.

19. The electric compressor, as set forth in claim 12, wherein the motor connector housing includes at least one aperture configured to receive a locating pin.

20. The electric compressor, as set forth in claim 12, wherein the motor is a three phase AC motor, the electric compressor including three motor connector assemblies.

* * * * *